(12) United States Patent
Loper et al.

(10) Patent No.: US 8,177,665 B2
(45) Date of Patent: May 15, 2012

(54) MULTI-LAYER GOLF BALL

(75) Inventors: Eric Loper, Carlsbad, CA (US); Dean Snell, San Marcos, CA (US); Hyun Jin Kim, Carlsbad, CA (US)

(73) Assignee: Taylor Made Golf Company, Inc., Carlsbad, CA (US)

( * ) Notice: Subject to any disclaimer, the term of this patent is extended or adjusted under 35 U.S.C. 154(b) by 564 days.

(21) Appl. No.: 11/344,976

(22) Filed: Jan. 31, 2006

(65) Prior Publication Data

US 2006/0172823 A1   Aug. 3, 2006

Related U.S. Application Data

(60) Provisional application No. 60/649,670, filed on Feb. 1, 2005.

(51) Int. Cl.
*A63B 36/07* (2006.01)

(52) U.S. Cl. ....................................... 473/376

(58) Field of Classification Search .................. 473/376, 473/368, 367

See application file for complete search history.

(56) References Cited

U.S. PATENT DOCUMENTS

| | | | |
|---|---|---|---|
| 2,741,480 A | 4/1956 | Smith | |
| 2,973,800 A | 3/1961 | Muccino | |
| 3,053,539 A | 9/1962 | Picchowski | |
| 3,264,272 A | 8/1966 | Rees | |
| 3,313,545 A | 4/1967 | Bartsch | |
| 3,373,123 A | 3/1968 | Brice | |
| 3,384,612 A | 5/1968 | Brandt et al. | |
| 3,395,109 A | 7/1968 | Molitor et al. | |
| 3,458,205 A | 7/1969 | Smith et al. | |
| 3,502,338 A | 3/1970 | Cox | |
| 3,534,965 A | 10/1970 | Harrison et al. | |
| 3,572,721 A | 3/1971 | Harrison et al. | |
| 3,883,145 A | 5/1975 | Cox et al. | |
| 3,979,126 A | 9/1976 | Dusbiber | |
| 3,989,568 A | 11/1976 | Isaac | |
| 4,076,255 A | 2/1978 | Moore et al. | |
| 4,085,937 A | 4/1978 | Schenk | |
| 4,123,061 A | 10/1978 | Dusbiber | |
| 4,190,711 A | 2/1980 | Zdrahala et al. | |
| 4,218,543 A | 8/1980 | Weber et al. | |
| 4,248,432 A | 2/1981 | Hewitt et al. | |
| 4,272,079 A | 6/1981 | Nakade et al. | |
| 4,274,637 A | 6/1981 | Molitor | |
| 4,337,946 A | 7/1982 | Saito et al. | |
| 4,431,193 A | 2/1984 | Nesbitt | |
| 4,442,282 A | 4/1984 | Kolycheck | |
| 4,570,937 A | 2/1986 | Yamada | |
| 4,582,887 A | 4/1986 | Dominguez et al. | |
| 4,590,219 A | 5/1986 | Nissen et al. | |
| 4,607,090 A | 8/1986 | Dominguez | |
| 4,650,193 A | 3/1987 | Molitor et al. | |
| 4,674,751 A | 6/1987 | Molitor et al. | |

(Continued)

*Primary Examiner* — Raeann Gorden
(74) *Attorney, Agent, or Firm* — Sheppard, Mullin, Richter & Hampton LLP

(57) ABSTRACT

A four-piece solid golf ball construction is disclosed, including one or more core layers, an inner mantle layer, an outer mantle layer, and one or more cover layers. The inner mantle layer has a Shore D hardness in the range of 20 to 60, and the outer mantle layer has a Shore D hardness in the range of 40 to 80 and exceeding that of the inner mantle layer by at least 3. The solid golf ball provides a high spin rate when struck not only by a full 8-iron, but also by a soft pitching wedge, for short shots near a putting green.

59 Claims, 1 Drawing Sheet

U.S. PATENT DOCUMENTS

| | | |
|---|---|---|
| 4,679,795 A | 7/1987 | Melvin et al. |
| 4,688,801 A | 8/1987 | Reiter |
| 4,690,981 A | 9/1987 | Slatz |
| 4,695,055 A | 9/1987 | Newcomb et al. |
| 4,714,253 A | 12/1987 | Nakahara et al. |
| 4,762,322 A | 8/1988 | Molitor et al. |
| 4,798,386 A | 1/1989 | Berard |
| 4,848,770 A | 7/1989 | Shama |
| 4,852,884 A | 8/1989 | Sullivan |
| 4,858,923 A | 8/1989 | Gobush et al. |
| 4,858,924 A | 8/1989 | Saito et al. |
| 4,878,674 A | 11/1989 | Newcomb et al. |
| 4,884,814 A | 12/1989 | Sullivan |
| 4,911,451 A | 3/1990 | Sullivan et al. |
| 4,919,434 A | 4/1990 | Saito |
| 4,957,297 A | 9/1990 | Newcomb et al. |
| 4,979,746 A | 12/1990 | Gentiluomo |
| 4,984,804 A | 1/1991 | Yamada et al. |
| 4,986,545 A | 1/1991 | Sullivan |
| 5,002,281 A | 3/1991 | Nakahara et al. |
| 5,006,297 A | 4/1991 | Brown et al. |
| 5,019,319 A | 5/1991 | Nakamura et al. |
| 5,026,067 A | 6/1991 | Gentiluomo |
| 5,035,425 A | 7/1991 | Edwards |
| 5,045,591 A | 9/1991 | Meyer et al. |
| 5,048,838 A | 9/1991 | Chikaraishi et al. |
| 5,068,151 A | 11/1991 | Nakamura |
| 5,072,944 A | 12/1991 | Nakahara et al. |
| 5,096,201 A | 3/1992 | Egashira et al. |
| 5,098,105 A | 3/1992 | Sullivan |
| 5,104,126 A | 4/1992 | Gentiluomo |
| 5,120,791 A | 6/1992 | Sullivan |
| 5,142,835 A | 9/1992 | Mrocaa |
| 5,150,906 A | 9/1992 | Molito et al. |
| 5,156,405 A | 10/1992 | Kitaoh et al. |
| 5,184,828 A | 2/1993 | Kim et al. |
| 5,187,013 A | 2/1993 | Sullivan |
| 5,197,740 A | 3/1993 | Pocklington et al. |
| 5,219,973 A | 6/1993 | Slack et al. |
| 5,222,739 A | 6/1993 | Horiuchi et al. |
| 5,244,969 A | 9/1993 | Yamada |
| 5,253,871 A | 10/1993 | Viollaz |
| 5,273,286 A | 12/1993 | Sun |
| 5,273,287 A | 12/1993 | Molitor et al. |
| 5,274,041 A | 12/1993 | Yamada |
| 5,281,651 A | 1/1994 | Arjunan et al. |
| 5,300,334 A | 4/1994 | Niederst et al. |
| 5,304,608 A | 4/1994 | Yabuki et al. |
| 5,306,760 A | 4/1994 | Sullivan |
| 5,312,857 A * | 5/1994 | Sullivan ..................... 524/400 |
| 5,314,187 A | 5/1994 | Proudfit |
| 5,324,783 A | 6/1994 | Sullivan |
| 5,330,837 A | 7/1994 | Sullivan |
| 5,334,673 A | 8/1994 | Wu |
| 5,338,610 A | 8/1994 | Sullivan |
| 5,368,304 A | 11/1994 | Sullivan et al. |
| 5,368,806 A | 11/1994 | Harasin et al. |
| 5,387,750 A | 2/1995 | Chiang |
| 5,403,010 A | 4/1995 | Yabuki et al. |
| 5,439,227 A | 8/1995 | Egashira et al. |
| 5,480,155 A | 1/1996 | Molitor et al. |
| 5,482,285 A | 1/1996 | Yabuki et al. |
| 5,484,870 A | 1/1996 | Wu |
| 5,490,673 A | 2/1996 | Hiraoka |
| 5,490,674 A | 2/1996 | Hamada et al. |
| 5,492,972 A | 2/1996 | Stefani |
| 5,553,852 A | 9/1996 | Higuchi et al. |
| 5,586,950 A | 12/1996 | Endo |
| 5,628,699 A | 5/1997 | Maruko et al. |
| 5,668,239 A | 9/1997 | Nodelman et al. |
| 5,674,137 A | 10/1997 | Maruko et al. |
| 5,688,191 A | 11/1997 | Cavallaro et al. |
| 5,692,974 A | 12/1997 | Wu et al. |
| 5,730,665 A | 3/1998 | Shimosaka et al. |
| 5,733,206 A | 3/1998 | Nesbitt et al. |
| 5,733,207 A | 3/1998 | Sullivan et al. |
| 5,733,428 A | 3/1998 | Calabria et al. |
| 5,739,247 A | 4/1998 | Lesko et al. |
| 5,739,253 A | 4/1998 | Nodelman et al. |
| 5,750,580 A | 5/1998 | Mayer et al. |
| 5,759,676 A | 6/1998 | Cavallaro et al. |
| 5,779,561 A | 7/1998 | Sullivan et al. |
| 5,779,562 A | 7/1998 | Melvin et al. |
| 5,779,563 A | 7/1998 | Yamagishi et al. |
| 5,783,293 A | 7/1998 | Lammi |
| 5,792,008 A | 8/1998 | Kakiuchi et al. |
| 5,797,808 A | 8/1998 | Hayashi et al. |
| 5,800,284 A | 9/1998 | Sullivan et al. |
| 5,803,831 A | 9/1998 | Sullivan et al. |
| 5,810,678 A | 9/1998 | Cavallaro et al. |
| 5,813,923 A | 9/1998 | Cavallaro et al. |
| 5,816,937 A | 10/1998 | Shimosaka et al. |
| 5,820,488 A | 10/1998 | Sullivan et al. |
| 5,820,489 A | 10/1998 | Sullivan et al. |
| 5,820,491 A | 10/1998 | Hatch et al. |
| 5,827,167 A | 10/1998 | Dougan et al. |
| 5,830,087 A | 11/1998 | Sullivan et al. |
| 5,833,553 A | 11/1998 | Sullivan et al. |
| 5,833,554 A | 11/1998 | Sullivan et al. |
| 5,836,833 A | 11/1998 | Shimosaka et al. |
| 5,849,168 A | 12/1998 | Lutz |
| 5,856,388 A | 1/1999 | Harris et al. |
| 5,863,264 A | 1/1999 | Yamagishi et al. |
| 5,873,796 A | 2/1999 | Cavallaro et al. |
| 5,885,172 A | 3/1999 | Hebert et al. |
| 5,888,437 A | 3/1999 | Calabria et al. |
| 5,891,973 A | 4/1999 | Sullivan et al. |
| 5,897,884 A | 4/1999 | Calabria et al. |
| 5,899,822 A | 5/1999 | Yamagishi et al. |
| 5,902,192 A | 5/1999 | Kashiwagi et al. |
| 5,908,358 A | 6/1999 | Wu |
| 5,919,100 A | 7/1999 | Boehm et al. |
| 5,919,862 A | 7/1999 | Rajagopalan et al. |
| 5,922,252 A | 7/1999 | Stanton et al. |
| 5,929,189 A | 7/1999 | Ichikawa et al. |
| 5,935,021 A | 8/1999 | Kashiwagi et al. |
| 5,947,842 A | 9/1999 | Cavallaro et al. |
| 5,947,843 A | 9/1999 | Calabria et al. |
| 5,959,059 A | 9/1999 | Vedula et al. |
| 5,976,035 A | 11/1999 | Umezawa et al. |
| 5,984,807 A | 11/1999 | Wai et al. |
| 6,117,025 A * | 9/2000 | Sullivan ..................... 473/373 |
| 6,315,684 B1 | 11/2001 | Binette et al. |
| 6,419,594 B1 | 7/2002 | Nesbitt et al. |
| 6,635,716 B2 | 10/2003 | Voorheis et al. |
| 6,864,315 B1 * | 3/2005 | Hakuta et al. ................ 525/105 |
| 7,306,529 B2 | 12/2007 | Kennedy, III et al. |
| 7,358,308 B2 | 4/2008 | Bulpett et al. |
| 2005/0250600 A1 * | 11/2005 | Sullivan et al. ............... 473/371 |

* cited by examiner

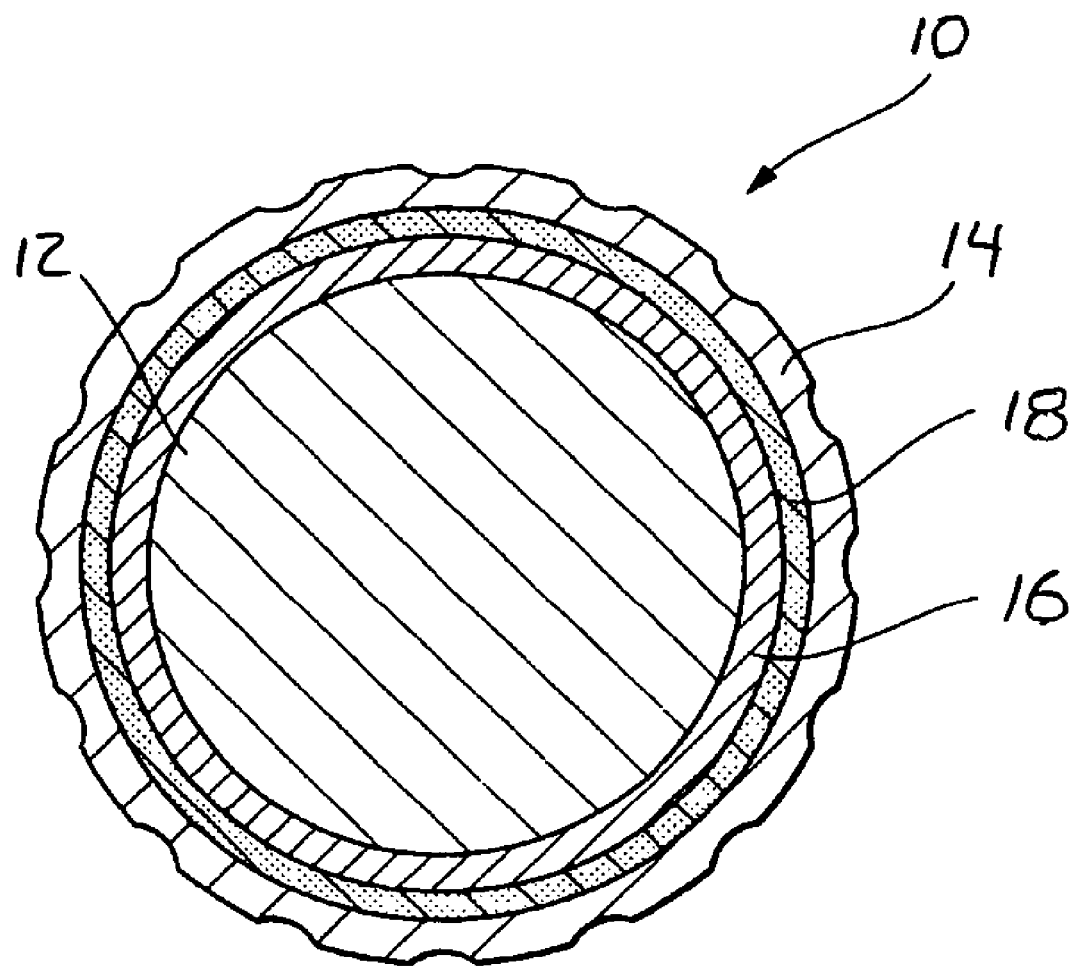

MULTI-LAYER GOLF BALL

CROSS-REFERENCE TO RELATED APPLICATION

Priority is claimed under 35 U.S.C. §119(e) to U.S. Provisional Patent Application No. 60/649,670, filed Feb. 1, 2005, and entitled "Four-Piece Golf Ball," by Eric Loper, Dean Snell, and Hyun Jin Kim, which application is incorporated by reference herein.

BACKGROUND OF THE INVENTION

This invention relates generally to multi-layered golf balls having at least two intermediate layers, such as inner mantle and outer mantle layer. In particular, this invention relates to a golf ball comprising a core, at least two intermediate layers such as inner mantle layer and outer mantle layer, and at least one cover layer, wherein the hardness of inner mantle layer and a cover layer are less than that of outer mantle layer by at least 3 on the Shore D scale. The multi-layer golf balls of the present invention provide a equal or higher ball speed and/or a higher coefficient of restitution ("C.O.R.") with a lower driver spin rate and a better playability than do analogous three piece balls having an identical core and cover layer, but having a single intermediate layer.

Until recently, golf balls typically were divided into two general types or groups: 1) two-piece balls, and 2) wound balls (also known as three-piece balls). The difference in the play characteristics of these two types of balls can be quite significant.

Wound balls typically have either a solid rubber, or liquid-filled, center around which many yards of a stretched elastic thread or yarn is wound to form a core. The wound core then is covered with a durable cover material, e.g., an ionomer or other thermoplastic material or a softer cover such as balata or cast polyurethane. Wound balls generally are softer than two-piece balls, and they provide more spin, which enables a skilled golfer to have more control over the ball's flight. In particular, it is desirable for the golfer to be able to impart backspin to the ball, for purposes of controlling its flight and controlling the action of the ball upon landing on the ground. For example, substantial backspin will make the ball stop once it strikes the landing surface instead of bounding forward. The ability to impart backspin onto a golf ball is related to the extent to which the golf ball's cover deforms when it is struck by a golf club. Because conventional wound balls are generally more deformable than are conventional two-piece balls, it is easier to impart spin to wound balls. However, higher spinning wound balls typically travel a shorter distance when struck, as compared to two-piece balls. Moreover, because wound balls generally have a more complex structure, they generally require a longer time to manufacture and are more expensive to produce than are two-piece balls.

Golf balls having a two-piece construction generally are most popular with the recreational golfer, because they are relatively durable and provide maximum distance. Two-piece balls have a single solid core, usually formed of a cross-linked rubber, which is encased by a cover. Typically, the solid core is made of polybutadiene, which is chemically cross-linked with peroxide, or sulfur compounds together with co-cross-linking agent, such as zinc diacrylate. The cover of such balls often comprises tough, cut-proof blends of one or more materials known as ionomers, which typically are ethylene/acrylic acid copolymers or ethylene/acrylic acid/acrylate terpolymers in which some or all of the acid groups are neutralized with metal cations. Such ionomers are commercially available under trademarks such as SURLYN®, which are resins sold commercially by E.I. DuPont de Nemours & Company, of Wilmington, Del., or IOTEK® which is sold commercially by ExxonMobil, of Irving, Tex.

The combination of the above-described core and cover materials provides a "hard" covered ball that is resistant to cutting and other damage caused by striking the ball with a golf club. Further, such a combination imparts a high initial velocity to the ball, which results in increased distance. Due to their hardness, however, these two-piece balls have a relatively low spin rate, which makes them difficult to control, particularly on relatively short approach shots. As such, these balls generally are considered to be "distance" balls. Because the materials of two-piece balls are very rigid, the balls typically have a hard "feel" when struck by a club. Softer cover materials, e.g., balata or softer ionomers or polyurethanes in some instances, have been employed in two-piece balls in order to provide improved "feel" and increased spin rates, although sometimes with a reduction the ball's speed or C.O.R.

The C.O.R. of a one-piece golf ball is a function of its composition. In two-piece golf balls and multi-layered golf balls, the C.O.R. is a function of the various properties of the core, the cover, and any additional layer. Although the United States Golf Association (U.S.G.A.) has not promulgated any limitations on the C.O.R. values for golf balls, it has instituted a rule prohibiting the competitive use in any U.S.G.A.-sanctioned event of a golf ball that can achieve an initial velocity greater than 76.2 meters per second (m/s), or 250 ft/s, when struck by a golf club driver having a velocity of 39.6 m/s, i.e., 130 ft/s (referred to hereinafter as "the U.S.G.A. test"). However, an allowed tolerance of two percent permits manufacturers to produce golf balls that achieve an initial velocity of 77.7 m/s (255 ft/s).

Regardless of the form of the golf ball, players generally seek a ball that delivers maximum distance, which requires a high initial velocity upon impact. Therefore, in an effort to meet the demands of the marketplace, golf ball manufacturers strive to produce balls delivering initial velocities in the U.S.G.A. test that approximate the U.S.G.A. maximum of 77.7 m/s, or 255 ft/s, as closely as possible. Golf ball manufacturers also generally strive to maximize the ball's C.O.R. without violating the velocity limitation. Also, to maximize distance, it is advantageous if the balls have a lower driver spin rate. Finally it is highly desirable if, while providing increased velocity and distance, the balls also will exhibit a soft shot feel.

Recently, several golf ball manufacturers have introduced multi-layer balls, i.e., balls having at least a core, an intermediate layer or mantle, and one or more cover layers. The goal of these manufacturers has been to overcome some of the undesirable aspects of conventional two-piece balls, e.g., their hard feel. Such a multi-layer structure allows the introduction of new materials of varying hardness, whereby deficiencies in a property in one layer can be mitigated by the introduction of a different material in another layer. For example, to optimize ball hardness and "feel," blends of copolymeric high-acid ionomers with softer terpolymeric ionomers have been used as a layer material in a golf ball but again, often with a concurrent loss of C.O.R. and/or speed.

Numerous examples of multi-layer combinations are available. For example, U.S. Pat. No. 4,431,193 discloses a golf ball having a multi-layer cover, in which the inner cover layer is a relatively hard, high flexural modulus ionomer resin and the outer cover layer is a relatively soft, low flexural modulus ionomer resin.

Also, U.S. Pat. No. 6,368,237 discloses a multi-layer golf ball comprising a core, an inner cover layer, and an outer cover layer. The inner cover layer comprises a high-acid ionomer or ionomer blend. The outer cover layer comprises a soft, very low-modulus ionomer or ionomer blend, or a non-ionomeric thermoplastic elastomer such as polyurethane, polyester, or polyesteramide. The resulting multi-layer golf ball is said provide an enhanced distance without sacrificing playability or durability when compared to known multi-layer golf balls.

U.S. Pat. Nos. 6,416,424, 6,416,424, and 6,419,594, likewise, disclose multi-layer golf balls comprising a core, an inner cover layer, and an outer cover layer. The inner cover layer comprises a low-acid ionomer blend. The outer cover layer comprises a soft, very low modulus ionomer or ionomer blend, or a non-ionomeric thermoplastic elastomer such as polyurethane, polyester, or polyesteramide. The resulting multi-layer golf ball is said to provide an enhanced distance without sacrificing playability or durability when compared to known multi-layer golf balls.

U.S. Pat. Nos. 6,503,156 and 6,506,130, likewise, disclose multi-layer golf balls comprising a core, an inner cover layer, and an outer cover layer. The inner cover layer comprises a low-acid ionomer blend. The outer cover layer comprises a soft, non-ionomeric thermoplastic or thermosetting elastomer such as polyurethane, polyester, or polyesteramide. The resulting multi-layered golf ball is said to provide an enhanced distance without sacrificing playability or durability when compared to known multi-layer golf balls.

It should be appreciated from the foregoing description that there remains a need for a golf ball that can provide maximum C.O.R. without violating the U.S.G.A. velocity limitation. Also, it is desirable for such balls to have a low driver spin rate to maximize distance, and to exhibit a soft shot feel with improved short-game playability. The present invention satisfies this need.

SUMMARY OF THE INVENTION

The present invention is embodied in a four-piece golf ball that provides maximum C.O.R. without violating the U.S.G.A. velocity limitation, and that provides both a low driver spin rate to maximize distance and a soft feel for improved short-game playability. The golf ball includes one or more core layers, an inner mantle layer surrounding the one or more core layers, an outer mantle layer surrounding the inner mantle layer, and one or more cover layers surrounding the outer mantle layer.

Preferred ball construction I preferably has the following characteristics:
Flexural modulus of Core material (F1)<30 kpsi
Flexural modulus of Inner Mantle material (F2) in the range of 15-60 kpsi
Flexural modulus of Outer Mantle material (F3) in the range of 30-120 kpsi
These moduli satisfy the following:
  F1<F2<F3
  F1<F2 at least by 3, preferably by 8, more preferably by 12 kpsi
  F2<F3 at least by 3, preferably by 8, more preferably by 12 kpsi
In more detailed features:
Compression of Core (C1) in the range of 10-100
Compression of Core and Inner Mantle (C2) in the range of 40-90
Compression of Core, Inner Mantle, and Outer Mantle (C3) in the range of 60-120
Compression of Ball (C4) in the range of 70-130
These compression values satisfy the following inequalities:
  C1<C2<C3
  C1<C2 at least by 5, more preferably by 10, and most preferably by 15 compression units
  C2<C3 at least by 5, more preferably by 10, and most preferably by 15 compression units
  C3−C4<15 compression units The inner mantle layer has a thickness of less than 0.08 inches and a Shore D hardness in the range of 20 to 70, and the outer mantle layer has a thickness in the range of 0.010 to 0.10 inches and a Shore D hardness in the range of 40 to 90. In addition, the Shore D hardness value of the outer mantle layer exceeds that of the inner mantle layer by at least 3. The preferred golf ball has a C.O.R. greater than about 0.790, at 125 ft/sec inbound velocity.

In more detailed features of the invention, the thickness of the inner mantle layer more preferably is less than 0.07 inches, more preferably still is less than 0.06 inches, and most preferably is less than 0.055 inches. In addition, the Shore D hardness of the inner mantle layer more preferably is in the range of about 25 to about 65, more preferably still is in the range of about 30 to about 65, more preferably still is in the range of about 35 to about 65, and most preferably is about 40 to 60. Further, the thickness of the outer mantle layer more preferably is in the range of 0.015 to 0.08 inches, more preferably still is in the range of 0.02 to 0.07 inches, and most preferably is in the range of 0.025 to 0.065 inches. In addition, the Shore D hardness value of the outer mantle layer more preferably is in the range of about 45 to about 85, more preferably still is in the range of about 50 to about 80, more preferably still is in the range of about 55 to about 75, and most preferably is about 60 to 75. Further, the Shore D hardness value of the outer mantle layer more preferably exceeds that of the inner mantle layer by at least 5, and most preferably by at least 7.

In other more detailed features of the invention, the one or more core layers have a diameter in the range of about 0.50 to about 1.58 inches, more preferably about 0.75 to about 1.54 inches, more preferably still about 1.00 to about 1.52 inches, more preferably still about 1.20 to about 1.52 inches, and most preferably about 1.25 to about 1.52 inches. In addition, the one or more core layers have a PGA compression in the range of about 10 to about 100, more preferably about 20 to about 90, more preferably still about 30 to about 80, and most preferably about 40 to about 80.

Preferred ball construction II preferably has the following characteristics:
Flexural modulus of Core material (F1)<30 kpsi
Flexural modulus of Inner Mantle material (F2) in the range of 25-120 kpsi
Flexural modulus of Outer Mantle material (F3) in the range of 15-60 kpsi
These moduli satisfy the following inequality:
  F2≧F3
In more detailed features of the invention:
Compression of Core (C1) in the range of 1-100
Compression of Core and Inner Mantle (C2) in the range of 60-120
Compression of Core, Inner Mantle, and Outer Mantle (C3) in the range of 60-120
Compression of Ball (C4) in the range of 70-130
These compression values satisfy the following inequalities:
  C1<C2≧C3-15, preferably C1<C2≧C3-10

C1<C2 at least by 5, more preferably by 10, and most preferably by 15 compression units C3−C4<15 compression units The inner mantle layer has a thickness of less than 0.08 inches and a Shore D hardness in the range of 40 to 90, and the outer mantle layer has a thickness in the range of 0.010 to 0.10 inches and a Shore D hardness in the range of 20 to 70. In addition, Shore D hardness value of the inner mantle layer exceeds that of the outer mantle layer by at least 3. The preferred golf ball has a C.O.R. greater than about 0.790, at 125 ft/sec inbound velocity.

In more detailed features of the invention, the thickness of the inner mantle layer is more preferably less than 0.07 inches, more preferably still less than 0.06 inches, and most preferably less than 0.055 inches. In addition, the Shore D hardness of the inner mantle layer more preferably is in the range of about 45 to about 85, more preferably still is in the range of about 50 to about 80, more preferably still is in the range of about 55 to about 75, and most preferably about 60 to 75. Further, the thickness of the outer mantle layer is more preferably in the range of 0.015 to 0.08 inches, more preferably still in the range of 0.02 to 0.07 inches, and most preferably in the range of 0.025 to 0.065 inches. In addition, the Shore D hardness value of the outer mantle layer more preferably is in the range of about 25 to about 65, more preferably still is in the range of about 30 to about 65, more preferably still is in the range of about 35 to about 65, and most preferably about 40 to 60. Further, the Shore D hardness value of the inner mantle layer more preferably exceeds that of the outer mantle layer by at least 5, and most preferably by at least 7.

In other more detailed features of the invention, the one or more core layers have a diameter in the range of about 0.50 to about 1.58 inches, preferably about 0.075 to about 1.54 inches, more preferably still about 1.00 to about 1.52 inches, more preferably still about 1.20 to about 1.52 inches, and most preferably about 1.25 to about 1.52 inches. In addition, the one or more core layers have a PGA compression in the range of about 10 to about 100, more preferably about 20 to about 90, more preferably still about 30 to about 80, and most preferably about 40 to about 80.

In yet other more detailed features of the invention at least one mantle layer and cover layer includes an ionomeric polymer that comprises:

(a) an ionomeric polymer comprising one or more E/X/Y copolymers, wherein E is ethylene, X is a $C_3$ to $C_8$ $\alpha,\beta$ ethylenically unsaturated carboxylic acid, and Y is a softening comonomer selected from the group consisting of alkyl acrylate and alkyl methacrylate, wherein the alkyl groups have from 1 to 8 carbon atoms, or ionomers of such E/X/Y copolymers, wherein X is in the range of about 5 to about 35 weight % of the E/X/Y copolymer and Y is in the range of 0 to about 50 weight % of the E/X/Y copolymer, and wherein the acid groups present in said ionomeric polymer are partially neutralized with a metal selected from the group consisting of zinc, sodium, lithium, calcium, magnesium, and combinations thereof; or (b) a bimodal ionomeric polymer comprising:
  (i) a high molecular weight component having a molecular weight in the range of about 80,000 to about 500,000 and comprising one or more ethylene/α,β-ethylenically unsaturated $C_{3-8}$ carboxylic acid copolymers and/or one or more ethylene, alkyl(meth)acrylate, (meth)acrylic acid terpolymers, wherein said high molecular weight component is partially neutralized with metal ions selected from the group consisting of lithium, sodium, zinc, calcium, magnesium, and combinations thereof, and
  (ii) a low molecular weight component having a molecular weight in the range of about 2,000 to about 30,000 and comprising one or more ethylene/α,β-ethylenically unsaturated $C_{3-8}$ carboxylic acid copolymers and/or one or more ethylene, alkyl(meth)acrylate, (meth)acrylic acid terpolymers, wherein said low molecular weight component is partially neutralized with metal ions selected from the group consisting of lithium, sodium, zinc, calcium, magnesium, and combinations thereof; or (c) a modified ionomeric polymer comprising:
  (i) a blend composition comprising:
    ethylene,
    5 to 25 weight percent (meth)acrylic acid (based on the total weight of said modified ionomeric polymer), and
    0 to 40 weight percent of a $C_1$ to $C_8$-alkyl acrylate (based on the total weight of said modified ionomeric polymer), and
    about 5 to about 45 weight percent (based on the total weight of said modified ionomeric polymer) of a fatty acid or one or more metal salts of a fatty acid, or
  (ii) a bimodal polymer blend composition comprising:
    a high molecular weight component having a molecular weight in the range of about 80,000 to about 500,000 and comprising one or more ethylene/α, β-ethylenically unsaturated $C_{3-8}$ carboxylic acid copolymers and/or one or more ethylene, alkyl (meth)acrylate, (meth)acrylic acid terpolymers, wherein said high molecular weight component is partially neutralized with metal ions selected from the group consisting of lithium, sodium, zinc, calcium, magnesium, and combinations thereof,
    a low molecular weight component having a molecular weight in the range of about 2,000 to about 30,000 and comprising one or more ethylene/α,β-ethylenically unsaturated $C_{3-8}$ carboxylic acid copolymers and/or one or more ethylene, alkyl (meth)acrylate, (meth)acrylic acid terpolymers, wherein said low molecular weight component is partially neutralized with metal ions selected from the group consisting of lithium, sodium, zinc, calcium, magnesium, and combinations thereof, and
    about 5 to about 45 weight percent (based on the total weight of said modified ionomeric polymer) of a fatty acid or one or more metal salts of a fatty acid; or (d) a blend composition comprising the reaction product of:
  (i) one or more ionomers, and
  (ii) a compound having a general formula $(R_2N)_m—R'—(X(O)_nOR_y)_m$,
  wherein R is selected from the group consisting of hydrogen,
    one or more $C_1$-$C_{20}$ aliphatic systems,
    one or more cycloaliphatic systems,
    one or more aromatic systems, and
    combinations thereof,
  wherein R' is a bridging group comprising
    one or more unsubstituted $C_1$-$C_{20}$ straight chain or branched aliphatic or alicyclic groups, or
    one or more substituted straight chain or branched aliphatic or alicyclic groups, or one or more aromatic groups, or
one or more oligomers each containing up to 12 repeating units,
wherein when X=C or S or P, m is 1-3,
wherein when X=C, n=1 and y=1,
wherein when X=S, n=2 and y=1, and
wherein when X=P, n=2 and y=2; or
(e) combinations of (a), (b), (c), and (d).

In yet other more detailed features of this invention, the composition of at least one mantle layer and cover layer comprises polymer selected from the group consisting of thermoplastic resins, thermoset resins, thermoplastic polyurethane, thermoset polyurethane, polyamide elastomer, thermoplastic copolyetherester block copolymer, thermoplastic copolyesterester block copolymer, polyethylene-octene, polybutylene-octene, polyoctenamer, polyisoprene, 1,2-syndiotactic polybutadiene, thermoplastic vulcanizate, copolymeric ionomer, terpolymeric ionomer, polyurethane ionomer, polyamide ionomer, polycarbonate, polyolefin, polyamide, copolymeric polyamide, polyester, polyvinyl alcohol, acrylonitrile-butadiene-styrene copolymer, polyarylate, polyacrylate, polyphenylene ether, impact-modified polyphenylene ether, high impact polystyrene, diallyl phthalate polymer, metallocene catalyzed polymer, styrene-acrylonitrile (SAN) (including olefin-modified SAN and acrylonitrile-styrene-acrylonitrile), styrene-maleic anhydride (S/MA) polymer, styrenic copolymer, functionalized styrenic copolymer, functionalized styrenic terpolymer, styrenic terpolymer, cellulose polymer, liquid crystal polymer (LCP), ethylene-propylene-diene terpolymer (EPDM), ethylene-vinyl acetate copolymers (EVA), ethylene-propylene copolymer, ethylene vinyl acetate, polyurea, polysiloxane, and combinations thereof.

In yet another more detailed feature of this invention, the composition of the inner mantle layer and/or the outer mantle layer can comprise at least one hardness-enhancing material, the hardness enhancing material including at least a quantity of continuous or non-continuous fiber elements. The fiber elements that can be used in the inner mantle layer and/or the outer mantle layer include fiber elements selected from the among the categories of glass fiber elements, carbon fiber elements, aramid fiber elements, and metallic fiber elements. The latter can include copper, high tensile steel, and stainless steel fiber elements.

In preferred embodiments, the quantity of fiber elements include about 1 weight percent to about 50 weight percent of the inner mantle layer and/or the outer mantle layer, preferably about 5 weight percent to about 40 weight percent of the inner mantle layer and/or the outer mantle layer, more preferably about 10 weight percent to about 30 weight percent of the inner mantle layer and/or the outer mantle layer, and even more preferably about 15 weight percent to about 20 weight percent of the inner mantle layer and/or the outer mantle layer.

In yet another more detailed feature of this invention, the composition of the inner mantle layer and/or the outer mantle layer can comprise one or more nanofillers substantially dispersed in the thermoplastic or thermoset matrix polymer. Nanofiller comprises particles of inorganic material having a largest dimension that is about one micron or less and that is at least an order of magnitude greater than such particle's smallest dimension.

More particularly, the nanofiller is present in the thermoplastic or thermoset polymer in an amount of about 0.1% to 20%, preferably from 0.1% to 15%, even more preferably from about 0.1% to 10%, and most preferably from about 0.5% to 5% by weight.

Even more particularly, the nanofiller is dispersed in the thermoplastic or thermoset matrix polymer in an intercalated or exfoliated manner.

In yet other more detailed features of the invention, the one or more core layers can include a modified ionomeric polymer comprising (1) at least one unsaturated polymers, (2) at least one cross-linking agent, (3) at least one co-cross-linking agent, (4) optionally at least one peptizer, (5) optionally at least one accelerator, and (6) optionally at least one filler. The unsaturated polymer has a Mooney viscosity ($ML_{1+4}(100°$ C.)) in the range of preferably about 20 to about 80, more preferably about 30 to 60, and most preferably about 35 to about 50, and it is selected from the group consisting of 1,2-polybutadiene, cis-1,4-polybutadiene, trans-1,4-polybutadiene, cis-polyisoprene, trans-polyisoprene, polychloroprene, polybutylene, styrene-butadiene rubber, styrene-butadiene-styrene block copolymer and partially and fully hydrogenated equivalents, styrene-isoprene-styrene block copolymer and partially and fully hydrogenated equivalents, nitrile rubber, silicone rubber, and polyurethane, and combinations thereof.

Further, the cross-linking agent is present in an amount of preferably about 0.05 to about 5 parts, more preferably about 0.2 to about 3 parts, and most preferably about 0.2 to 2 parts, by weight of the cross-linking agents per 100 parts by weight of the unsaturated polymer.

Further, the peptizer, if present, preferably includes an organic sulfur compound, a metal salt of an organic sulfur compound, a non-metal salt of an organic sulfur compound, or combinations of those. In addition, the peptizer, if present, is present in an amount in the range of about 0.01 to about 10 parts, and more preferably about 0.1 to about 7 parts, by weight per 100 parts by weight of the unsaturated polymer component. Further, the peptizer, if present, is selected from the group consisting of organic sulfur compounds, metal salts of an organic sulfur compound, non-metal salt of an organic sulfur compound, and combinations thereof. More preferably, the peptizer, if present, is selected from the group consisting of pentachlorothiophenol, dibenzamido diphenyldisulfide, a metal salt of pentachlorothiophenol, an ammonium salt of pentachlorothiophenol with the ammonium cation having the general formula $[NR^1R^2R^3R^4]^+$ where $R^1$, $R^2$, $R^3$, and $R^4$ is either hydrogen, or a $C_1$-$C_{20}$ aliphatic, cycloaliphatic or aromatic system, and combinations thereof. Most preferably, the peptizer, if present, is selected from the group consisting of pentachlorothiophenol, the zinc salt of pentachlorothiophenol, the $NH_4^+$ salt of pentachlorothiophenol, and combinations thereof and is present in an amount of from about 0.15 to about 5 parts by weight per 100 parts by weight of the unsaturated polymer component.

Further, the accelerator, if present, preferably is present in an amount of about 0.1 to about 10 parts, more preferably about 0.2 to about 5 parts, and most preferably about 0.5 to about 1.5 parts, by weight per 100 parts by weight of the unsaturated polymer. The accelerator preferably is selected from the group consisting of 2-mercaptobenzothiazole and a salt of 2-mercaptobenzothiazole.

Finally, the filler, if present, preferably is selected from the group consisting of precipitated hydrated silica, limestone, clay, talc, asbestos, barytes, glass fibers, aramid fibers, mica, calcium metasilicate, barium sulfate, zinc sulfide, lithopone, silicates, silicon carbide, diatomaceous earth, carbonates such as calcium or magnesium or barium carbonate, sulfates such as calcium or magnesium or barium sulfate, metals, including tungsten steel copper, cobalt or iron, metal alloys, tungsten carbide, metal oxides, metal stearates, other particulate carbonaceous materials, and combinations thereof.

In yet other more detailed features of the invention, the core includes at least one cross-linking agent having a first characteristic decomposition temperature less than 150° C. for a $t_{1/2}$ equal to 0.1 hour, and at least one cross-linking agent having a second characteristic decomposition temperature greater than 150° C. for a $t_{1/2}$ equal to 0.1 hour. The composition weight ratio of the cross-linking agents having the different characteristic decomposition temperatures ranges from 5:95 to 95:5, or more preferably ranges from 10:90 to 50:50.

Other features and advantages of the invention should become apparent from the following description of the preferred embodiments, taken in conjunction with the accompanying drawing, which illustrates, by way of example, the principles of the invention.

BRIEF DESCRIPTION OF THE DRAWING

The FIGURE depicts a four-piece golf ball (not to scale) embodying the invention.

DESCRIPTION OF THE PREFERRED EMBODIMENTS

Ball Construction I
Flexural modulus of Core material (F1)<30 kpsi
Flexural modulus of Inner Mantle material (F2) in the range of 15-60 kpsi
Flexural modulus of Outer Mantle material (F3) in the range of 30-120 kpsi
These satisfy the following inequalities:
  F1<F2<F3
  F1<F2 at least by 3, more preferably by 8, and most preferably by 12 kpsi
  F2<F3 at least by 3, more preferably by 8, and most preferably by 12 kpsi
In more detailed features of the invention:
Compression of Core (C1) in the range of 10-100
Compression of Core and Inner Mantle (C2) in the range of 40-90
Compression of Core, Inner Mantle, and Outer Mantle (C3) in the range of 60-120
Compression of Ball (C4) in the range of 70-130
These compression values satisfy the following inequalities:
  C1<C2<C3
  C1<C2 at least by 5, more preferably by at least 10, and most preferably by at least 15 compression units
  C2<C3 at least by 5, more preferably by at least 10, and most preferably by at least 15 compression units
  C3−C4<15 compression units The inner mantle layer has a thickness of less than 0.08 inches and a Shore D hardness in the range of 20 to 70, and the outer mantle layer has a thickness in the range of 0.010 to 0.10 inches and a Shore D hardness in the range of 40 to 90. In addition, Shore D hardness value of the outer mantle layer exceeds that of the inner mantle layer by at least 3. The preferred golf ball has a C.O.R. greater than about 0.790, at 125 ft/sec inbound velocity.

In more detailed features of the invention, the thickness of the inner mantle layer is more preferably less than 0.07 inches, more preferably still less than 0.06 inches, and most preferably less than 0.055 inches. In addition, the Shore D hardness of the inner mantle layer more preferably is in the range of about 25 to about 65, more preferably still is in the range of about 30 to about 65, more preferably still is in the range of about 35 to about 65 and most preferably about 40 to 60. Further, the thickness of the outer mantle layer is more preferably in the range of 0.015 to 0.08 inches, more preferably still in the range of 0.02 to 0.07 inches, and most preferably in the range of 0.025 to 0.065 inches. In addition, the Shore D hardness value of the outer mantle layer more preferably is in the range of about 45 to about 85, more preferably still is in the range of about 50 to about 80, more preferably still is in the range of about 55 to about 75 and most preferably about 60 to 75. Further, the Shore D hardness value of the outer mantle layer more preferably exceeds that of the inner mantle layer by at least 5, and most preferably by at least 7.

In other more detailed features of the invention, the one or more core layers have a diameter in the range of about 0.50 to about 1.58 inches, preferably about 0.75 to about 1.54 inches, more preferably still about 1.00 to about 1.52 inches, more preferably still about 1.20 to about 1.52 inches, and most preferably about 1.25 to about 1.52 inches. In addition, the one or more core layers have a PGA compression in the range of about 10 to about 100, more preferably about 20 to about 90, more preferably still about 30 to about 80, and most preferably about 40 to about 80.

Ball Construction II
Flexural modulus of Core material (F1)<30 kpsi
Flexural modulus of Inner Mantle material (F2) in the range of 25-120 kpsi
Flexural modulus of Outer Mantle material (F3) in the range of 15-60 kpsi
These moduli satisfy the following:
  F2>=F3
In more detailed features of the invention:
Compression of Core (C1) in the range of 10-100
Compression of Core and Inner Mantle (C2) in the range of 60-120
Compression of Core, Inner Mantle, and Outer Mantle (C3) in the range of 60-120
Compression of Ball (C4) in the range of 70-130
These compression values satisfy the following inequalities:
  C1<C2≧C3−15,preferably C1<C2≧C3−10
  C1<C2 by at least 5, more preferably by at least 10, and most preferably by at least 15 compression units
  C3−C4<15 compression units The inner mantle layer has a thickness of less than 0.08 inches and a Shore D hardness in the range of 40 to 90, and the outer mantle layer has a thickness in the range of 0.010 to 0.10 inches and a Shore D hardness in the range of 20 to 70. In addition, Shore D hardness value of the inner mantle layer exceeds that of the outer mantle layer by at least 3. The preferred golf ball has a C.O.R. greater than about 0.790, at 125 ft/sec inbound velocity.

In more detailed features of the invention, the thickness of the inner mantle layer is more preferably less than 0.07 inches, more preferably still less than 0.06 inches, and most preferably less than 0.055 inches. In addition, the Shore D hardness of the inner mantle layer more preferably is in the range of about 45 to about 85, more preferably still is in the range of about 50 to about 80, more preferably still is in the range of about 55 to about 75, and most preferably about 60 to 75. Further, the thickness of the outer mantle layer is more preferably in the range of 0.015 to 0.08 inches, more preferably still in the range of 0.02 to 0.07 inches, and most preferably in the range of 0.025 to 0.065 inches. In addition, the Shore D hardness value of the outer mantle layer more preferably is in the range of about 25 to about 65, more preferably still is in the range of about 30 to about 65, more preferably still is in the range of about 35 to about 65, and most preferably about 40 to 60. Further, the Shore D hardness value of the inner mantle layer more preferably exceeds that of the outer mantle layer by at least 5, and most preferably by at least 7.

In other more detailed features of the invention, the one or more core layers have a diameter in the range of about 0.50 to about 1.58 inches, preferably about 0.075 to about 1.54 inches, more preferably still about 1.00 to about 1.52 inches, more preferably still about 1.20 to about 1.52 inches, and most preferably about 1.25 to about 1.52 inches. In addition, the one or more core layers have a PGA compression in the range of about 10 to about 100, more preferably about 20 to about 90, more preferably still about 30 to about 80, and most preferably about 40 to about 80.

The golf ball 10 of the present invention preferably has a coefficient of restitution ("C.O.R.") preferably greater than about 0.790, more preferably greater than about 0.795, and most preferably greater than about 0.800, at an inbound velocity of 125 ft/sec. At an inbound velocity of 143 ft/sec, the C.O.R. preferably is greater than about 0.780, more preferably is greater than about 0.790, more preferably still is greater than about 0.795, and most preferably is greater than about 0.800.

A. Preferred Compositions of the Inner Mantle and Outer Mantle Layer 14

The inner mantle layer 14 and/or the outer mantle layer comprise one or more so-called "modified ionomers," examples of which are described in U.S. Pat. Nos. 6,100,321, 6,329,458, and 6,616,552, and in U.S. Patent Application Publication No. US 2003/0158312 A1, the entire contents of all of which are incorporated by reference.

More particularly, the inner mantle layer 14 and/or the outer mantle layer preferably comprise one or more modified ionomeric polymers prepared by mixing a) an ionomeric polymer comprising ethylene, 5 to 25 weight percent (meth)acrylic acid, and 0 to 40 weight percent of a $C_1$-$C_8$ (meth)acrylate monomer, wherein the ionomeric polymer is neutralized with metal ions selected from the group consisting of lithium, sodium, zinc, calcium, magnesium, and a mixture of any these; and b) one or more fatty acids or metal salts of a fatty acid, wherein the metal is selected from the group consisting of calcium, sodium, zinc, lithium, barium, and magnesium, and wherein the fatty acid preferably is stearic acid.

The fatty or waxy acid salts utilized in the inner mantle layer 14 are composed of a chain of alkyl groups containing about 4 to about 75 carbon atoms (usually even numbered) and characterized by a —COOH terminal group. The generic formula for all fatty and waxy acids above acetic acid is $CH_3(CH_2)X\ COOH$, wherein the carbon atom count includes the carboxyl group. The fatty or waxy acids utilized to produce the fatty or waxy acid salts incorporated into the inner mantle layer may be saturated or unsaturated, and they may be present in either solid, semi-solid, or liquid form.

Examples of suitable saturated fatty acids, i.e., fatty acids in which the carbon atoms of the alkyl chain are connected by single bonds, include but are not limited to stearic acid ($C_{18}$, i.e. $CH_3(CH_2)_{16}COOH$), palmitic acid ($C_{16}$, i.e., $CH_3(CH_2)_{14}COOH$), pelargonic acid ($C_9$, i.e., $CH_3(CH_2)_7COOH$), and lauric acid ($C_{12}$, i.e., $CH_3(CH_2)_{10}COOH$). An example of a suitable unsaturated fatty acids, i.e., a fatty acid having one or more double bonds between the carbon atoms in the alkyl chain, includes but is not limited to oleic acid ($C_{13}$, i.e., $CH_3(CH_2)_7CH:CH(CH_2)_7\ COOH$).

The source of the metal ions used to produce the metal salts of the fatty or waxy acid salts also incorporated into the invention are generally various metal salts that provide the metal ions capable of neutralizing, to various extents, the carboxylic acid groups of the fatty acids. These include the sulfate, carbonate, acetate, and hydroxylate salts of zinc, barium, calcium, and magnesium.

Because the fatty acid salts utilized in the invention comprise various combinations of fatty acids neutralized with a large number of different metal ions, several different types of fatty acid salts may be utilized in the invention, including metal stearates, laureates, oleates, and palmitates, with calcium, zinc, sodium, and magnesium stearate being preferred, and with calcium and sodium stearate being most preferred.

The fatty or waxy acid or metal salt of the fatty or waxy acid is present in the modified ionomeric polymers in an amount in the range of preferably about 5 to about 45, more preferably about 7 to about 35, and most preferably about 8 to about 20, weight percent (based on the total weight of the modified ionomeric polymer).

As a result of the addition of the one or more metal salts of a fatty or waxy acid, preferably about 40 to 100, more preferably about 50 to 100, and most preferably about 70 to 100, percent of the acidic groups in the final modified ionomeric polymer composition are neutralized by a metal ion.

An example of such a modified ionomer polymer is DuPont® HPF-1000, available from E. I DuPont de Nemours and Co. Inc.

Other examples of modified ionomeric polymers for use as the inner mantle layer 14 are those prepared by modifying (again with one or more metal salts of a fatty or waxy acid) ionomers based on the so-called bimodal ethylene/carboxylic acid polymers, as described in U.S. Pat. No. 6,562,906, the entire contents of which are herein incorporated by reference. These polymers are bimodal, because they result from blending two polymers of different molecular weights. The modified bimodal ionomeric polymers comprise:

a high molecular weight component having a molecular weight of about 80,000 to about 500,000 and comprising one or more ethylene/α,β-ethylenically unsaturated $C_{3-8}$ carboxylic acid copolymers and/or one or more ethylene, alkyl(meth)acrylate, (meth)acrylic acid terpolymers; wherein the high molecular weight component is partially neutralized with metal ions selected from the group consisting of lithium, sodium, zinc, calcium, magnesium, and mixtures of any of these; and a low molecular weight component having a molecular weight of about 2,000 to about 30,000 and comprising one or more ethylene/α,β-ethylenically unsaturated $C_{3-8}$ carboxylic acid copolymers and/or one or more ethylene, alkyl(meth)acrylate, (meth)acrylic acid terpolymers; wherein the low molecular weight component is partially neutralized with metal ions selected from the group consisting of lithium, sodium, zinc, calcium, magnesium, and mixtures of any of these; and about 5 to about 45 weight percent (based on the total weight of the modified ionomeric polymer) of one or more fatty acids or metal salts of a fatty acid wherein the metal is selected from the group consisting of calcium, sodium, zinc, lithium, barium, and magnesium, and wherein the fatty acid preferably is stearic acid.

Again, the fatty or waxy acid salts utilized in the modified bimodal ionomeric polymers are composed of a chain of alkyl groups containing about 4 to about 75 carbon atoms (usually even numbered) and characterized by a —COOH terminal group. The generic formula for all fatty or waxy acids above acetic acid is $CH_3(CH_2)X\ COOH$, wherein the carbon atom count includes the carboxyl group. The fatty or waxy acids utilized to produce the fatty or waxy acid salts incorporated into the invention may be saturated or unsaturated, and they may be present in either solid, semi-solid, or liquid form.

Examples of suitable saturated fatty acids, i.e., fatty acids in which the carbon atoms of the alkyl chain are connected by single bonds, include but are not limited to stearic acid ($C_{18}$, i.e., $CH_3(CH_2)_{16}COOH$), palmitic acid ($C_{16}$, i.e., $CH_3(CH_2)_{14}COOH$), pelargonic acid ($C_9$, i.e., $CH_3(CH_2)_7COOH$), and lauric acid ($C_{12}$, i.e., $CH_3(CH_2)_{10}COOH$). An example of a suitable unsaturated fatty acid, i.e., a fatty acid having one or more double bonds between the carbon atoms in the alkyl chain, includes but is not limited to oleic acid ($C_{13}$, i.e., $CH_3(CH_2)_7CH:CH(CH_2)_7COOH$).

The source of the metal ions used to produce the metal salts of the fatty or waxy acid salts also incorporated into the invention generally are various metal salts that provide the metal ions capable of neutralizing, to various extents, the carboxylic acid groups of the fatty acids. These include the sulfate, carbonate, acetate, and hydroxylate salts of zinc, barium, calcium, and magnesium.

Because the fatty or waxy acid salts utilized in the invention comprise various combinations of fatty or waxy acids neutralized with a large number of different metal ions, several different types of fatty acid salts may be utilized in the invention, including metal stearates, laureates, oleates, and palmitates, with calcium, zinc, sodium, and magnesium stearate being preferred, and with calcium and sodium stearate being most preferred.

The fatty or waxy acid or metal salt of the fatty or waxy acid in the modified bimodal ionomeric polymers is present in an amount of preferably about 5 to about 45, more preferably about 7 to about 35, and most preferably about 8 to about 20, weight percent (based on the total weight of the modified ionomeric polymer).

Again, as a result of the addition of the fatty or waxy acids or one or more metal salts of a fatty or waxy acid, preferably about 40 to 100, more about 50 to 100, and most preferably about 70 to 100, percent of the acidic groups in the final modified bimodal ionomeric polymer composition are neutralized by a metal ion.

Another example of a preferred ionomeric resin for composition of the inner mantle layer 14 is a blend comprising the reaction product of three Components, (A), (B) and (C), which are characterized as follows:

Component (A) is a polymer comprising ethylene and/or an alpha olefin; and one or more $\alpha,\beta$-ethylenically unsaturated $C_3$-$C_{20}$ carboxylic acids, sulfonic acids or phosphoric acids.

Component (B) is a compound having a general formula $(R_2N)_m$—R'—$(X(O)_nOR_y)_m$, where R is either hydrogen, one or more $C_1$-$C_{20}$ aliphatic systems, one or more cycloaliphatic systems, one or more aromatic systems, or a combination of these. Also R' is a bridging group comprising one or more unsubstituted $C_1$-$C_{20}$ straight chain or branched aliphatic or alicyclic groups, or one or more substituted straight chain or branched aliphatic or alicyclic groups, or one or more aromatic groups, one or more oligomers each containing up to 12 repeating units, and when X is C or S or P, m is 1-3. Also when X=C, n=1 and y=1, and when X=S, n=2 and y=1, and when X=P, n=2 and y=2.

Finally, Component (C) is a basic metal ion salt, which has the capacity to neutralize some, or all of the acidic group present in Blend Components (A) and (B).

More particularly, Component (A) is an ethylene/$\alpha,\beta$-ethylenically unsaturated $C_3$-$C_{20}$ carboxylic acid copolymer or an ethylene/$\alpha,\beta$-ethylenically unsaturated $C_3$-$C_{20}$ carboxylic acid/$\alpha,\beta$-ethylenically unsaturated $C_3$-$C_{20}$ carboxylic acid ester terpolymer. Component (B) is present in an amount from about 0.1 to about 40 phr; and Component (C) is a basic metal ion salt having a cation selected from the group consisting of $Li^+$, $Na^+$, $K^+$, $Zn^{2+}$, $Ca^{2+}$, $Co^{2+}$, $Ni^{2+}$, $Cu^{2+}$, $Pb^{2+}$, $Mg^{2+}$.

Even more particularly, Component (A) is a unimodal ethylene/(meth)acrylic acid copolymer or ethylene/(meth)acrylic acid/(meth)acrylate terpolymer; or a bimodal polymer blend composition. The bimodal polymer blend includes a high molecular weight component having molecular weight of about 80,000 to about 500,000 and comprising one or more ethylene/$\alpha,\beta$-ethylenically unsaturated $C_{3-8}$ carboxylic acid copolymers and/or one or more ethylene, alkyl(meth)acrylate, (meth)acrylic acid terpolymers; which is partially neutralized with metal ions selected from the group consisting of lithium, sodium, zinc, calcium, magnesium, and combinations thereof. The bimodal polymer blend also includes a low molecular weight component having a molecular weight of about from about 2,000 to about 30,000 and comprising one or more ethylene/$\alpha,\beta$-ethylenically unsaturated $C_{3-8}$ carboxylic acid copolymers and/or one or more ethylene, alkyl (meth)acrylate, (meth)acrylic acid terpolymers; said low molecular weight component being partially neutralized with metal ions selected from the group consisting of lithium, sodium, zinc, calcium, magnesium, and combinations thereof. Also Component (B) is is present in an amount from about 1 to about 20 phr, and is selected from the group consisting of amino acids, polypeptides, carbamic acids, oxamic acids, anthranillic acids, and combinations thereof. Finally, Component (C) is a basic metal ion salt having a cation selected from the group consisting of $Li^+$, $Na^+$, $K^+$, $Zn^{2+}$, and $Mg^{2+}$, and combinations thereof.

In a more detailed feature of the invention, Component (A) is a unimodal ethylene/(meth)acrylic acid copolymer or ethylene/(meth)acrylic acid/(meth)acrylate terpolymer. Also, Component (B) is present in an amount from about 1 to about 15 phr, and is either 4,4'-methylene-bis-(cyclohexylamine) carbamate), 11-aminoundecanoicacid, 12-aminododecanoic acid, epsilon-caprolactam; omega-caprolactam, or a combinations of these. Finally, Component (C), is either a metal formate, metal acetate, metal nitrate, metal carbonate, metal bicarbonate, metal oxide, metal hydroxide, metal alkoxides, or a combination of these.

In yet other more detailed features of this invention, the composition of at least one mantle layer and cover layer comprises polymer selected from the group consisting of thermoplastic resins, thermoset resins, thermoplastic polyurethane, thermoset polyurethane, polyamide elastomer, thermoplastic copolyetherester block copolymer, thermoplastic copolyesterester block copolymer, polyethylene-octene, polybutylene-octene, polyoctenamer, polyisoprene, 1,2-syndiotactic polybutadiene, thermoplastic vulcanizate, copolymeric ionomer, terpolymeric ionomer, polyurethane ionomer, polyamide ionomer, polycarbonate, polyolefin, polyamide, copolymeric polyamide, polyester, polyvinyl alcohol, acrylonitrile-butadiene-styrene copolymer, polyarylate, polyacrylate, polyphenylene ether, impact-modified polyphenylene ether, high impact polystyrene, diallyl phthalate polymer, metallocene catalyzed polymer, styrene-acrylonitrile (SAN) (including olefin-modified SAN and acrylonitrile-styrene-acrylonitrile), styrene-maleic anhydride (S/MA) polymer, styrenic copolymer, functionalized styrenic copolymer, functionalized styrenic terpolymer, styrenic terpolymer, cellulose polymer, liquid crystal polymer (LCP), ethylene-propylene-diene terpolymer (EPDM), ethylene-vinyl acetate copolymers (EVA), ethylene-propylene copolymer, ethylene vinyl acetate, polyurea, polysiloxane, and combinations thereof.

Examples of suitable thermoplastic resins for the inner mantle layer and/or outer mantle layer comprise polyamide, copolyamide, polyester, copolyester, polycarbonate, polyolefin including ethylene copolymers with (meth)acrylic acid and (meth)acrylate esters, polyphenylene oxide, polyphenylene sulfide, polyimide, polystyrene, polyvinyl chloride, polyurethane, thermoplastic elastomer, thermoplastic vulcanizates and fluoropolymer.

Examples of suitable elastomers for the inner mantle layer and/or outer mantle layer comprise polyester thermoplastic urethane, polyether thermoplastic urethane, copolyetherester elastomer, copolyesterester elastomer, polyamide elastomer, olefinic elastomer, ethylene-vinyl acetate copolymers, rubber-based copolymer, cyclic olefin copolymer, and olefinic thermoplastic elastomer.

Examples of olefinic thermoplastic elastomers for the inner mantle layer and/or outer mantle layer comprise metallocene-catalyzed polyolefins, ethylene-octene copolymer, ethylene-butene copolymer, and ethylene-propylene copolymers all with or without controlled tacticity as well as blends of polyolefins having ethyl-propylene-non-conjugated diene terpolymer, rubber-based copolymer, and dynamically vulcanized rubber-based copolymer. Examples of these include products sold under the trademarks SANTOPRENE, DYTRON, VISAFLEX, and VYRAM, by Advanced Elastomeric Systems of Houston, Tex., and SARLINK, by DSM of Haarlen, the Netherlands.

Examples of rubber-based copolymers for the inner mantle layer and/or outer mantle layer comprise multiblock rubber-based copolymers, particularly those in which the rubber block component is based on butadiene, isoprene, or ethylene/butylene. The non-rubber repeating units of the copolymer may be derived from any suitable monomers, including meth(acrylate) esters, such as methyl methacrylate and cyclohexylmethacrylate, and vinyl arylenes, such as styrene. Examples of styrenic copolymers resins for inner mantle or outer mantle layer are manufactured by Kraton Polymers (formerly of Shell Chemicals) under the trademarks KRATON D (for styrene-butadiene-styrene and styrene-isoprene-styrene types) and KRATON G (for styrene-ethylene-butylene-styrene and styrene-ethylene-propylene-styrene types) and Kuraray under the trademark SEPTON. Examples of randomly distributed styrenic polymers for inner mantle or outer mantle layer comprise paramethylstyrene-isobutylene (isobutene) copolymers developed by ExxonMobil Chemical Corporation and styrene-butadiene random copolymers developed by Chevron Phillips Chemical Corp.

Examples of copolyester elastomers for the inner mantle layer and/or outer mantle layer comprise polyether ester block copolymers, polylactone ester block copolymers, and aliphatic and aromatic dicarboxylic acid copolymerized polyesters. Polyether ester block copolymers are copolymers comprising polyester hard segments polymerized from a dicarboxylic acid and a low molecular weight diol, and polyether soft segments polymerized from an alkylene glycol having 2 to 10 atoms. Polylactone ester block copolymers are copolymers having polylactone chains instead of polyether as the soft segments discussed above for polyether ester block copolymers. Aliphatic and aromatic dicarboxylic copolymerized polyesters are copolymers of an acid component selected from aromatic dicarboxylic acids, such as terephthalic acid and isophthalic acid, and aliphatic acids having 2 to 10 carbon atoms with at least one diol component, selected from aliphatic and alicyclic diols having 2 to 10 carbon atoms. Blends of an aromatic polyester and an aliphatic polyester also may be used for these. Examples of these include products marketed under the trademarks HYTREL by E.I. DuPont de Nemours & Company, and SKYPEL by S.K. Chemicals of Seoul, South Korea.

Examples of thermoplastic elastomers suitable for the inner mantle layer and/or outer mantle layer comprise those having functional groups, such as carboxylic acid, maleic anhydride, glycidyl, norbonene, and hydroxyl functionalities. An example of these includes a block polymer having at least one polymer block A comprising an aromatic vinyl compound and at least one polymer block B comprising a conjugated diene compound, and having a hydroxyl group at the terminal block copolymer, or its hydrogenated product. An example of this polymer is sold under the trademark SEPTON HG-252 by Kuraray Company of Kurashiki, Japan. Other examples of these include: maleic anhydride functionalized triblock copolymer consisting of polystyrene end blocks and poly(ethylene/butylene), sold under the trademark KRATON FG 1901X by Shell Chemical Company; maleic anhydride modified ethylene-vinyl acetate copolymer, sold under the trademark FUSABOND by E.I. DuPont de Nemours & Company; ethylene-isobutyl acrylate-methacrylic acid terpolymer, sold under the trademark NUCREL by E.I. DuPont de Nemours & Company; ethylene-ethyl acrylate-methacrylic anhydride terpolymer, sold under the trademark BONDINE AX 8390 and 8060 by Sumitomo Chemical Industries; brominated styrene-isobutylene copolymers sold under the trademark BROMO XP-50 by Exxon Mobil Corporation; and resins having glycidyl or maleic anhydride functional groups sold under the trademark LOTADER by Elf Atochem of Puteaux, France.

Styrenic block copolymers is a copolymer of styrene with either butadiene, isoprene, or a mixture of the two. Additional unsaturated monomers may be added to the structure of the styrenic block copolymer as needed for property modification of the resulting SBC/urethane copolymer. The styrenic block copolymer can be a diblock or a triblock styrenic polymer. Examples of such styrenic block copolymers are described in, for example, U.S. Pat. No. 5,436,295 to Nishikawa et al. The styrenic block copolymer can have any known molecular weight for such polymers, and it can possess a linear, branched, star, dendrimeric or combination molecular structure. The styrenic block copolymer can be unmodified by functional groups, or it can be modified by hydroxyl group, carboxyl group, or other functional groups, either in its chain structure or at one or more terminus. The styrenic block copolymer can be obtained using any common process for manufacture of such polymers. The styrenic block copolymers also may be hydrogenated using well-known methods to obtain a partially or fully saturated diene monomer block.

Examples of polyamide elastomers for the inner mantle layer and/or outer mantle layer comprise polyether amide elastomers, such as polyether amide block copolymer. Examples of these are sold under the trademark PEBAX by Elf Atochem. Mixtures of all of the above-mentioned resins also can be used in the present invention, as can many other known types of polymer. Preferred polymer mixtures include thermoplastic elastomer blends with one or more of the group consisting of ionomers, polyolefins including ethylene copolymers with (meth)acrylic acid and (meth)acrylate esters, and polyamides.

Polyamide Blends in the Mantle Composition

In yet another more detailed feature of this invention, the composition of inner mantle layer and/or the outer mantle layer comprises polyamide or copolymeric polyamide obtained by: 1) polycondensation of a dicarboxylic acid, such as oxalic acid, adipic acid, sebacic acid, terephthalic acid, isophthalic acid or 1,4 cyclohexylidicarboxylic acid, with a diamine, such as ethylenediamine, tetramethylenediamine, pentamethylenediamine, hexamethylenediamine or decamethylenediamine, 1,4-cyclohexyldiamine or m-xylylenediamine, 2) a ring-opening polymerization of cyclic lactam, such as ε-caprolactam or ω-laurolactam; polycondensation of an aminocarboxylic acid, such as 6-aminocaproic acid, 9-aminononaoic acid, 11-aminoudecanoic acid or 12-aminododecanoic acid, or 3) copolymerization of a cyclic lactam with a dicarboxylic acid and a diamine. Non-limited but some examples of suitable polyamides include polyamide 6; polyamide 11; polyamide 12; polyamide 4,6; polyamide 6,6; polyamide 6,9; polyamide 6,10; polyamide 6,12; PA12,CX; PA12, IT; PPA; PA6, IT; PA6/PPE. Non-limited but some examples of suitable polyamide or copolymeric polyamide for use in the inner mantle and/or the outer mantle layer include those sold under the trademarks, PEBAX, CRISTAMID and RILSAN marketed by ATOFINA Chemicals of Philadelphia, Pa., GRILAMID marketed by EMS-CHEMIE of Sumter, S.C., and ZYTEL marketed by E.I. DuPont de Nemours & Co. of Wilmington, Del.

The composition preferably includes a second polymer having a Shore D hardness less than about 70, more preferably less than about 60, still more preferably less than about 50, and most preferably less than about 40. The second polymer preferably has a flexural modulus less than about 70,000 psi, more preferably less than about 60,000 psi, still more preferably less than about 50,000 psi, and most preferably less than about 40,000 psi.

Particularly preferred second polymers in the composition include copolymeric ionomer, terpolymeric ionomer, bi-modal ionomer, fully neutralized ionomer, polyamide, co-polyetheramide elastomer, polyarylate, polyolefin, polyolefinic copolymer, functionalized polyolefinic copolymer, polyoctenamer, polyurethane, styrenic block copolymer, functionlized styrenic block copolymer, partially-saturated styrenic block copolymer, fully-saturated styrenic block copolymer, metallocen catalyzed polymer, and polyester. Non-limited but some examples of suitable second polymer for use in the inner mantle and/or the outer mantle layer include those sold under the trademarks, PEBAX and LOTADER marketed by ATOFINA Chemicals of Philadelphia, Pa.; HYTREL, FUSABOND, and NUCREL marketed by E.I. DuPont de Nemours & Co. of Wilmington, Del.; SKYPEL and SKYTHANE by S.K. Chemicals of Seoul, South Korea; SEPTON and HYBRAR marketed by Kuraray Company of Kurashiki, Japan; ESTHANE by Noveon; KRATON marketed by Kraton Polymers, and VESTENAMER marketed by Deggusa.

Styrenic Block Copolymer in the Mantle Composition

In yet another more detailed feature of this invention, the composition of inner mantle layer and/or the outer mantle layer comprises a hydrogenated diene block copolymer having a polystyrene-reduced number-average molecular weight of 50,000 to 600,000. Each specified block copolymer is a hydrogenation product of either: (i) an A-B block copolymer, in which A is an alkenyl aromatic compound polymer block, and B is either (1) a conjugated diene homopolymer block, in which the vinyl content of the conjugated diene portion is more than 60%, or (2) an alkenyl aromatic compound-conjugated diene random copolymer block having 15% to 60% of vinyl content of the conjugated diene portion; or (ii) an A-B-C block copolymer in which A and B are as defined above, and C is an alkenyl aromatic compound-conjugated diene copolymer tapered block, in which the proportion of the alkenyl aromatic compound increases gradually; or (iii) an A-B-A block copolymer in which A and B are as defined above. In the specified block copolymer, the weight proportion of the alkenyl aromatic compound to the conjugated diene is from 5/95 to 60/40. Also, in the specified block copolymer, the content of the bound alkenyl aromatic compound in at least one block A is at least 3% by weight, and the total of the bound alkenyl aromatic compound contents in the two block A's or the block A and the block C is 3% to 50% by weight based on the total monomers. In the specified block copolymer, which as stated above is a hydrogenation product, at least 80% of the double-bond unsaturations of the conjugated diene portion is saturated by the hydrogenation.

The composition preferably includes a second polymer having a Shore D hardness greater than about 30, more preferably greater than about 40, and most preferably greater than about 50. The second polymer preferably has a flexural modulus greater than about 10,000 psi, more preferably greater than about 20,000 psi, and most preferably greater than about 30,000 psi.

Particularly preferred second polymers in the composition include copolymeric ionomer, terpolymeric ionomer, bi-modal ionomer, fully neutralized ionomer, polyamide, polyamide copolymer, polycarbonate, polypropylene, polyarylate, polyolefin, polyphenylene ether, modified-polyphenylene ether, polystyrene, diallyl phthalmate polymer, styrene-acrylonitrile, styrene-maileic anhydride, liquid crystal polymer, cellulose polymer, polyurethane, and polyester. Particularly preferred polyesters include poly(ethylene terephthalate) and poly(butylene terephthalate).

Blends of Functionalized Styrenic Block Copolymer and Ionomer in the Mantle Composition In yet another more detailed feature of this invention, the composition of inner mantle layer and/or the outer mantle layer comprises blends of ionomer and a block copolymer, the block copolymer incorporating a first polymer block having an aromatic vinyl compound, a second polymer block having a conjugated diene compound, and a hydroxyl group located at a block copolymer, or its hydrogenation product, in which the ratio of block copolymer to ionomer ranges from 5:95 to 95:5 by weight, more preferably from about 10:90 to about 90:10 by weight, more preferably from about 20:80 to about 80:20 by weight, more preferably from about 30:70 to about 70:30 by weight and most preferably from about 35:65 to about 65:35 by weight.

In-Situ Neutralized Polymer in the Mantle Composition

In yet another more detailed feature of this invention, the composition of inner mantle layer and/or the outer mantle layer comprises a composition prepared by blending together at least three materials, identified as Components A, B, and C, and melt-processing these components to form in-situ a polymer blend composition incorporating a psuedo-crosslinked polymer network. Component A is a monomer, oligomer, prepolymer or polymer that incorporates at least five percent by weight of at least one type of an anionic functional group, and more preferably between about 5% and 50% by weight. Component B is a monomer, oligomer, or polymer that incorporates less by weight of anionic functional groups than does Component A, Component B preferably incorporates less than about 25% by weight of anionic functional groups, more preferably less than about 20% by weight, more preferably less than about 10% by weight, and most preferably Component B is free of anionic functional groups. Component C incorporates a metal cation, preferably as a metal salt. The pseudo-crosslinked network structure is formed in-situ, not by covalent bonds, but instead by ionic clustering of the reacted functional groups of Component A. The method can incorporate blending together more than one of any of Components A, B, or C.

The polymer blend can include either Component A or B dispersed in a phase of the other. Preferably, blend compositions comprises between about 1% and about 99% by weight of Component A based on the combined weight of Components A and B, more preferably between about 10% and about 90%, more preferably between about 20% and about 80%, and most preferably, between about 30% and about 70%. Component C is present in a quantity sufficient to produce the preferred amount of reaction of the anionic functional groups of Component A after sufficient melt-processing. Preferably, after melt-processing at least about 5% of the anionic functional groups in the chemical structure of Component A have been consumed, more preferably between about 10% and about 90%, more preferably between about 10% and about 80%, and most preferably between about 10% and about 70%.

The blend of these components is melt-processed to produce a reaction product of the anionic functional groups of Component A with the metal cation Component C to form in-situ a composition incorporating a pseudo-crosslinked network of Component A in the presence of Component B. The amount of ionic clustering of the functional groups (as discussed above with respect to ionomers) in the polymer blends can be controlled as necessary for optimum properties of the blend. In the composition, Component A produces pseudo-crosslinking at the ionic clusters formed in-situ by the clustering of the anionic functional groups reacted with metal cation. Because of the in-situ formation of these clusters in the presence of Component B, and the resulting pseudo-crosslinks, an interpenetrating network is produced.

The composition preferably is prepared by mixing the above materials into each other thoroughly, either by using a dispersive mixing mechanism, a distributive mixing mechanism, or a combination of these. These mixing methods are well known in the manufacture of polymer blends. As a result of this mixing, the anionic functional group of Component A is dispersed evenly throughout the mixture. Next, reaction is made to take place in-situ at the site of the anionic functional groups of Component A with Component C in the presence of Component B. This reaction is prompted by addition of heat to the mixture. The reaction results in the formation of ionic clusters in Component A and formation of a pseudo-crosslinked structure of Component A in the presence of Component B. Depending upon the structure of Component B, this pseudo-crosslinked Component A can combine with Component B to form a variety of interpenetrating network structures. For example, the materials can form a pseudo-crosslinked network of Component A dispersed in the phase of Component B, or Component B can be dispersed in the phase of the pseudo-crosslinked network of Component A. Component B may or may not also form a network, depending upon its structure, resulting in either: a fully-interpenetrating network, i.e., two independent networks of Components A and B penetrating each other, but not covalently bonded to each other; or, a semi-interpenetrating network of Components A and B, in which Component B forms a linear, grafted, or branched polymer interspersed in the network of Component A. For example, a reactive functional group or an unsaturation in Component B can be reacted to form a crosslinked structure in the presence of the in-situ-formed, psuedo-crosslinked structure of component A, leading to formation of a fully-interpenetrating network. Any anionic functional groups in Component B also can be reacted with the metal cation of Component C, resulting in pseudo-crosslinking via ionic cluster attraction of Component A to Component B.

The level of in-situ-formed pseudo-crosslinking in the compositions formed by the present methods can be controlled as desired by selection and ratio of Components A and B, amount and type of anionic functional group, amount and type of metal cation in Component C, type and degree of chemical reaction in Component B, and degree of pseudo-crosslinking produced of Components A and B.

As discussed above, the mechanical and thermal properties of the polymer blend for the inner mantle layer and/or the outer mantle layer in the present invention can be controlled as required by a modifying any of a number of factors, including: chemical structure of Components A and B, particularly the amount and type of anionic functional groups; mean molecular weight and molecular weight distribution of Components A and B; linearity and crystallinity of Components A and B; type of metal cation in component C; degree of reaction achieved between the anionic functional groups and the metal cation; mix ratio of Component A to Component B; type and degree of chemical reaction in Component B; presence of chemical reaction, such as a crosslinking reaction, between Components A and B; and the particular mixing methods and conditions used.

As discussed above, Component A can be any monomer, oligomer, prepolymer, or polymer incorporating at least 5% by weight of anionic functional groups. Those anionic functional groups can be incorporated into monomeric, oligomeric, prepolymeric, or polymeric structures during the synthesis of Component A, or they can be incorporated into a pre-existing monomer, oligomer, prepolymer, or polymer through sulfonation, phosphonation, or carboxylation to produce Component A.

Examples of suitable materials for use as Component A include, but are not limited to, sulfonated, phosphonated, or carboxylated products of the following: thermoplastic elastomer, thermoset elastomer, synthetic rubber, thermoplastic vulcanizate, copolymeric ionomer, terpolymeric ionomer, polycarbonate, polyolefin, polyamide, copolymeric polyamide, polyesters, polyvinyl alcohols, acrylonitrile-butadiene-styrene copolymers, polyurethane, polyarylate, polyacrylate, polyphenyl ether, modified-polyphenyl ether, high-impact polystyrene, diallyl phthalate polymer, acrylonitrile-styrene-butadiene (ABS), styrene-acrylonitrile (SAN) (including olefin-modified SAN and acrilonitrile styrene acrylonitrile), styrene-maleic anhydryde (S/MA) polymer, styrenic copolymer, functionalized styrenic copolymer, functionalized styrenic terpolymer, styrenic terpolymer, cellulose polymer, liquid crystal polymer (LCP), ehtylene-propylene-diene terpolymer (EPDM), ethylene-propylene coplymer, ethylene vinyl acetate, polyurea, and polysiloxane, or any metallocene-catalyzed polymers of these species.

Particularly suitable polymers for use as Component A within the scope of the present invention include sulfonated, phosphonated, or carboxylated products of the following: polyethyleneterephthalate, polybutyleneterephthalate, polytrimethyleneterephthalate, ethylene-carbon monoxide copolymer, polyvinyl-diene fluorides, polyphenylenesulfide, polypropyleneoxide, polyphenyloxide, polypropylene, functionalized polypropylene, polyethylene, ethylene-octene copolymer, ethylene-methyl acrylate, ethylene-butyl acrylate, polycarbonate, polysiloxane, functionalized polysiloxane, copolymeric ionomer, terpolymeric ionomer, polyether-ester elastomer, polyesterester elastomer, polyetheramide elastomer, propylene-butadiene copolymer, modified copolymer of ethylene and propylene, styrenic copolymer (including styrenic block copolymer and randomly distributed styrenic copolymer, such as styrene-isobutylene copolymer and styrene-butadiene copolymer), partially or fully hydrogenated styrene-butadiene-styrene block copolymers such as styrene-(ethylene-propylene)-styrene or styrene-(ethylene-butylene)-styrene block copolymers, partially or fully hydrogenated styrene-butadiene-styrene block copolymers with functional group, polymers based on ethylene-propylene-(diene), polymers based on functionalized ethylene-propylene (diene), dynamically vulcanized polypropylene/ethylene-propylene-diene-copolymer, thermoplastic vulcanizates based on ethylene-propylene-(diene), thermoplastic polyetherurethane, thermoplastic polyesterurethane, compositions for making thermoset polyurethane, thermoset polyurethane, natural rubber, styrene-butadiene rubber, nitrile rubber, chloroprene rubber, fluorocarbon rubber, butyl rubber, acrylic rubber, silicone rubber, chlorosulfonated polyethylene, polyisobutylene, alfin rubber, polyester rubber, epichlorphydrin rubber, chlorinated isobutylene-isoprene rubber, nitrile-isobutylene rubber, 1,2-polybutadiene, 1,4-polybutadiene, cis-polyisoprene, trans-polyisoprene, and polybutylene-octene, or any metallocene-catalyzed polymers of the above-listed species. Suitable polyamides for sulfonation, phosphonation, or carboxylation are products of the following include resins obtained by: (1) polycondensation of (a) a dicarboxylic acid, such as oxalic acid, adipic acid, sebacic acid, terephthalic acid, isophthalic acid or 1,4-cyclohexylidicarboxylic acid, with (b) a diamine, such as ethylene-diamine, tetramethylenediamine, pentamethylenediamine, hexamethylene-diamine or decamethylenediamine, 1,4-cyclohexyldiamine or m-xylylenediamine; (2) a ring-opening polymerization of cyclic lactam, such as e-caprolactam; (3) polycondensation of an aminocarboxylic acid, such as 6-aminocaproic acid, 9-aminononaoic acid, 11-aminoudecanoic acid or 12-aminododecanoic acid; or, (4) copolymerization of a cyclic lactam with a dicarboxylic acid and a diamine. Specific examples of suitable polyamides for sulfonation, phosphonation, or carboxylation include polyamide 6; polyamide 11; polyamide 12; polyamide 4,6; polyamide 6,6; polyamide 6,9; polyamide 6,10; polyamide 6,12; PA12,CX; PA12, IT; PPA; PA6, IT; PA6/PPE.

Examples of suitable materials for use as Component A include homopolymers, copolymers, and terpolymers. A preferred copolymer is a copolymer of: an α-olefin having the form $RCH=CH_2$, where R is a radical selected from the class consisting of hydrogen and alkyl radicals having 1 to 8 carbon atoms; and, an α-β-ethylenically unsaturated carboxylic acid having preferably 3 to 8 carbon atoms. Examples of suitable olefins in this copolymer include ethylene, propylene, butene, pentene, hexene, heptene, methylbutene, and methylpentene. Examples of suitable α-β-ethylenically unsaturated carboxylic acids in this copolymer include: acrylic acid, methacrylic acid, ethacrylic acid, itaconic acid, maleic acid, fumaric acid, monoesters of dicarboxylic acid (such as methyl hydrogen maleate, methyl hydrogen fumarate, and ethyl hydrogen fumarate, and maleic anhydride), and α-β-monoethylenically unsaturated anhydrides of carboxylic acid. A preferred terpolymer is a terpolymer of: an α-olefin having the form $RCH=CH_2$, where R is a radical selected from the class consisting of hydrogen and alkyl radicals having 1 to 8 carbon atoms; an α-β-ethylenically unsaturated carboxylic acid having preferably 3 to 8 carbon atoms; and an acrylate ester having from 1 to 21 carbon atoms.

Preferred, but non-limiting, examples of suitable copolymers and terpolymers for use with the present invention include copolymers or terpolymers of: ethylene/acrylic acid, ethylene/methacrylic acid, ethylene/itaconic acid, ethylene/methyl hydrogen maleate, ethylene/maleic acid, ethylene/methacrylic acid/ethylacrylate, ethylene/itaconic acid/methyl metacrylate, ethylene/methyl hydrogen maleate/ethyl acrylate, ethylene/methacrylic acid/vinyl acetate, ethylene/acrylic acid/vinyl alcohol, ethylene/propylene/acrylic acid, ethylene/styrene/acrylic acid, ethylene/methacrylic acid/acrylonitrile, ethylene/fumaric acid/vinyl methyl ether, ethylene/vinyl chloride/acrylic acid, ethylene/vinyldiene chloride/acrylic acid, ethylene/vinyl fluoride/methacrylic acid, and ethylene/chlorotrifluoroethylene/methacrylic acid, or any metallocene-catalyzed polymers of the above-listed species. Examples of suitable copolymers for use with the present invention are marketed under the name PRIMACOR by Dow Chemical Company of Midland Michigan, and NUCREL by E.I. DuPont de Nemours & Co. of Wilmington, Del.

Additional examples of materials suitable for use as Component A in the method of the present invention include the reaction products of compositions incorporating diisocyanate, diamine, polyamine, or polyol incorporating the anionic functional groups discussed above, as well as any combination of those reaction products, such as prepolymers or polymers incorporating these anionic functional groups. Further examples of materials suitable for use as Component A include oxa acids, oxa esters, or polymers incorporating oxa acids or oxa esters as a co-monomer. Particular examples of suitable oxa acids and their ester include: 3,6-dioxaheptanoic acid, 3,6,9-trioxadecanoic acid, 3,6,9-trioxaudecanedioic acid, 3,6,9-trioxaudecanedioic ester, polyglycol diacid, and polyglycol diacid ester.

As discussed above, Component B can be any monomer, oligomer, or polymer, preferably having a lower weight percentage of anionic functional groups than that present in Component A in the weight ranges discussed above, and most preferably free of such functional groups. Examples of suitable materials for Component B include, but are not limited to, the following: thermoplastic elastomer, thermoset elastomer, synthetic rubber, thermoplastic vulcanizate, copolymeric ionomer, terpolymeric ionomer, polycarbonate, polyolefin, polyamide, copolymeric polyamide, polyesters, polyvinyl alcohols, acrylonitrile-butadiene-styrene copolymers, polyurethane, polyarylate, polyacrylate, polyphenyl ether, modified-polyphenyl ether, high-impact polystyrene, diallyl phthalate polymer, metallocene catalyzed polymers, acrylonitrile-styrene-butadiene (ABS), styrene-acrylonitrile (SAN) (including olefin-modified SAN and acrilonitrile styrene acrylonitrile), styrene-maleic anhydryde (S/MA) polymer, styrenic copolymer, functionalized styrenic copolymer, functionalized styrenic terpolymer, styrenic terpolymer, cellulose polymer, liquid crystal polymer (LCP), ehtylene-propylene-diene terpolymer (EPDM), ethylene-propylene coplymer, ethylene vinyl acetate, polyurea, and polysiloxane or any metallocene-catalyzed polymers of these species. Particularly suitable polymers for use as Component B within the scope of the present invention include polyethylene-terephthalate, polybutyleneterephthalate, polytrimethylene-terephthalate, ethylene-carbon monoxide copolymer, polyvinyl-diene fluorides, polyphenylenesulfide, polypropyleneoxide, polyphenyloxide, polypropylene, functionalized polypropylene, polyethylene, ethylene-octene copolymer, ethylene-methyl acrylate, ethylene-butyl acrylate, polycarbonate, polysiloxane, functionalized polysiloxane, copolymeric ionomer, terpolymeric ionomer, polyetherester elastomer, polyesterester elastomer, polyetheramide elastomer, propylene-butadiene copolymer, modified copolymer of ethylene and propylene, styrenic copolymer (including styrenic block copolymer and randomly distributed styrenic copolymer, such as styrene-isobutylene copolymer and styrene-butadiene copolymer), partially or fully hydrogenated styrene-butadiene-styrene block copolymers such as styrene-(ethylene-propylene)-styrene or styrene-(ethylene-butylene)-styrene block copolymers, partially or fully hydrogenated styrene-butadiene-styrene block copolymers with functional group, polymers based on ethylene-propylene-(diene), polymers based on functionalized ethylene-propylene-diene), dynamically vulcanized polypropylene/ethylene-propylene-diene-copolymer, thermoplastic vulcanizates based on ethylene-propylene-(diene), thermoplastic polyetherurethane, thermoplastic polyesterurethane, compositions for making thermoset polyurethane, thermoset polyurethane, natural rubber, styrene-butadiene rubber, nitrile rubber, chloroprene rubber, fluorocarbon rubber, butyl rubber, acrylic rubber, silicone rubber, chlorosulfonated polyethylene, polyisobutylene, alfin rubber, polyester rubber, epichlorphydrin rubber, chlorinated isobutylene-isoprene rubber, nitrile-isobutylene rubber, 1,2-polybutadiene, 1,4-polybutadiene, cis-polyisoprene, trans-polyisoprene, and polybutylene-octene.

Preferred materials for use as Component B include polyester elastomers marketed under the name PEBAX and LOTADER marketed by ATOFINA Chemicals of Philadelphia, Pa.; HYTREL, FUSABOND, and NUCREL marketed by E.I. DuPont de Nemours & Co. of Wilmington, Del.; SKYPEL and SKYTHANE by S.K. Chemicals of Seoul, South Korea; SEPTON and HYBRAR marketed by Kuraray Company of Kurashiki, Japan; ESTHANE by Noveon; KRATON marketed by Kraton Polymers, and VESTENAMER marketed by Degussa.

As stated above, Component C is a metal cation. These metals are from groups IA, IB, IIA, IIB, IIIA, IIIB, IVA, IVB, VA, VB, VIA, VIB, VIIB and VIIIB of the periodic table. Examples of these metals include lithium, sodium, magnesium, aluminum, potassium, calcium, manganese, tungsten, titanium, iron, cobalt, nickel, hafnium, copper, zinc, barium, zirconium, and tin. Suitable metal compounds for use as a source of Component C are, for example, metal salts, preferably metal hydroxides, metal carbonates, or metal acetates. In addition to Components A, B, and C, other materials commonly used in polymer blend compositions, can be incorporated into compositions prepared using the method of the present invention, including: crosslinking agents, co-crosslinking agents, accelerators, activators, UV-active chemicals such as UV initiators, EB-active chemicals, colorants, UV stabilizers, optical brighteners, antioxidants, processing aids, mold release agents, foaming agents, and organic, inorganic or metallic fillers or fibers, including fillers to adjust specific gravity.

Various known methods are suitable for preparation of polymer blends. For example, the three components can be premixed together in any type of suitable mixer, such as a V-blender, tumbler mixer, or blade mixer. This premix then can be melt-processed using an internal mixer, such as Banbury mixer, roll-mill or combination of these, to produce a reaction product of the anionic functional groups of Component A by Component C in the presence of Component B. Alternatively, the premix can be melt-processed using an extruder, such as single screw, co-rotating twin screw, or counter-rotating twin screw extruder, to produce the reaction product. The mixing methods discussed above can be used together to melt-mix the three components to prepare the compositions of the present invention. Also, the components can be fed into an extruder simultaneously or sequentially.

Most preferably, Components A and B are melt-mixed together without Component C, with or without the premixing discussed above, to produce a melt-mixture of the two components. Then, Component C separately is mixed into the blend of Components A and B. This mixture is melt-mixed to produce the reaction product. This two-step mixing can be performed in a single process, such as, for example, an extrusion process using a proper barrel length or screw configuration, along with a multiple feeding system. In this case, Components A and B can be fed into the extruder through a main hopper to be melted and well-mixed while flowing downstream through the extruder. Then Component C can be fed into the extruder to react with the mixture of Components A and B between the feeding port for component C and the die head of the extruder. The final polymer composition then exits from the die. If desired, any extra steps of melt-mixing can be added to either approach of the method of the present invention to provide for improved mixing or completion of the reaction between A and C. Also, additional components discussed above can be incorporated either into a premix, or at any of the melt-mixing stages. Alternatively, Components A, B, and C can be melt-mixed simultaneously to form in-situ a psuedo-crosslinked structure of Component A in the presence of Component B, either as a fully or semi-interpenetrating network.

The compositions of inner mantle layer and/or the outer mantle layer prepared using the described method additionally can include copolymers or terpolymers having a glycidyl group, hydroxyl group, maleic anhydride group or carboxylic group. These copolymers and terpolymers comprise an $\alpha$-olefin. Examples of suitable $\alpha$-olefins include ethylene, propylene, 1-butene, 1-pentene, 3-methyl-1-butene, 1-hexene, 4-methyl-1-petene, 3-methyl-1-pentene, 1-octene, 1-decene, 1-dodecene, 1-tetradecene, 1-hexadecene, 1-octadecene, 1-eicocene, 1-dococene, 1-tetracocene, 1-hexacocene, 1-octacocene, and 1-triacontene. One or more of these $\alpha$-olefins may be used. Examples of suitable glycidyl groups in copolymers or terpolymers for use within the scope of the present invention include esters and ethers of aliphatic glycidyl, such as allylglycidylether, vinylglycidylether, glycidyl maleate and itaconatem glycidyl acrylate and methacrylate, and also alicyclic glycidyl esters and ethers, such as 2-cyclohexene-1-glycidylether, cyclohexene-4,5-diglyxidyl-carboxylate, cyclohexene-4-glycidyl carobxylate, 5-norboenene-2-methyl-2-glycidyl carboxylate, and endocis-bicyclo(2,2,1)-5-heptene-2,3-diglycidyl dicaroboxylate. These polymers having a glycidyl group may comprise other monomers, such as esters of unsaturated carboxylic acid, for example, alkyl(meth)acrylates or vinyl esters of unsaturated carboxylic acids. Polymers having a glycidyl group can be obtained by copolymerization or graft polymerization with homopolymers or copolymers. Examples of suitable terpolymers having a glycidyl group include LOTADER AX8900 and LOTADER AX8920 marketed by Elf-Atochem Company, ELVALOY marketed by Du Pont, REXPEARL marketed by Nippon Petrochemicals Co., Ltd. Additional examples of copolymers comprising epoxy monomers and which are suitable for use in compositions prepared using the method of the present invention include styrene-butadiene-styrene block copolymers in which the polybutadiene block contains epoxy group, and styrene-isoprene-styrene block copolymers in which the polyisoprene block contains epoxy. Commercially available examples of these epoxy functional copolymers include ESBS A1005, ESBS A1010, ESBS A1020, ESBS AT018, and ESBS AT019, marketed by Daicel Chemical Industries, Ltd.

Examples of polymers or terpolymers incorporating a maleic anhydride group suitable for use within compositions prepared using the method of the present invention include maleic anhydride-modified ethylene-propylene copolymers, maleic anhydride-modified ethylene-propylene-diene terpolymers, maleic anhydride-modified polyethylenes, maleic anhydride-modified polypropylenes, ethylene-ethylacrylate-maleic anhydride terpolymers, and maleic anhydride-indene-styrene-cumarone polymers. Examples of commercially available copolymers incorporating maleic anhydride include: BONDINE, marketed by Sumitomo Chemical Co., such as BONDINE AX8390, an ethylene-ethyl acrylate-maleic anhydride terpolymer having a combined ethylene acrylate and maleic anhydride content of 32% by weight, and BONDINE TX TX8030, an ethylene-ethyl acrylate-maleic anhydride terpolymer having a combined ethylene acrylate and maleic anhydride content of 15% by weight and a maleic anhydride content of 1% to 4% by weight; maleic anhydride-containing LOTADER 3200, 3210, 6200, 8200, 3300, 3400, 3410, 7500, 5500, 4720, and 4700, marketed by Elf-Atochem; EXXELOR VA1803, a maleic anyhydride-modified ethylene-propylene copolymer having a maleic anyhydride content of 0.7% by weight, marketed by Exxon Chemical Co.; and KRATON FG 1901X, a maleic anhydride functionalized triblock copolymer having polystyrene endblocks and poly(ethylene/butylene) midblocks, marketed by Kraton Company.

Fiber in the Mantle Composition

In yet another more detailed feature of this invention, the composition of the inner mantle layer and/or the outer mantle layer can comprise at least one hardness-enhancing material, the hardness enhancing material including at least a quantity of continuous or non-continuous fiber elements. The fiber elements that can be used in the inner mantle layer and/or the outer mantle layer include fiber elements selected from the among the categories of glass fiber elements, carbon fiber elements, aramid fiber elements, and metallic fiber elements. The latter can include copper, high tensile steel, and stainless steel fiber elements.

In preferred embodiments, the quantity of fiber elements include about 1 weight percent to about 50 weight percent of the inner mantle layer and/or the outer mantle layer, preferably about 5 weight percent to about 40 weight percent of the inner mantle layer and/or the outer mantle layer, more preferably about 10 weight percent to about 30 weight percent of the inner mantle layer and/or the outer mantle layer, and even more preferably about 15 weight percent to about 20 weight percent of the inner mantle layer and/or the outer mantle layer.

Nanofiller in the Mantle Composition

In yet another more detailed feature of this invention, the composition of the inner mantle layer and/or the outer mantle layer can comprise one or more nanofillers substantially dispersed in the thermoplastic or thermoset matrix polymer. Nanofiller comprises particles of inorganic material having a largest dimension that is about one micron or less and that is at least an order of magnitude greater than such particle's smallest dimension. More particularly the nanofiller includes a clay, and even more particularly the clay is selected from the group consisting of hydrotalcite, montmorillonite, phyllosilicate, saponite, hectorite, beidellite, stevensite, vermiculite, halloysite, mica, micafluoride, and octosilicate.

More particularly, the nanofiller is present in the thermoplastic or thermoset polymer in an amount of about 0.1% to 20%, preferably from 0.1% to 15%, even more preferably from about 0.1% to 10%, and most preferably from about 0.5% to 5% by weight.

Even more particularly, the nanofiller is dispersed in the thermoplastic or thermoset matrix polymer in an intercalated or exfoliated manner.

Inorganic nanofiller material generally is made of clay, such as hydrotalcite, phyllosilicate, saponite, hectorite, beidellite, stevensite, vermiculite, halloysite, mica, montmorillonite, micafluoride, or octosilicate. To facilitate incorporation of the nanofiller material into the polymer material, either in preparing nanocomposite materials or in preparing polymer-based golf ball compositions, the clay particles generally are coated or treated by a suitable compatibilizing agent. The compatibilizing agent allows for superior linkage between the inorganic and organic material, and it also can account for the hydrophilic nature of the inorganic nanofiller material and the possibly hydrophobic nature of the polymer. Compatibilizing agents may exhibit a variety of different structures depending upon the nature of both the inorganic nanofiller material and the target matrix polymer. Non-limiting examples include hydroxy-, thiol-, amino-, epoxy-, carboxylic acid-, ester-, amide-, and siloxy-group containing compounds, oligomers or polymers. The nanofiller materials can be incorporated into the polymer either by dispersion into the particular monomer or oligomer prior to polymerization, or by melt compounding of the particles into the matrix polymer. Examples of commercial nanofillers are various Cloisite grades including 10A, 15A, 20A, 25A, 30B, and NA+ of Southern Clay Products (Gonzales, Tex.) and the Nanomer grades including 1.24TL and C.30EVA of Nanocor, Inc. (Arlington Heights, Ill.).

As mentioned above, the nanofiller particles have an aggregate structure with the aggregates particle sizes in the micron range and above. However, these aggregates have a stacked plate structure with the individual platelets being roughly 1 nanometer (nm) thick and 100 to 1000 nm across. As a result, nanofillers have extremely high surface area, resulting in high reinforcement efficiency to the material at low loading levels of the particles. The sub-micron-sized particles enhance the stiffness of the material, without increasing its weight or opacity and without reducing the material's low-temperature toughness.

Nanofillers when added into a matrix polymer can be mixed in three ways. In one type of mixing there is dispersion of the aggregate structures within the matrix polymer, but on mixing no interaction of the matrix polymer with the aggregate platelet structure occurs, and thus the stacked platelet structure is essentially maintained. As used herein, this type of mixing is defined as "undispersed."

However, if the nanofiller material is selected correctly, the matrix polymer chains can penetrate into the aggregates and separate the platelets, and thus when viewed by transmission electron microscopy or x-ray diffraction, the aggregates of platelets are expanded. At this point the nanofiller is said to be substantially evenly dispersed within and reacted into the structure of the matrix polymer. This level of expansion can occur to differing degrees. If small amounts of the matrix polymer are layered between the individual platelets then, as used herein, this type of mixing is known as "intercalation."

In some case, further penetration of the matrix polymer chains into the aggregate structure separates the platelets, and leads to a complete breaking up of the platelet's stacked structure in the aggregate and thus when viewed by TEM, the individual platelets are thoroughly mixed throughout the matrix polymer. As used herein, this type of mixing is known as "exfoliated." An exfoliated nanofiller has the platelets fully dispersed throughout the polymer matrix; the platelets may be dispersed unevenly but preferably are dispersed evenly.

While not wishing to be limited to any theory, one possible explanation of the differing degrees of dispersion of such nanofillers within the matrix polymer structure is the effect of the compatibilizer surface coating on the interaction between the nanofiller platelet structure and the matrix polymer. By careful selection of the nanofiller it is possible to vary the penetration of the matrix polymer into the platelet structure of the nanofiller on mixing. Thus, the degree of interaction and intrusion of the polymer matrix into the nanofiller controls the separation and dispersion of the individual platelets of the nanofiller within the polymer matrix. This interaction of the polymer matrix and the platelet structure of the nanofiller is defined herein as the nanofiller "reacting into the structure of the polymer" and the subsequent dispersion of the platelets within the polymer matrix is defined herein as the nanofiller "being substantially evenly dispersed" within the structure of the polymer matrix.

If no compatibilizer is present on the surface of a filler such as a clay, or if the coating of the clay is attempted after its addition to the polymer matrix, then the penetration of the matrix polymer into the nanofiller is much less efficient, very little separation and no dispersion of the individual clay platelets occurs within the matrix polymer. Physical properties of the polymer will change with the addition of nanofiller and the physical properties of the polymer are expected to improve even more as the nanofiller is dispersed into the polymer matrix to form a nanocomposite.

Materials incorporating nanofiller materials can provide these property improvements at much lower densities than those incorporating conventional fillers. For example, a nylon-6 nanocomposite material manufactured by RTP Corporation of Wichita, Kans. uses a 3% to 5% clay loading and has a tensile strength of 11,800 psi and a specific gravity of 1.14, while a conventional 30% mineral-filled material has a tensile strength of 8,000 psi and a specific gravity of 1.36. Because use of nanocomposite materials with lower loadings of inorganic materials than conventional fillers provides the same properties, this use allows products to be lighter than those with conventional fillers, while maintaining those same properties.

Nanocomposite materials are materials incorporating from about 0.1% to about 20%, preferably from about 0.1% to about 15%, and most preferably from about 0.1% to about 10% of nanofiller reacted into and substantially dispersed through intercalation or exfoliation into the structure of an organic material, such as a polymer, to provide strength, temperature resistance, and other property improvements to the resulting composite. Descriptions of particular nanocomposite materials and their manufacture can be found in U.S. Pat. No. 5,962,553 to Ellsworth, U.S. Pat. No. 5,385,776 to Maxfield et al., and U.S. Pat. No. 4,894,411 to Okada et al. Examples of nanocomposite materials currently marketed include M1030D, manufactured by Unitika Limited, of Osaka, Japan, and 1015C2, manufactured by UBE America of New York, N.Y.

When nanocomposites are blended with other polymer systems, the nanocomposite may be considered a type of nanofiller concentrate. However, a nanofiller concentrate may be more generally a polymer into which nanofiller is mixed; a nanofiller concentrate does not require that the nanofiller has reacted and/or dispersed evenly into the carrier polymer.

B. Compositions of the Cover Layer 18

The cover layer (or layers) 18 comprises ionomeric or non-ionomeric thermoplastic resin, thermoset resin, thermoplastic vulcanizate, and blends of those.

(1) Ionomeric Resin

Ionomeric polymer suitable for the cover layer 18 comprises one or more E/X/Y copolymers, wherein E is ethylene, X is a $C_3$ to $C_8$ $\alpha,\beta$ ethylenically unsaturated carboxylic acid, and Y is a softening comonomer selected from the group consisting of alkyl acrylate and alkyl methacrylate, wherein the alkyl groups have from 1 to 8 carbon atoms, or ionomers of such E/X/Y copolymers, wherein X is in the range of about 5 to about 35 weight % of the E/X/Y copolymer and Y is in the range of 0 to about 50 weight % of the E/X/Y copolymer, and wherein the acid groups present in said ionomeric polymer are partially neutralized with a metal selected from the group consisting of zinc, sodium, lithium, calcium, magnesium, and combinations thereof. Examples of these resins include those sold under the trademarks SURLYN® (E. I DuPont de Nemours and Co. Inc., Wilmington, Del.) and IOTEK® (ExxonMobil Corp., Houston, Tex.). The ionomeric polymer present in at least one cover layer or cover layers comprises about 5 to about 40 weight percent (based on the total weight of the modified ionomeric polymer) of one or more metal fatty acids or metal salts of a fatty acid, wherein the metal is selected from the group consisting of calcium, sodium, zinc, lithium, magnesium, barium, and combinations thereof. Preferably, about 50 to 100 percent, and more preferably about 70 to 100 percent, of the acid groups present in the modified ionomeric polymer present in the intermediate layer are neutralized with zinc, sodium, lithium, calcium, or magnesium ions, or a combination thereof. The preferred average acid content is in the range of about 5 to about 25 weight percent. Examples of these resins include those sold under the trademark HPF (E. I DuPont de Nemours and Co. Inc., Wilmington, Del.).

Alternatively, at least one cover layer or cover layers may comprise a bimodal ionomeric polymer comprising a high molecular weight component having a molecular weight in the range of about 80,000 to about 500,000 and comprising one or more ethylene/$\alpha,\beta$-ethylenically unsaturated $C_{3-8}$ carboxylic acid copolymers and/or one or more ethylene/alkyl (meth)acrylate/(meth)acrylic acid terpolymers, wherein the high molecular weight component is partially neutralized with metal ions selected from the group consisting of lithium, sodium, zinc, calcium, magnesium, and combinations thereof, and a low molecular weight component having a molecular weight in the range of about 2,000 to about 30,000 and comprising one or more ethylene/$\alpha,\beta$-ethylenically unsaturated $C_{3-8}$ carboxylic acid copolymers and/or one or more ethylene/alkyl(meth)acrylate/(meth)acrylic acid terpolymers, wherein said low molecular weight component is partially neutralized with metal ions selected from the group consisting of lithium, sodium, zinc, calcium, magnesium.

Another example of preferred ionomeric resin for the composition of the cover layer 18 is a blend comprising the reaction product of three Components, (A), (B) and (C). Component (A) is a polymer comprising Component (A) is a polymer comprising ethylene and/or an alpha olefin; and one or more $\alpha,\beta$-ethylenically unsaturated $C_3$-$C_{20}$ carboxylic acids, sulfonic acids or phosphoric acids.

Component (B) is a compound having a general formula $(R_2N)_m$—R'—$(X(O)_nOR_y)_m$, where R is either hydrogen, one or more $C_1$-$C_{20}$ aliphatic systems, one or more cycloaliphatic systems, one or more aromatic systems, or a combination of these. Also R' is a bridging group comprising one or more unsubstituted $C_1$-$C_{20}$ straight chain or branched aliphatic or alicyclic groups, or one or more substituted straight chain or branched aliphatic or alicyclic groups, or one or more aromatic groups, one or more oligomers each containing up to 12 repeating units, and when X is C or S or P, m is 1-3. Also when X=C, n=1 and y=1, and when X=S, n=2 and y=1, and when X=P, n=2 and y=2.

Finally, Component (C) is a basic metal ion salt, which has the capacity to neutralize some, or all of the acidic group present in Blend Components (A) and (B).

More particularly, Component (A) is an ethylene/α,β-ethylenically unsaturated $C_3$-$C_{20}$ carboxylic acid copolymer or an ethylene/α,β-ethylenically unsaturated $C_3$-$C_{20}$ carboxylic acid/α,β-ethylenically unsaturated $C_3$-$C_{20}$ carboxylic acid ester terpolymer. Component (B) is present in an amount from about 0.1 to about 40 phr; and Component (C) is a basic metal ion salt having a cation selected from the group consisting of $Li^+$, $Na^+$, $K^+$, $Zn^{2+}$, $Ca^{2+}$, $Co^{2+}$, $Ni^{2+}$, $Cu^{2+}$, $Pb^{2+}$, and $Mg^{2+}$.

Even more particularly, Component (A) is a unimodal ethylene/(meth)acrylic acid copolymer or ethylene/(meth)acrylic acid/(meth)acrylate terpolymer; or a bimodal polymer blend composition. The bimodal polymer blend includes a high molecular weight component having molecular weight of about 80,000 to about 500,000 and comprising one or more ethylene/α,β-ethylenically unsaturated $C_{3-8}$ carboxylic acid copolymers and/or one or more ethylene, alkyl(meth)acrylate, (meth)acrylic acid terpolymers; which is partially neutralized with metal ions selected from the group consisting of lithium, sodium, zinc, calcium, magnesium, and combinations thereof. The bimodal polymer blend also includes a low molecular weight component having a molecular weight of about from about 2,000 to about 30,000 and comprising one or more ethylene/α,β-ethylenically unsaturated $C_{3-8}$ carboxylic acid copolymers and/or one or more ethylene, alkyl (meth)acrylate, (meth)acrylic acid terpolymers; said low molecular weight component being partially neutralized with metal ions selected from the group consisting of lithium, sodium, zinc, calcium, magnesium, and combinations thereof. Also Component (B) is is present in an amount from about 1 to about 20 phr, and is selected from the group consisting of amino acids, polypeptides, carbamic acids, oxamic acids, anthranillic acids, and combinations thereof. Finally, Component (C) is a basic metal ion salt having a cation selected from the group consisting of $Li^+$, $Na^+$, $K^+$, $Zn^{2+}$, and $Mg^{2+}$, and combinations thereof.

In a more detailed feature of the invention, Component (A) is a unimodal ethylene/(meth)acrylic acid copolymer or ethylene/(meth)acrylic acid/(meth)acrylate terpolymer. Also, Component (B) is present in an amount from about 1 to about 15 phr, and is either 4,4'-methylene-bis-(cyclohexylamine) carbamate), 11-aminoundecanoicacid, 12-aminododecanoic acid, epsilon-caprolactam; omega-caprolactam, or a combinations of these. Finally, Component (C), is either a metal formate, metal acetate, metal nitrate, metal carbonate, metal bicarbonate, metal oxide, metal hydroxide, metal alkoxides, or a combination of these.

In yet other more detailed features of this invention, the composition of at least one cover layer comprises polymer selected from the group consisting of thermoplastic resins, thermoset resins, thermoplastic polyurethane, thermoset polyurethane, polyamide elastomer, thermoplastic copolyetherester block copolymer, thermoplastic copolyesterester block copolymer, polyethylene-octene, polybutylene-octene, polyoctenamer, polyisoprene, 1,2-syndiotactic polybutadiene, thermoplastic vulcanizate, copolymeric ionomer, terpolymeric ionomer, polyurethane ionomer, polyamide ionomer, polycarbonate, polyolefin, polyamide, copolymeric polyamide, polyester, polyvinyl alcohol, acrylonitrile-butadiene-styrene copolymer, polyarylate, polyacrylate, polyphenylene ether, impact-modified polyphenylene ether, high impact polystyrene, diallyl phthalate polymer, metallocene catalyzed polymer, styrene-acrylonitrile (SAN) (including olefin-modified SAN and acrylonitrile-styrene-acrylonitrile), styrene-maleic anhydride (S/MA) polymer, styrenic copolymer, functionalized styrenic copolymer, functionalized styrenic terpolymer, styrenic terpolymer, cellulose polymer, liquid crystal polymer (LCP), ethylene-propylene-diene terpolymer (EPDM), ethylene-vinyl acetate copolymers (EVA), ethylene-propylene copolymer, ethylene vinyl acetate, polyurea, polysiloxane, and combinations thereof.

Examples of suitable thermoplastic resins for the cover layer (or layers) 18 comprise polyamide, copolyamide, polyester, copolyester, polycarbonate, polyolefin including ethylene copolymers with (meth)acrylic acid and (meth)acrylate esters, polyphenylene oxide, polyphenylene sulfide, polyimide, polystyrene, polyvinyl chloride, polyurethane, thermoplastic elastomer, thermoplastic vulcanizates and fluoropolymer.

Examples of suitable elastomers for the cover layer 18 comprise polyester thermoplastic urethane, polyether thermoplastic urethane, copolyetherester elastomer, copolyesterester elastomer, polyamide elastomer, olefinic elastomer, ethylene-vinyl acetate copolymers, rubber-based copolymer, cyclic olefin copolymer, and olefinic thermoplastic elastomer.

Examples of olefinic thermoplastic elastomers for the cover layer 18 comprise metallocene-catalyzed polyolefins, ethylene-octene copolymer, ethylene-butene copolymer, and ethylene-propylene copolymers all with or without controlled tacticity as well as blends of polyolefins having ethyl-propylene-non-conjugated diene terpolymer, rubber-based copolymer, and dynamically vulcanized rubber-based copolymer. Examples of these include products sold under the trademarks SANTOPRENE, DYTRON, VISAFLEX, and VYRAM, by Advanced Elastomeric Systems of Houston, Tex., and SARLINK, by DSM of Haarlen, the Netherlands.

Examples of rubber-based copolymers for the cover layer 18 comprise multiblock rubber-based copolymers, particularly those in which the rubber block component is based on butadiene, isoprene, or ethylene/butylene. The non-rubber repeating units of the copolymer may be derived from any suitable monomers, including meth(acrylate) esters, such as methyl methacrylate and cyclohexylmethacrylate, and vinyl arylenes, such as styrene. Examples of styrenic copolymers resins for inner mantle or outer mantle layer are manufactured by Kraton Polymers (formerly of Shell Chemicals) under the trademarks KRATON D (for styrene-butadiene-styrene and styrene-isoprene-styrene types) and KRATON G (for styrene-ethylene-butylene-styrene and styrene-ethylene-propylene-styrene types) and Kuraray under the trademark SEPTON. Examples of randomly distributed styrenic polymers for the cover layer comprise paramethylstyrene-isobutylene (isobutene)copolymers developed by ExxonMobil Chemical Corporation and styrene-butadiene random copolymers developed by Chevron Phillips Chemical Corp.

Examples of copolyester elastomers for the cover layer 18 comprise polyether ester block copolymers, polylactone ester block copolymers, and aliphatic and aromatic dicarboxylic acid copolymerized polyesters. Polyether ester block copolymers are copolymers comprising polyester hard segments polymerized from a dicarboxylic acid and a low molecular weight diol, and polyether soft segments polymerized from an alkylene glycol having 2 to 10 atoms. Polylactone ester block copolymers are copolymers having polylactone chains instead of polyether as the soft segments discussed above for polyether ester block copolymers. Aliphatic and aromatic dicarboxylic copolymerized polyesters are copolymers of an acid component selected from aromatic dicarboxylic acids, such as terephthalic acid and isophthalic acid, and aliphatic acids having 2 to 10 carbon atoms with at least one diol component, selected from aliphatic and alicyclic diols having 2 to 10 carbon atoms. Blends of an aromatic polyester and an aliphatic polyester also may be used for these. Examples of these include products marketed under the trademarks HYTREL by E.I. DuPont de Nemours & Company, and SKYPEL by S.K. Chemicals of Seoul, South Korea.

Examples of thermoplastic elastomers suitable for the cover layer 18 comprise those having functional groups, such as carboxylic acid, maleic anhydride, glycidyl, norbonene, and hydroxyl functionalities. An example of these includes a block polymer having at least one polymer block A comprising an aromatic vinyl compound and at least one polymer block B comprising a conjugated diene compound, and having a hydroxyl group at the terminal block copolymer, or its hydrogenated product. An example of this polymer is sold under the trademark SEPTON HG-252 by Kuraray Company of Kurashiki, Japan. Other examples of these include: maleic anhydride functionalized triblock copolymer consisting of polystyrene end blocks and poly(ethylene/butylene), sold under the trademark KRATON FG 1901X by Shell Chemical Company; maleic anhydride modified ethylene-vinyl acetate copolymer, sold under the trademark FUSABOND by E.I. DuPont de Nemours & Company; ethylene-isobutyl acrylate-methacrylic acid terpolymer, sold under the trademark NUCREL by E.I. DuPont de Nemours & Company; ethylene-ethyl acrylate-methacrylic anhydride terpolymer, sold under the trademark BONDINE AX 8390 and 8060 by Sumitomo Chemical Industries; brominated styrene-isobutylene copolymers sold under the trademark BROMO XP-50 by Exxon Mobil Corporation; and resins having glycidyl or maleic anhydride functional groups sold under the trademark LOTADER by Elf Atochem of Puteaux, France.

Styrenic block copolymers is a copolymer of styrene with either butadiene, isoprene, or a mixture of the two. Additional unsaturated monomers may be added to the structure of the styrenic block copolymer as needed for property modification of the resulting SBC/urethane copolymer. The styrenic block copolymer can be a diblock or a triblock styrenic polymer. Examples of such styrenic block copolymers are described in, for example, U.S. Pat. No. 5,436,295 to Nishikawa et al. The styrenic block copolymer can have any known molecular weight for such polymers, and it can possess a linear, branched, star, dendrimeric or combination molecular structure. The styrenic block copolymer can be unmodified by functional groups, or it can be modified by hydroxyl group, carboxyl group, or other functional groups, either in its chain structure or at one or more terminus. The styrenic block copolymer can be obtained using any common process for manufacture of such polymers. The styrenic block copolymers also may be hydrogenated using well-known methods to obtain a partially or fully saturated diene monomer block.

Examples of polyamide elastomers for the cover layer 18 comprise polyether amide elastomers, such as polyether amide block copolymer. Examples of these are sold under the trademark PEBAX by Elf Atochem. Mixtures of all of the above-mentioned resins also can be used in the present invention, as can many other known types of polymer. Preferred polymer mixtures include thermoplastic elastomer blends with one or more of the group consisting of ionomers, polyolefins including ethylene copolymers with (meth)acrylic acid and (meth)acrylate esters, and polyamides.

Polyamide Blends in the Cover Composition

In yet another more detailed feature of this invention, the composition of the cover layer comprises polyamide or copolymeric polyamide obtained by: condensation polymerization, ring-opening polymerization, addition polymerization, and polymer blending. (1) Condensation polyamides are usually prepared from a diacid and a diamine, by polycondensation of a dicarboxylic acid, such as oxalic acid, adipic acid, sebacic acid, terephthalic acid, isophthalic acid or 1,4 cyclohexylidicarboxylic acid, with a diamine, such as ethylenediamine, tetramethylenediamine, pentamethylenediamine, hexamethylenediamine or decamethylenediamine, 1,4-cyclohexyldiamine or m-xylylenediamine. When made from diacid and diamines, they are usually named as polyamide-M,N, where M and N represent the number of carbon atoms in the diamine and diacid, respectively. Diacids or diamines comprise aliphatic, cycloalkyl, or aromatic hydrocarbons. Examples of aromatic diacid include isophthalic or terephthalic acid. These polyamides are commonly designated as polyamide 4,6, polyamide 6,6, polyamide 6,9, polyamide 6,10, polyamide 6,12, . . . etc.

Polyamides are polymerized by a ring-opening polymerization of cyclic lactam, such as ε-caprolactam or ω-laurolactam; polycondensation of an aminocarboxylic acid, such as 6-aminocaproic acid, 9-aminononaoic acid, 11-aminoudecanoic acid or 12-aminododecanoic acid. These polyamides are commonly designated as polyamide 6, polyamide 11, polyamide 12, . . . etc., where the number indicates the number of carbon atoms making up the ring in the monomer.

Polyamide copolymers suitable for the cover layer comprise polyamides from addition polymerization, condensation polymerization, or blending. Polyamide copolymer is produced from addition polymerization by using two or more cyclic monomers with different numbers of carbon atoms making up each ring. Polyamide copolymer is produced from condensation polymerization by using a single dibasic acid and tow or more different diamines, each with a different number of carbon atoms separating the two amine groups, by using a single diamine and two or more different dibasic acid, each with a different number of carbon atoms separating the two acid groups, or by using two or more different diamines and dibasic acids. Polyamide copolymer is produced by blending two ore more polyamide melts and holding the materials in the molten state for a sufficient time period such that partial or full randomization occurs. Commercial examples of polyamides suitable for the cover layer include polyamide 6; polyamide 11; polyamide 12; polyamide 4,6; polyamide 6,6; polyamide 6,9; polyamide 6,10; polyamide 6,12; PA12,CX; PA12, IT; PPA; PA6, IT; PA6/PPE. Non-limited but some examples of suitable polyamide or copolymeric polyamide for use in the cover layer include those sold under the trademarks, PEBAX, CRISTAMID and RILSAN marketed by ATOFINA Chemicals of Philadelphia, Pa., GRILAMID marketed by EMS-CHEMIE of Sumter, S.C., and ZYTEL marketed by E.I. DuPont de Nemours & Co. of Wilmington, Del.

The composition preferably includes a second polymer having a Shore D hardness less than about 70, more preferably less than about 60, still more preferably less than about 50, and most preferably less than about 40. The second polymer preferably has a flexural modulus less than about 70,000 psi, more preferably less than about 60,000 psi, still more preferably less than about 50,000 psi, and most preferably less than about 40,000 psi.

Particularly preferred second polymers in the composition include copolymeric ionomer, terpolymeric ionomer, bi-modal ionomer, fully neutralized ionomer, polyamide, co-polyetheramide elastomer, polyarylate, polyolefin, polyolefinic copolymer, functionalized polyolefinic copolymer, polyoctenamer, polyurethane, styrenic block copolymer, functionlized styrenic block copolymer, partially-saturated styrenic block copolymer, fully-saturated styrenic block copolymer, metallocen catalyzed polymer, and polyester.

Non-limited but some examples of suitable second polymer for use in the inner mantle and/or the outer mantle layer include those sold under the trademarks, PEBAX and LOTADER marketed by ATOFINA Chemicals of Philadelphia, Pa.; HYTREL, FUSABOND, and NUCREL marketed by E.I. DuPont de Nemours & Co. of Wilmington, Del.; SKYPEL and SKYTHANE by S.K. Chemicals of Seoul, South Korea; SEPTON and HYBRAR marketed by Kuraray Company of Kurashiki, Japan; ESTHANE by Noveon; KRATON marketed by Kraton Polymers, and VESTENAMER marketed by Degussa.

Styrenic Block Copolymer in the Mantle Composition

In yet another more detailed feature of this invention, the composition of the cover layer comprises a hydrogenated diene block copolymer having a polystyrene-reduced number-average molecular weight of 50,000 to 600,000. Each specified block copolymer is a hydrogenation product of either: (i) an A-B block copolymer, in which A is an alkenyl aromatic compound polymer block, and B is either (1) a conjugated diene homopolymer block, in which the vinyl content of the conjugated diene portion is more than 60%, or (2) an alkenyl aromatic compound-conjugated diene random copolymer block having 15% to 60% of vinyl content of the conjugated diene portion; or (ii) an A-B-C block copolymer in which A and B are as defined above, and C is an alkenyl aromatic compound-conjugated diene copolymer tapered block, in which the proportion of the alkenyl aromatic compound increases gradually; or (iii) an A-B-A block copolymer in which A and B are as defined above. In the specified block copolymer, the weight proportion of the alkenyl aromatic compound to the conjugated diene is from 5/95 to 60/40. Also, in the specified block copolymer, the content of the bound alkenyl aromatic compound in at least one block A is at least 3% by weight, and the total of the bound alkenyl aromatic compound contents in the two block A's or the block A and the block C is 3% to 50% by weight based on the total monomers. In the specified block copolymer, which as stated above is a hydrogenation product, at least 80% of the double-bond unsaturations of the conjugated diene portion is saturated by the hydrogenation.

The composition preferably includes a second polymer having a Shore D hardness greater than about 30, more preferably greater than about 40, and most preferably greater than about 50. The second polymer preferably has a flexural modulus greater than about 10,000 psi, more preferably greater than about 20,000 psi, and most preferably greater than about 30,000 psi.

Particularly preferred second polymers in the composition include copolymeric ionomer, terpolymeric ionomer, bi-modal ionomer, fully neutralized ionomer, polyamide, polyamide copolymer, polycarbonate, polypropylene, polyarylate, polyolefin, polyphenylene ether, modified-polyphenylene ether, polystyrene, diallyl phthalmate polymer, styrene-acrylonitrile, styrene-maileic anhydride, liquid crystal polymer, cellulose polymer, polyurethane, and polyester. Particularly preferred polyesters include poly(ethylene terepthalate) and poly(butylene terepthalate).

Blends of Functionalized Styrenic Block Copolymer and Ionomer in the Cover Composition In yet another more detailed feature of this invention, the composition of the cover layer comprises blends of ionomer and a block copolymer, the block copolymer incorporating a first polymer block having an aromatic vinyl compound, a second polymer block having a conjugated diene compound, and a hydroxyl group located at a block copolymer, or its hydrogenation product, in which the ratio of block copolymer to ionomer ranges from 5:95 to 95:5 by weight, more preferably from about 10:90 to about 90:10 by weight, more preferably from about 20:80 to about 80:20 by weight, more preferably from about 30:70 to about 70:30 by weight and most preferably from about 35:65 to about 65:35 by weight.

In-Situ Neutralized Polymer in the Cover Composition

In yet another more detailed feature of this invention, the composition of the cover layer comprises a composition prepared by blending together at least three materials, identified as Components A, B, and C, and melt-processing these components to form in-situ a polymer blend composition incorporating a psuedo-crosslinked polymer network. Component A is a monomer, oligomer, prepolymer or polymer that incorporates at least five percent by weight of at least one type of an anionic functional group, and more preferably between about 5% and 50% by weight. Component B is a monomer, oligomer, or polymer that incorporates less by weight of anionic functional groups than does Component A, Component B preferably incorporates less than about 25% by weight of anionic functional groups, more preferably less than about 20% by weight, more preferably less than about 10% by weight, and most preferably Component B is free of anionic functional groups. Component C incorporates a metal cation, preferably as a metal salt. The pseudo-crosslinked network structure is formed in-situ, not by covalent bonds, but instead by ionic clustering of the reacted functional groups of Component A. The method can incorporate blending together more than one of any of Components A, B, or C.

The polymer blend can include either Component A or B dispersed in a phase of the other. Preferably, blend compositions comprises between about 1% and about 99% by weight of Component A based on the combined weight of Components A and B, more preferably between about 10% and about 90%, more preferably between about 20% and about 80%, and most preferably, between about 30% and about 70%. Component C is present in a quantity sufficient to produce the preferred amount of reaction of the anionic functional groups of Component A after sufficient melt-processing. Preferably, after melt-processing at least about 5% of the anionic functional groups in the chemical structure of Component A have been consumed, more preferably between about 10% and about 90%, more preferably between about 10% and about 80%, and most preferably between about 10% and about 70%.

The blend of these components is melt-processed to produce a reaction product of the anionic functional groups of Component A with the metal cation Component C to form in-situ a composition incorporating a pseudo-crosslinked network of Component A in the presence of Component B. The amount of ionic clustering of the functional groups (as discussed above with respect to ionomers) in the polymer blends can be controlled as necessary for optimum properties of the blend. In the composition, Component A produces pseudo-crosslinking at the ionic clusters formed in-situ by the clustering of the anionic functional groups reacted with metal cation. Because of the in-situ formation of these clusters in the presence of Component B, and the resulting pseudo-crosslinks, an interpenetrating network is produced.

The composition preferably is prepared by mixing the above materials into each other thoroughly, either by using a dispersive mixing mechanism, a distributive mixing mechanism, or a combination of these. These mixing methods are well known in the manufacture of polymer blends. As a result of this mixing, the anionic functional group of Component A is dispersed evenly throughout the mixture. Next, reaction is made to take place in-situ at the site of the anionic functional groups of Component A with Component C in the presence of Component B. This reaction is prompted by addition of heat to the mixture. The reaction results in the formation of ionic clusters in Component A and formation of a pseudo-crosslinked structure of Component A in the presence of Component B. Depending upon the structure of Component B, this pseudo-crosslinked Component A can combine with Component B to form a variety of interpenetrating network structures. For example, the materials can form a pseudo-crosslinked network of Component A dispersed in the phase of Component B, or Component B can be dispersed in the phase of the pseudo-crosslinked network of Component A. Component B may or may not also form a network, depending upon its structure, resulting in either: a fully-interpenetrating network, i.e., two independent networks of Components A and B penetrating each other, but not covalently bonded to each other; or, a semi-interpenetrating network of Components A and B, in which Component B forms a linear, grafted, or branched polymer interspersed in the network of Component A. For example, a reactive functional group or an unsaturation in Component B can be reacted to form a crosslinked structure in the presence of the in-situ-formed, psuedo-crosslinked structure of component A, leading to formation of a fully-interpenetrating network. Any anionic functional groups in Component B also can be reacted with the metal cation of Component C, resulting in pseudo-crosslinking via ionic cluster attraction of Component A to Component B.

The level of in-situ-formed pseudo-crosslinking in the compositions formed by the present methods can be controlled as desired by selection and ratio of Components A and B, amount and type of anionic functional group, amount and type of metal cation in Component C, type and degree of chemical reaction in Component B, and degree of pseudo-crosslinking produced of Components A and B.

As discussed above, the mechanical and thermal properties of the polymer blend for the cover layer in the present invention can be controlled as required by a modifying any of a number of factors, including: chemical structure of Components A and B, particularly the amount and type of anionic functional groups; mean molecular weight and molecular weight distribution of Components A and B; linearity and crystallinity of Components A and B; type of metal cation in component C; degree of reaction achieved between the anionic functional groups and the metal cation; mix ratio of Component A to Component B; type and degree of chemical reaction in Component B; presence of chemical reaction, such as a crosslinking reaction, between Components A and B; and, the particular mixing methods and conditions used.

As discussed above, Component A can be any monomer, oligomer, prepolymer, or polymer incorporating at least 5% by weight of anionic functional groups. Those anionic functional groups can be incorporated into monomeric, oligomeric, prepolymeric, or polymeric structures during the synthesis of Component A, or they can be incorporated into a pre-existing monomer, oligomer, prepolymer, or polymer through sulfonation, phosphonation, or carboxylation to produce Component A.

Examples of suitable materials for use as Component A include, but are not limited to, sulfonated, phosphonated, or carboxylated products of the following: thermoplastic elastomer, thermoset elastomer, synthetic rubber, thermoplastic vulcanizate, copolymeric ionomer, terpolymeric ionomer, polycarbonate, polyolefin, polyamide, copolymeric polyamide, polyesters, polyvinyl alcohols, acrylonitrile-butadiene-styrene copolymers, polyurethane, polyarylate, polyacrylate, polyphenyl ether, modified-polyphenyl ether, high-impact polystyrene, diallyl phthalate polymer, acrylonitrile-styrene-butadiene (ABS), styrene-acrylonitrile (SAN) (including olefin-modified SAN and acrilonitrile styrene acrylonitrile), styrene-maleic anhydryde (S/MA) polymer, styrenic copolymer, functionalized styrenic copolymer, functionalized styrenic terpolymer, styrenic terpolymer, cellulose polymer, liquid crystal polymer (LCP), ehtylene-propylene-diene terpolymer (EPDM), ethylene-propylene coplymer, ethylene vinyl acetate, polyurea, and polysiloxane, or any metallocene-catalyzed polymers of these species.

Particularly suitable polymers for use as Component A within the scope of the present invention include sulfonated, phosphonated, or carboxylated products of the following: polyethyleneterephthalate, polybutyleneterephthalate, polytrimethyleneterephthalate, ethylene-carbon monoxide copolymer, polyvinyl-diene fluorides, polyphenylenesulfide, polypropyleneoxide, polyphenyloxide, polypropylene, functionalized polypropylene, polyethylene, ethylene-octene copolymer, ethylene-methyl acrylate, ethylene-butyl acrylate, polycarbonate, polysiloxane, functionalized polysiloxane, copolymeric ionomer, terpolymeric ionomer, polyetherester elastomer, polyesterester elastomer, polyetheramide elastomer, propylene-butadiene copolymer, modified copolymer of ethylene and propylene, styrenic copolymer (including styrenic block copolymer and randomly distributed styrenic copolymer, such as styrene-isobutylene copolymer and styrene-butadiene copolymer), partially or fully hydrogenated styrene-butadiene-styrene block copolymers such as styrene-(ethylene-propylene)-styrene or styrene-(ethylene-butylene)-styrene block copolymers, partially or fully hydrogenated styrene-butadiene-styrene block copolymers with functional group, polymers based on ethylene-propylene-(diene), polymers based on functionalized ethylene-propylene (diene), dynamically vulcanized polypropylene/ethylene-propylene-diene-copolymer, thermoplastic vulcanizates based on ethylene-propylene-(diene), thermoplastic polyetherurethane, thermoplastic polyesterurethane, compositions for making thermoset polyurethane, thermoset polyurethane, natural rubber, styrene-butadiene rubber, nitrile rubber, chloroprene rubber, fluorocarbon rubber, butyl rubber, acrylic rubber, silicone rubber, chlorosulfonated polyethylene, polyisobutylene, alfin rubber, polyester rubber, epichlorphydrin rubber, chlorinated isobutylene-isoprene rubber, nitrile-isobutylene rubber, 1,2-polybutadiene, 1,4-polybutadiene, cis-polyisoprene, trans-polyisoprene, and polybutylene-octene, or any metallocene-catalyzed polymers of the above-listed species. Suitable polyamides for sulfonation, phosphonation, or carboxylation are products of the following include resins obtained by: (1) polycondensation of (a) a dicarboxylic acid, such as oxalic acid, adipic acid, sebacic acid, terephthalic acid, isophthalic acid or 1,4-cyclohexylidi-carboxylic acid, with (b) a diamine, such as ethylene-diamine, tetramethylenediamine, pentamethylenediamine, hexamethylene-diamine or decamethylenediamine, 1,4-cyclohexyldiamine or m-xylylenediamine; (2) a ring-opening polymerization of cyclic lactam, such as e-caprolactam; (3) polycondensation of an aminocarboxylic acid, such as 6-aminocaproic acid, 9-aminononaoic acid, 11-aminoudecanoic acid or 12-aminododecanoic acid; or, (4) copolymerization of a cyclic lactam with a dicarboxylic acid and a diamine. Specific examples of suitable polyamides for sulfonation, phosphonation, or carboxylation include polyamide 6; polyamide 11; polyamide 12; polyamide 4,6; polyamide 6,6; polyamide 6,9; polyamide 6,10; polyamide 6,12; PA12,CX; PA12, IT; PPA; PA6, IT; PA6/PPE.

Examples of suitable materials for use as Component A include homopolymers, copolymers, and terpolymers. A preferred copolymer is a copolymer of: an α-olefin having the form $RCH=CH_2$, where R is a radical selected from the class consisting of hydrogen and alkyl radicals having 1 to 8 carbon atoms; and, an α-β-ethylenically unsaturated carboxylic acid having preferably 3 to 8 carbon atoms. Examples of suitable olefins in this copolymer include ethylene, propylene, butene, pentene, hexene, heptene, methylbutene, and methylpentene. Examples of suitable α-β-ethylenically unsaturated carboxylic acids in this copolymer include: acrylic acid, methacrylic acid, ethacrylic acid, itaconic acid, maleic acid, fumaric acid, monoesters of dicarboxylic acid (such as methyl hydrogen maleate, methyl hydrogen fumarate, and ethyl hydrogen fumarate, and maleic anhydride), and α-β-monoethylenically unsaturated anhydrides of carboxylic acid. A preferred terpolymer is a terpolymer of: an α-olefin having the form $RCH=CH_2$, where R is a radical selected from the class consisting of hydrogen and alkyl radicals having 1 to 8 carbon atoms; an α-β-ethylenically unsaturated carboxylic acid having preferably 3 to 8 carbon atoms; and an acrylate ester having from 1 to 21 carbon atoms.

Preferred, but non-limiting, examples of suitable copolymers and terpolymers for use with the present invention include copolymers or terpolymers of: ethylene/acrylic acid, ethylene/methacrylic acid, ethylene/itaconic acid, ethylene/methyl hydrogen maleate, ethylene/maleic acid, ethylene/methacrylic acid/ethylacrylate, ethylene/itaconic acid/methyl metacrylate, ethylene/methyl hydrogen maleate/ethyl acrylate, ethylene/methacrylic acid/vinyl acetate, ethylene/acrylic acid/vinyl alcohol, ethylene/propylene/acrylic acid, ethylene/styrene/acrylic acid, ethylene/methacrylic acid/acrylonitrile, ethylene/fumaric acid/vinyl methyl ether, ethylene/vinyl chloride/acrylic acid, ethylene/vinyldiene chloride/acrylic acid, ethylene/vinyl fluoride/methacrylic acid, and ethylene/chlorotrifluoroethylene/methacrylic acid, or any metallocene-catalyzed polymers of the above-listed species. Examples of suitable copolymers for use with the present invention are marketed under the name PRIMACOR by Dow Chemical Company of Midland Mich., and NUCREL by E.I. DuPont de Nemours & Co. of Wilmington, Del.

Additional examples of materials suitable for use as Component A in the method of the present invention include the reaction products of compositions incorporating diisocyanate, diamine, polyamine, or polyol incorporating the anionic functional groups discussed above, as well as any combination of those reaction products, such as prepolymers or polymers incorporating these anionic functional groups. Further examples of materials suitable for use as Component A include oxa acids, oxa esters, or polymers incorporating oxa acids or oxa esters as a co-monomer. Particular examples of suitable oxa acids and their ester include: 3,6-dioxaheptanoic acid, 3,6,9-trioxadecanoic acid, 3,6,9-trioxaudecanedioic acid, 3,6,9-trioxaudecanedioic ester, polyglycol diacid, and polyglycol diacid ester.

As discussed above, Component B can be any monomer, oligomer, or polymer, preferably having a lower weight percentage of anionic functional groups than that present in Component A in the weight ranges discussed above, and most preferably free of such functional groups. Examples of suitable materials for Component B include, but are not limited to, the following: thermoplastic elastomer, thermoset elastomer, synthetic rubber, thermoplastic vulcanizate, copolymeric ionomer, terpolymeric ionomer, polycarbonate, polyolefin, polyamide, copolymeric polyamide, polyesters, polyvinyl alcohols, acrylonitrile-butadiene-styrene copolymers, polyurethane, polyarylate, polyacrylate, polyphenyl ether, modified-polyphenyl ether, high-impact polystyrene, diallyl phthalate polymer, metallocene catalyzed polymers, acrylonitrile-styrene-butadiene (ABS), styrene-acrylonitrile (SAN) (including olefin-modified SAN and acrilonitrile styrene acrylonitrile), styrene-maleic anhydryde (S/MA) polymer, styrenic copolymer, functionalized styrenic copolymer, functionalized styrenic terpolymer, styrenic terpolymer, cellulose polymer, liquid crystal polymer (LCP), ehtylene-propylene-diene terpolymer (EPDM), ethylene-propylene coplymer, ethylene vinyl acetate, polyurea, and polysiloxane or any metallocene-catalyzed polymers of these species. Particularly suitable polymers for use as Component B within the scope of the present invention include polyethylene-terephthalate, polybutyleneterephthalate, polytrimethylene-terephthalate, ethylene-carbon monoxide copolymer, polyvinyl-diene fluorides, polyphenylenesulfide, polypropyleneoxide, polyphenyloxide, polypropylene, functionalized polypropylene, polyethylene, ethylene-octene copolymer, ethylene-methyl acrylate, ethylene-butyl acrylate, polycarbonate, polysiloxane, functionalized polysiloxane, copolymeric ionomer, terpolymeric ionomer, polyetherester elastomer, polyesterester elastomer, polyetheramide elastomer, propylene-butadiene copolymer, modified copolymer of ethylene and propylene, styrenic copolymer (including styrenic block copolymer and randomly distributed styrenic copolymer, such as styrene-isobutylene copolymer and styrene-butadiene copolymer), partially or fully hydrogenated styrene-butadiene-styrene block copolymers such as styrene-(ethylene-propylene)-styrene or styrene-(ethylene-butylene)-styrene block copolymers, partially or fully hydrogenated styrene-butadiene-styrene block copolymers with functional group, polymers based on ethylene-propylene-(diene), polymers based on functionalized ethylene-propylene-(diene), dynamically vulcanized polypropylene/ethylene-propylene-diene-copolymer, thermoplastic vulcanizates based on ethylene-propylene-(diene), thermoplastic polyetherurethane, thermoplastic polyesterurethane, compositions for making thermoset polyurethane, thermoset polyurethane, natural rubber, styrene-butadiene rubber, nitrile rubber, chloroprene rubber, fluorocarbon rubber, butyl rubber, acrylic rubber, silicone rubber, chlorosulfonated polyethylene, polyisobutylene, alfin rubber, polyester rubber, epichlorphydrin rubber, chlorinated isobutylene-isoprene rubber, nitrile-isobutylene rubber, 1,2-polybutadiene, 1,4-polybutadiene, cis-polyisoprene, trans-polyisoprene, and polybutylene-octene.

Preferred materials for use as Component B include polyester elastomers marketed under the name PEBAX and LOTADER marketed by ATOFINA Chemicals of Philadelphia, Pa.; HYTREL, FUSABOND, and NUCREL marketed by E.I. DuPont de Nemours & Co. of Wilmington, Del.; SKYPEL and SKYTHANE by S.K. Chemicals of Seoul, South Korea; SEPTON and HYBRAR marketed by Kuraray Company of Kurashiki, Japan; ESTHANE by Noveon; KRATON marketed by Kraton Polymers, and VESTENAMER marketed by Deggusa.

As stated above, Component C is a metal cation. These metals are from groups IA, IB, IIA, IIB, IIIA, IIIB, IVA, IVB, VA, VB, VIA, VIB, VIIB and VIIIB of the periodic table. Examples of these metals include lithium, sodium, magnesium, aluminum, potassium, calcium, manganese, tungsten, titanium, iron, cobalt, nickel, hafnium, copper, zinc, barium, zirconium, and tin. Suitable metal compounds for use as a source of Component C are, for example, metal salts, preferably metal hydroxides, metal carbonates, or metal acetates. In addition to Components A, B, and C, other materials commonly used in polymer blend compositions, can be incorporated into compositions prepared using the method of the present invention, including: crosslinking agents, co-crosslinking agents, accelerators, activators, UV-active chemicals such as UV initiators, EB-active chemicals, colorants, UV stabilizers, optical brighteners, antioxidants, processing aids, mold release agents, foaming agents, and organic, inorganic or metallic fillers or fibers, including fillers to adjust specific gravity.

Various known methods are suitable for preparation of polymer blends. For example, the three components can be premixed together in any type of suitable mixer, such as a V-blender, tumbler mixer, or blade mixer. This premix then can be melt-processed using an internal mixer, such as Banbury mixer, roll-mill or combination of these, to produce a reaction product of the anionic functional groups of Component A by Component C in the presence of Component B. Alternatively, the premix can be melt-processed using an extruder, such as single screw, co-rotating twin screw, or counter-rotating twin screw extruder, to produce the reaction product. The mixing methods discussed above can be used together to melt-mix the three components to prepare the compositions of the present invention. Also, the components can be fed into an extruder simultaneously or sequentially.

Most preferably, Components A and B are melt-mixed together without Component C, with or without the premixing discussed above, to produce a melt-mixture of the two components. Then, Component C separately is mixed into the blend of Components A and B. This mixture is melt-mixed to produce the reaction product. This two-step mixing can be performed in a single process, such as, for example, an extrusion process using a proper barrel length or screw configuration, along with a multiple feeding system. In this case, Components A and B can be fed into the extruder through a main hopper to be melted and well-mixed while flowing downstream through the extruder. Then Component C can be fed into the extruder to react with the mixture of Components A and B between the feeding port for component C and the die head of the extruder. The final polymer composition then exits from the die. If desired, any extra steps of melt-mixing can be added to either approach of the method of the present invention to provide for improved mixing or completion of the reaction between A and C. Also, additional components discussed above can be incorporated either into a premix, or at any of the melt-mixing stages. Alternatively, Components A, B, and C can be melt-mixed simultaneously to form in-situ a psuedo-crosslinked structure of Component A in the presence of Component B, either as a fully or semi-interpenetrating network.

The compositions of the cover layer prepared using the described method additionally can include copolymers or terpolymers having a glycidyl group, hydroxyl group, maleic anhydride group or carboxylic group. These copolymers and terpolymers comprise an α-olefin. Examples of suitable α-olefins include ethylene, propylene, 1-butene, 1-pentene, 3-methyl-1-butene, 1-hexene, 4-methyl-1-petene, 3-methyl-1-pentene, 1-octene, 1-decene, 1-dodecene, 1-tetradecene, 1-hexadecene, 1-octadecene, 1-eicocene, 1-dococene, 1-tetracocene, 1-hexacocene, 1-octacocene, and 1-triacontene. One or more of these α-olefins may be used. Examples of suitable glycidyl groups in copolymers or terpolymers for use within the scope of the present invention include esters and ethers of aliphatic glycidyl, such as allylglycidylether, vinylglycidylether, glycidyl maleate and itaconatem glycidyl acrylate and methacrylate, and also alicyclic glycidyl esters and ethers, such as 2-cyclohexene-1-glycidylether, cyclohexene-4,5-diglyxidyl-carboxylate, cyclohexene-4-glycidyl carobxylate, 5-norboenene-2-methyl-2-glycidyl carboxylate, and endocis-bicyclo(2,2,1)-5-heptene-2,3-diglycidyl dicaroboxylate. These polymers having a glycidyl group may comprise other monomers, such as esters of unsaturated carboxylic acid, for example, alkyl(meth)acrylates or vinyl esters of unsaturated carboxylic acids. Polymers having a glycidyl group can be obtained by copolymerization or graft polymerization with homopolymers or copolymers. Examples of suitable terpolymers having a glycidyl group include LOTADER AX8900 and LOTADER AX8920 marketed by Elf-Atochem Company, ELVALOY marketed by Du Pont, REXPEARL marketed by Nippon Petrochemicals Co., Ltd. Additional examples of copolymers comprising epoxy monomers and which are suitable for use in compositions prepared using the method of the present invention include styrene-butadiene-styrene block copolymers in which the polybutadiene block contains epoxy group, and styrene-isoprene-styrene block copolymers in which the polyisoprene block contains epoxy. Commercially available examples of these epoxy functional copolymers include ESBS A1005, ESBS A1010, ESBS A1020, ESBS AT018, and ESBS AT019, marketed by Daicel Chemical Industries, Ltd.

Examples of polymers or terpolymers incorporating a maleic anhydride group suitable for use within compositions prepared using the method of the present invention include maleic anhydride-modified ethylene-propylene copolymers, maleic anhydride-modified ethylene-propylene-diene terpolymers, maleic anhydride-modified polyethylenes, maleic anhydride-modified polypropylenes, ethylene-ethylacrylate-maleic anhydride terpolymers, and maleic anhydride-indene-styrene-cumarone polymers. Examples of commercially available copolymers incorporating maleic anhydride include: BONDINE, marketed by Sumitomo Chemical Co., such as BONDINE AX8390, an ethylene-ethyl acrylate-maleic anhydride terpolymer having a combined ethylene acrylate and maleic anhydride content of 32% by weight, and BONDINE TX TX8030, an ethylene-ethyl acrylate-maleic anhydride terpolymer having a combined ethylene acrylate and maleic anhydride content of 15% by weight and a maleic anhydride content of 1% to 4% by weight; maleic anhydride-containing LOTADER 3200, 3210, 6200, 8200, 3300, 3400, 3410, 7500, 5500, 4720, and 4700, marketed by Elf-Atochem; EXXELOR VA1803, a maleic anyhydride-modified ethylene-propylene copoymer having a maleic anyhydride content of 0.7% by weight, marketed by Exxon Chemical Co.; and KRATON FG 1901X, a maleic anhydride functionalized triblock copolymer having polystyrene endblocks and poly(ethylene/butylene) midblocks, marketed by Kraton Company.

Fiber in the Cover Composition

In yet another more detailed feature of this invention, the composition of the cover layer can comprise at least one hardness-enhancing material, the hardness enhancing material including at least a quantity of continuous or non-continuous fiber elements. The fiber elements that can be used in cover layer include fiber elements selected from the among the categories of glass fiber elements, carbon fiber elements, aramid fiber elements, and metallic fiber elements. The latter can include copper, high tensile steel, and stainless steel fiber elements. In preferred embodiments, the quantity of fiber elements include about 1 weight percent to about 50 weight percent of the cover layer, preferably about 5 weight percent to about 40 weight percent of the cover layer, more preferably about 10 weight percent to about 30 weight percent of the cover layer, and even more preferably about 15 weight percent to about 20 weight percent of the cover.

Nanofiller in the Cover Composition

In yet another more detailed feature of this invention, the composition of the cover layer can comprise one or more nanofillers substantially dispersed in the thermoplastic or thermoset matrix polymer. Nanofiller comprises particles of inorganic material having a largest dimension that is about one micron or less and that is at least an order of magnitude greater than such particle's smallest dimension. More particularly the nanofiller includes a clay, and even more particularly the clay is selected from the group consisting of hydrotalcite, montmorillonite, phyllosilicate, saponite, hectorite, beidellite, stevensite, vermiculite, halloysite, mica, micafluoride, and octosilicate.

More particularly, the nanofiller is present in the thermoplastic or thermoset polymer in an amount of about 0.1% to 20%, preferably from 0.1% to 15%, even more preferably from about 0.1% to 10%, and most preferably from about 0.5% to 5% by weight.

Even more particularly, the nanofiller is dispersed in the thermoplastic or thermoset matrix polymer in an intercalated or exfoliated manner.

Inorganic nanofiller material generally is made of clay, such as hydrotalcite, phyllosilicate, saponite, hectorite, beidellite, stevensite, vermiculite, halloysite, mica, montmorillonite, micafluoride, or octosilicate. To facilitate incorporation of the nanofiller material into the polymer material, either in preparing nanocomposite materials or in preparing polymer-based golf ball compositions, the clay particles generally are coated or treated by a suitable compatibilizing agent. The compatibilizing agent allows for superior linkage between the inorganic and organic material, and it also can account for the hydrophilic nature of the inorganic nanofiller material and the possibly hydrophobic nature of the polymer. Compatibilizing agents may exhibit a variety of different structures depending upon the nature of both the inorganic nanofiller material and the target matrix polymer. Non-limiting examples include hydroxy-, thiol-, amino-, epoxy-, carboxylic acid-, ester-, amide-, and siloxy-group containing compounds, oligomers or polymers. The nanofiller materials can be incorporated into the polymer either by dispersion into the particular monomer or oligomer prior to polymerization, or by melt compounding of the particles into the matrix polymer. Examples of commercial nanofillers are various Cloisite grades including 10A, 15A, 20A, 25A, 30B, and NA+ of Southern Clay Products (Gonzales, Tex.) and the Nanomer grades including 1.24TL and C.30EVA of Nanocor, Inc. (Arlington Heights, Ill.).

As mentioned above, the nanofiller particles have an aggregate structure with the aggregates particle sizes in the micron range and above. However, these aggregates have a stacked plate structure with the individual platelets being roughly 1 nanometer (nm) thick and 100 to 1000 nm across. As a result, nanofillers have extremely high surface area, resulting in high reinforcement efficiency to the material at low loading levels of the particles. The sub-micron-sized particles enhance the stiffness of the material, without increasing its weight or opacity and without reducing the material's low-temperature toughness.

Nanofillers when added into a matrix polymer can be mixed in three ways. In one type of mixing there is dispersion of the aggregate structures within the matrix polymer, but on mixing no interaction of the matrix polymer with the aggregate platelet structure occurs, and thus the stacked platelet structure is essentially maintained. As used herein, this type of mixing is defined as "undispersed."

However, if the nanofiller material is selected correctly, the matrix polymer chains can penetrate into the aggregates and separate the platelets, and thus when viewed by transmission electron microscopy or x-ray diffraction, the aggregates of platelets are expanded. At this point the nanofiller is said to be substantially evenly dispersed within and reacted into the structure of the matrix polymer. This level of expansion can occur to differing degrees. If small amounts of the matrix polymer are layered between the individual platelets then, as used herein, this type of mixing is known as "intercalation."

In some case, further penetration of the matrix polymer chains into the aggregate structure separates the platelets, and leads to a complete breaking up of the platelet's stacked structure in the aggregate and thus when viewed by TEM, the individual platelets are thoroughly mixed throughout the matrix polymer. As used herein, this type of mixing is known as "exfoliated". An exfoliated nanofiller has the platelets fully dispersed throughout the polymer matrix; the platelets may be dispersed unevenly but preferably are dispersed evenly.

While not wishing to be limited to any theory, one possible explanation of the differing degrees of dispersion of such nanofillers within the matrix polymer structure is the effect of the compatibilizer surface coating on the interaction between the nanofiller platelet structure and the matrix polymer. By careful selection of the nanofiller it is possible to vary the penetration of the matrix polymer into the platelet structure of the nanofiller on mixing. Thus, the degree of interaction and intrusion of the polymer matrix into the nanofiller controls the separation and dispersion of the individual platelets of the nanofiller within the polymer matrix. This interaction of the polymer matrix and the platelet structure of the nanofiller is defined herein as the nanofiller "reacting into the structure of the polymer" and the subsequent dispersion of the platelets within the polymer matrix is defined herein as the nanofiller "being substantially evenly dispersed" within the structure of the polymer matrix.

If no compatibilizer is present on the surface of a filler such as a clay, or if the coating of the clay is attempted after its addition to the polymer matrix, then the penetration of the matrix polymer into the nanofiller is much less efficient, very little separation and no dispersion of the individual clay platelets occurs within the matrix polymer. Physical properties of the polymer will change with the addition of nanofiller and the physical properties of the polymer are expected to improve even more as the nanofiller is dispersed into the polymer matrix to form a nanocomposite.

Materials incorporating nano tiller materials can provide these property improvements at much lower densities than those incorporating conventional fillers. For example, a nylon-6 nanocomposite material manufactured by RTP Corporation of Wichita. Kansas uses a 3% to 5% clay loading and has a tensile strength of 11,800 psi and a specific gravity of 1.14, while a conventional 30% mineral-filled material has a tensile strength of 8,000 psi and a specific gravity of 1.36. Because use of nanocomposite materials with lower loadings of inorganic materials than conventional fillers provides the same properties, this use allows products to be lighter than those with conventional fillers, while maintaining those same properties.

Nanocomposite materials are materials incorporating from about 0.1% to about 20%, preferably from about 0.1% to about 15%, and most preferably from about 0.1% to about 10% of nanofiller reacted into and substantially dispersed through intercalation or exfoliation into the structure of an organic material, such as a polymer, to provide strength, temperature resistance, and other property improvements to the resulting composite. Descriptions of particular nanocomposite materials and their manufacture can be found in U.S. Pat. No. 5,962,553 to Ellsworth, 5,385,776 to Maxfield et al., and 4,894,411 to Okada et al. Examples of nanocomposite materials currently marketed include M1030D, manufactured by Unitika Limited, of Osaka, Japan, and 1015C2, manufactured by UBE America of N.Y., N.Y.

When nanocomposites are blended with other polymer systems, the nanocomposite may be considered a type of nanofiller concentrate. However, a nanofiller concentrate may be more generally a polymer into which nanofiller is mixed; a nanofiller concentrate does not require that the nanofiller has reacted and/or dispersed evenly into the carrier polymer.

(3) Polyurethane

Compositions of thermoplastic or thermoset polyurethane for the cover layer (or layers) 18 comprise the reaction product of a diol or polyol and an isocyanate, with or without a chain extender. In other detailed fetures of the invention, the polyurethane for the cover layer can further comprise a curative of a modifier selected from the group consisting of peroxide, blocked-isocyanate, modified-isocyanate, and combinations of thereof.

Isocyanates used for making the urethanes of the present invention encompass diisocyanates and polyisocyanates. Examples of suitable isocyanates include the following: trimethylenc diisocyanate, tetramethylene diisocyanate, pentamethylene diisocyanate, hexamethylene diisocyanate, ethylene diisocyanate, diethylidene diisocyanate, propylene diisocyanate, butylene diisocyanate, bitolylene diisocyanate, tolidinc isocyanate, isophorone diisocyanate, dimeryl diisocyanate, dodecane-1,12-diisocyanate, 1,10-decamethylene diisocyanate, cyclohexylene-1,2-diisocyanate, 1-chlorobenzene-2,4-diisocyanate, furfurylidene diisocyanate, 2,4,4-trimethyl hexamethylene diisocyanate, 2,2,4-trimethyl hexamethylene diisocyanate, dodecarnethylene diisocyanate, 1,3-cyclopentane diisocyanate, 1,3-cyclohexane diisocyanate, 1,3-cyclobutane diisocyanate, 1,4-cyclohexane diisocyanate, 4,4'-methylenebis (cyclohexyl isocyanate), 4,4'-methylenebis(phenyl isocyanate), 1-methyl-2, 4-cyclohexane diisocyanate, 1-methyl-2,6-cyclohexane diisocyanate, 1,3-bis (isocyanato-methyl) cyclohexane, 1,6-diisocyanato-2,2,4,4-tetra-methylhexane, 1,6-diisocyanato-2,4,4-tetra-trimethylhexane, trans-cyclohexane-1,4-diisocyanate, 3-isocyanato-methyl-3,5, 5-trimethylcyclohexyl isocyanate, 1-isocyanato-3,3,5-trimethyl-5-isocyanatomethylcyclohexane, cyclohexyl isocyanate, dicyclohexylmethane 4,4'-diisocyanate, 1,4-bis(isocyanatomethyl) cyclohexane, m-phenylene diisocyanate, m-xylylene diisocyanate, m-tetramethylxylylene diisocyanate, p-phenylene diisocyanate, p,p'-biphenyl diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, 1,5-naphthalene diisocyanate, 4-chloro-1,3-phenylene diisocyanate, 1,5-tetrahydronaphthalene diisocyanate, meta-xylene diisocyanate, 2,4-toluene diisocyanate, 2,4'-diphenylmethane diisocyanate, 2,4-chlorophenylene diisocyanate, 4,4'-diphenylmethane diisocyanate, p,p'-diphenylmethane diisocyanate, 2,4-tolylene diisocyanate, 2,6-tolylene diisocyanate, 2,2-diphenylpropane-4,4'-diisocyanate, 4,4'-toluidine diisocyanate, dianisidine diisocyanate, 4,4'-diphenyl ether diisocyanate, 1,3-xylylene diisocyanate, 1,4-naphthylene diisocyanate, azobenzene-4,4'-diisocyanate, diphenyl sulfone-4,4'-diisocyanate, triphenylmethane 4,4', 4"-triisocyanate, isocyanatoethyl methacrylate, 3-isoprope-nyl-α,α-dimethylbenzyl-isocyanate, dichlorohexamethylene diisocyanate, ω, ω'-diisocyanato-1,4- diethylbenzene, polymethylene polyphenylene polyisocyanate, polybutylene diisocyanate, isocyanurate modified compounds, and carbodiimide modified compounds, as well as biuret modified compounds of the above polyisocyanates. Each isocyanate may be used either alone or in combination with one or more other isocyanates. These isocyanate mixtures can include triisocyanates, such as biuret of hexamethylene diisocyanate and triphenylmethane triisocyanate, and polyisocyanates, such as polymeric diphenylmethane diisocyanate.

Polyols used for making the polyurethane in the copolymer include polyester polyols, polyether polyols, polycarbonate polyols and polybutadiene polyols. Polyester polyols are prepared by condensation or step-growth polymerization utilizing diacids. Primary diacids for polyester polyols are adipic acid and isomeric phthalic acids. Adipic acid is used for materials requiring added flexibility, whereas phthalic anhydride is used for those requiring rigidity. Some examples of polyester polyols include poly(ethylene adipate) (PEA), poly (diethylene adipate) (PDA), poly(propylene adipate) (PPA), poly(tetramethylene adipate) (PBA), poly(hexamethylene adipate) (PHA), poly(neopentylene adipate) (PNA), polyols composed of 3-methyl-1,5-pentanediol and adipic acid, random copolymer of PEA and PDA, random copolymer of PEA and PPA, random copolymer of PEA and PBA, random copolymer of PHA and PNA, caprolactone polyol obtained by the ring-opening polymerization of ε-caprolactone, and polyol obtained by opening the ring of β-methyl-δ-valerolactone with ethylene glycol can be used either alone or in a combination thereof. Additionally, polyester polyol may be composed of a copolymer of at least one of the following acids and at least one of the following glycols. The acids include terephthalic acid, isophthalic acid, phthalic anhydride, oxalic acid, malonic acid, succinic acid, pentanedioic acid, hexanedioic acid, octanedioic acid, nonanedioic acid, adipic acid, azelaic acid, sebacic acid, dodecanedioic acid, dimer acid (a mixture), ρ-hydroxybenzoate, trimellitic anhydride, ε-caprolactone, and β-methyl-δ-valerolactone. The glycols includes ethylene glycol, propylene glycol, butylene glycol, pentylene glycol, 1,4-butanediol, 1,5-pentanediol, 1,6-hexanediol, neopentylene glycol, polyethylene glycol, polytetramethylene glycol, 1,4-cyclohexane dimethanol, pentaerythritol, and 3-methyl-1,5-pentanediol. Polyether polyols are prepared by the ring-opening addition polymerization of an alkylene oxide (e.g. ethylene oxide and propylene oxide) with an initiator of a polyhydric alcohol (e.g. diethylene glycol), which is an active hydride. Specifically, polypropylene glycol (PPG), polyethylene glycol (PEG) or propylene oxide-ethylene oxide copolymer can be obtained. Polytetramethylene ether glycol (PTMG) is prepared by the ring-opening polymerization of tetrahydrofuran, produced by dehydration of 1,4-butanediol or hydrogenation of furan. Tetrahydrofuran can form a copolymer with alkylene oxide. Specifically, tetrahydrofuran-propylene oxide copolymer or tetrahydrofuran-ethylene oxide copolymer can be formed. A polyether polyol may be used either alone or in a mixture. Polycarbonate polyol is obtained by the condensation of a known polyol (polyhydric alcohol) with phosgene, chloroformic acid ester, dialkyl carbonate or diallyl carbonate. Particularly preferred polycarbonate polyol contains a polyol component using 1,6-hexanediol, 1,4-butanediol, 1,3-butanediol, neopentyglycol or 1,5-pentanediol. A polycarbonate polyol can be used either alone or in a mixture. Polybutadiene polyol includes liquid diene polymer containing hydroxyl groups, and an average of at least 1.7 functional groups, and may be composed of diene polymer or diene copolymer having 4 to 12 carbon atoms, or a copolymer of such diene with addition to polymerizable α-olefin monomer having 2 to 2.2 carbon atoms. Specific examples include butadiene homopolymer, isoprene homopolymer, butadiene-styrene copolymer, butadiene-isoprene copolymer, butadiene-acrylonitrile copolymer, butadiene-2-ethyl hexyl acrylate copolymer, and butadiene-n-octadecyl acrylate copolymer. These liquid diene polymers can be obtained, for example, by heating a conjugated diene monomer in the presence of hydrogen peroxide in a liquid reactant. A polybutadiene polyol can be used either alone or in a mixture. As stated above, urethane used within the scope of the present invention also may incorporate chain extenders. Non-limiting examples of these extenders include polyols, polyamine compounds, and mixtures of these. Polyol extenders may be primary, secondary, or tertiary polyols. Specific examples of monomers of these polyols include: trimethylolpropane (TMP), ethylene glycol, 1,3-propanediol, 1,4-butanediol, 1,5-pentanediol, 1,6-hexanediol, propylene glycol, dipropylene glycol, 1,2-butanediol, 1,3-butanediol, 2,3-butanediol, 1,2-pentanediol, 2,3-pentanediol, 2,5-hexanediol, 2,4-hexanediol, 2-ethyl-1,3-hexanediol, cyclohexanediol, and 2-ethyl-2-(hydroxymethyl)-1,3-propanediol. Suitable polyamines that may be used as chain extenders include primary, secondary and tertiary amines; polyamines have two or more amines as functional groups. Examples of these include: aliphatic diamines, such as tetramethylenediamine, pentamethylenediamine, hexamethylenediamine; alicyclic diamines, such as 3,3'-dimethyl-4,4'-diamino-dicyclohexyl methane; or aromatic diamines, such as 4,4'-methylene bis-2-chloroaniline, 2,2',3,3'-tetrachloro-4,4'-diaminophenyl methane, p,p'-methylenedianiline, p-phenylenediamine or 4,4'-diaminodiphenyl; and 2,4,6-tris(dimethylaminomethyl) phenol. Aromatic diamines have a tendency to provide a stiffer (i.e., having a higher Mooney viscosity) product than aliphatic or cycloaliphatic diamines. A chain extender may be used either alone or in a mixture.

D. Compositions of the Core 12

In other more detailed feature of the invention, the core (or core layers) 12 comprises thermoplastic resin, crosslinked thermoset resins, rubber, and blends of those.

(1) Thermoplastic Resin

The composition of the core (or core layers) 12 comprises modified ionomer with about 5 to about 40 weight percent (based on the total weight of the modified ionomeric polymer) of one or more metal fatty acids or metal salts of a fatty acid, wherein the metal is selected from the group consisting of calcium, sodium, zinc, lithium, magnesium, barium, and combinations thereof. Preferably about 50 to 100 percent, and more preferably about 70 to 100 percent, of the acid groups present in the modified ionomeric polymer present in the intermediate layer are neutralized with zinc, sodium, lithium, calcium, or magnesium ions, or a combination thereof. The preferred average acid content is in the range of about 5 to about 25 weight percent. Examples of these resins include those sold under the trademark HPF (E.I. DuPont de Nemours & Company, Wilmington, Del.).

Alternatively, the core 12 comprises a bimodal ionomer of which composition comprises (1) a high molecular weight component having molecular weight of about 80,000 to about 500,000 and comprising one or more ethylene/α, β-ethylenically unsaturated $C_{3-8}$ carboxylic acid copolymers and/or one or more ethylene/alkyl (meth)acrylate/(meth)acrylic acid terpolymers; the high molecular weight component being partially neutralized with metal ions selected from the group consisting of lithium, sodium, zinc, calcium, magnesium, and a mixture of any these, and/or (2) a low molecular weight component having a molecular weight of about from about 2,000 to about 30,000 and comprising one or more ethylene/α, β-ethylenically unsaturated $C_{3-8}$ carboxylic acid copolymers and/or one or more ethylene, alkyl (meth)acrylate, (meth)acrylic acid terpolymers; the low molecular weight component being partially neutralized with metal ions selected from the group consisting of lithium, sodium, zinc, calcium, magnesium, and a mixture of any these, and (3) about 5 to about 45 weight percent (based on the total weight of the modified ionomeric polymer) of a fatty acid or one or more metal salts of the fatty acid. At least about 40 percent of the acid groups present in the modified ionomeric polymer are neutralized with zinc, sodium, lithium, calcium, or magnesium ions, or a combination thereof.

An example of a preferred ionomeric resin for composition of the core is a blend comprising the reaction product of three Components, (A), (B) and (C), which are characterized as follows:

Component (A) is a polymer comprising ethylene and/or an alpha olefin; and one or more sulfonic α,β-ethylenically unsaturated $C_3$-$C_{20}$ carboxylic acids, sulfonic acids or phosphoric acids.

Component (B) is a compound having a general formula $(R_2N)_m$—$R'$—$(X(O)_nOR_y)_m$, where R is either hydrogen, one or more $C_1$-$C_{20}$ aliphatic systems, one or more cycloaliphatic systems, one or more aromatic systems, or a combination of these. Also R' is a bridging group comprising one or more unsubstituted $C_1$-$C_{20}$ straight chain or branched aliphatic or alicyclic groups, or one or more substituted straight chain or branched aliphatic or alicyclic groups, or one or more aromatic groups, one or more oligomers each containing up to 12 repeating units, and when X is C or S or P, m is 1-3. Also when X=C, n=1 and y=1, and when X=S, n=2 and y=1, and when X=P, n=2 and y=2.

Finally, Component (C) is a basic metal ion salt, which has the capacity to neutralize some, or all of the acidic group present in Blend Components (A) and (B).

More particularly, Component (A) is an ethylene/α,β-ethylenically unsaturated $C_3$-$C_{20}$ carboxylic acid copolymer or an ethylene/α,β-ethylenically unsaturated $C_3$-$C_{20}$ carboxylic acid/α,β-ethylenically unsaturated $C_3$-$C_{20}$ carboxylic acid ester terpolymer. Component (B) is present in an amount from about 0.1 to about 40 phr; and Component (C) is a basic metal ion salt having a cation selected from the group consisting of $Li^+$, $Na^+$, $K^+$, $Zn^{2+}$, $Ca^{2+}$, $Co^{2+}$, $Ni^{2+}$, $Cu^{2+}$, $Pb^{2+}$, and $Mg^{2+}$.

Even more particularly, Component (A) is a unimodal ethylene/(meth)acrylic acid copolymer or ethylene/(meth) acrylic acid/(meth)acrylate terpolymer; or a bimodal polymer blend composition. The bimodal polymer blend includes a high molecular weight component having molecular weight of about 80,000 to about 500,000 and comprising one or more ethylene/α,β-ethylenically unsaturated $C_{3-8}$ carboxylic acid copolymers and/or one or more ethylene, alkyl(meth)acrylate, (meth)acrylic acid terpolymers; which is partially neutralized with metal ions selected from the group consisting of lithium, sodium, zinc, calcium, magnesium, and combinations thereof. The bimodal polymer blend also includes a low molecular weight component having a molecular weight of about from about 2,000 to about 30,000 and comprising one or more ethylene/α,β-ethylenically unsaturated $C_{3-8}$ carboxylic acid copolymers and/or one or more ethylene, alkyl (meth)acrylate, (meth)acrylic acid terpolymers; said low molecular weight component being partially neutralized with metal ions selected from the group consisting of lithium, sodium, zinc, calcium, magnesium, and combinations thereof. Also Component (B) is present in an amount from about 1 to about 20 phr, and is selected from the group consisting of amino acids, polypeptides, carbamic acids, oxamic acids, anthranillic acids, and combinations thereof. Finally, Component (C) is a basic metal ion salt having a cation selected from the group consisting of $Li^+$, $Na^+$, $K^+$, $Zn^{2+}$, and $Mg^{2+}$, and combinations thereof.

In a more detailed feature of the invention, Component (A) is a unimodal ethylene/(meth)acrylic acid copolymer or ethylene/(meth)acrylic acid/(meth)acrylate terpolymer. Also, Component (B) is present in an amount from about 1 to about 15 phr, and is either 4,4'-methylene-bis-(cyclohexylamine) carbamate), 11-aminoundecanoicacid, 12-aminododecanoic acid, epsilon-caprolactam; omega-caprolactam, or a combinations of these. Finally, Component (C), is either a metal formate, metal acetate, metal nitrate, metal carbonate, metal bicarbonate, metal oxide, metal hydroxide, metal alkoxides, or a combination of these.

In-Situ Neutralized Polymer

The core layer comprises a composition prepared by blending together at least three materials, identified as Components A, B, and C, and melt-processing these components to form in-situ a polymer blend composition incorporating a psuedo-crosslinked polymer network. Component A is a monomer, oligomer, prepolymer or polymer that incorporates at least five percent by weight of at least one type of an anionic functional group, and more preferably between about 5% and 50% by weight. Component B is a monomer, oligomer, or polymer that incorporates less by weight of anionic functional groups than does Component A, Component B preferably incorporates less than about 25% by weight of anionic functional groups, more preferably less than about 20% by weight, more preferably less than about 10% by weight, and most preferably Component B is free of anionic functional groups. Component C incorporates a metal cation, preferably as a metal salt. The pseudo-crosslinked network structure is formed in-situ, not by covalent bonds, but instead by ionic clustering of the reacted functional groups of Component A. The method can incorporate blending together more than one of any of Components A, B, or C.

The polymer blend can include either Component A or B dispersed in a phase of the other. Preferably, blend compositions comprises between about 1% and about 99% by weight of Component A based on the combined weight of Components A and B, more preferably between about 10% and about 90%, more preferably between about 20% and about 80%, and most preferably, between about 30% and about 70%. Component C is present in a quantity sufficient to produce the preferred amount of reaction of the anionic functional groups of Component A after sufficient melt-processing. Preferably, after melt-processing at least about 5% of the anionic functional groups in the chemical structure of Component A have been consumed, more preferably between about 10% and about 90%, more preferably between about 10% and about 80%, and most preferably between about 10% and about 70%.

The blend of these components is melt-processed to produce a reaction product of the anionic functional groups of Component A with the metal cation Component C to form in-situ a composition incorporating a pseudo-crosslinked network of Component A in the presence of Component B. The amount of ionic clustering of the functional groups (as discussed above with respect to ionomers) in the polymer blends can be controlled as necessary for optimum properties of the blend. In the composition, Component A produces pseudo-crosslinking at the ionic clusters formed in-situ by the clustering of the anionic functional groups reacted with metal cation. Because of the in-situ formation of these clusters in the presence of Component B, and the resulting pseudo-crosslinks, an interpenetrating network is produced.

The composition preferably is prepared by mixing the above materials into each other thoroughly, either by using a dispersive mixing mechanism, a distributive mixing mechanism, or a combination of these. These mixing methods are well known in the manufacture of polymer blends. As a result of this mixing, the anionic functional group of Component A is dispersed evenly throughout the mixture. Next, reaction is made to take place in-situ at the site of the anionic functional groups of Component A with Component C in the presence of Component B. This reaction is prompted by addition of heat to the mixture. The reaction results in the formation of ionic clusters in Component A and formation of a pseudo-crosslinked structure of Component A in the presence of Component B. Depending upon the structure of Component B, this pseudo-crosslinked Component A can combine with Component B to form a variety of interpenetrating network structures. For example, the materials can form a pseudo-crosslinked network of Component A dispersed in the phase of Component B, or Component B can be dispersed in the phase of the pseudo-crosslinked network of Component A. Component B may or may not also form a network, depending upon its structure, resulting in either: a fully-interpenetrating network, i.e., two independent networks of Components A and B penetrating each other, but not covalently bonded to each other; or, a semi-interpenetrating network of Components A and B, in which Component B forms a linear, grafted, or branched polymer interspersed in the network of Component A. For example, a reactive functional group or an unsaturation in Component B can be reacted to form a crosslinked structure in the presence of the in-situ-formed, psuedo-crosslinked structure of component A, leading to formation of a fully-interpenetrating network. Any anionic functional groups in Component B also can be reacted with the metal cation of Component C, resulting in pseudo-crosslinking via ionic cluster attraction of Component A to Component B.

(2) Thermoset Resin or Rubber (a) Unsaturated Polymer

The core (or core layers) 12 can comprise an unsaturated polymer. Unsaturated polymers suitable for use in the core include any polymeric material having an unsaturation, either hydrocarbon or non-hydrocarbon, capable of participating in a cross-linking reaction initiated thermally, chemically, by irradiation, or by a combination of these methods. The unsaturated polymer can be any rubber commonly used in conventional one-piece golf balls and the cores of multi-layered golf balls. Non-limiting examples of suitable unsaturated polymers include 1,2-polybutadiene, cis-1,4-polybutadiene, trans-1,4-polybutadiene, cis-polyisoprene, trans-polyisoprene, polychloroprene, polybutylene, styrene-butadiene rubber, styrene-butadiene-styrene block copolymer and partially and fully hydrogenated equivalents, styrene-isoprene-styrene block copolymer and partially and fully hydrogenated equivalents, nitrile rubber, silicone rubber, and polyurethane, as well as mixtures of these.

Polybutadiene rubbers, especially 1,4-polybutadiene rubbers containing at least 40 mol %, and more preferably 80 to 100 mol % of cis-1,4 bonds, are preferred, because of their high rebound resilience, moldability, and high strength after vulcanization. The polybutadiene component may be synthesized using rare earth-based catalysts, nickel-based catalysts, or cobalt-based catalysts, as conventionally used in this field.

Polybutadiene obtained using lanthanum rare earth-based catalysts is usually synthesized by polymerizing butadiene in the presence of a catalyst comprising a combination of a lanthanum rare earth compound, an organic aluminum compound, a Lewis base and, when necessary, a Lewis acid. The lanthanum rare earth compound may be a compound containing a rare earth atom (atomic number of 57 to 71), but particularly preferred is a neodymium compound.

Examples of the nickel-based catalysts include one-component types such as nickel diatomaceous earth, two-component types such as Raney-nickel/titanium tetrachloride, and three-component types such as a nickel compound/organic metal/boron trifluoride etherate. Examples of nickel compounds include reduced nickel with carrier, Raney-nickel, nickel oxide, nickel carboxylate, and a complex salt of organic nickel. Examples of the organic metals include a trialkyl aluminum such as triethyl aluminum, tri-n-propyl aluminum, tri-isobutyl aluminum, or tri-n-hexyl aluminum; an alkyl lithium such as n-butyl lithium, sec-butyl lithium, tert-butyl lithium, or 1,4-dibutane lithium; and a dialkyl zinc such as diethyl zinc or dibutyl zinc.

Examples of the cobalt-based catalysts include, as cobalt and compounds thereof, Raney-cobalt, cobalt chloride, cobalt bromide, cobalt iodide, cobalt oxide, cobalt sulfate, cobalt carbonate, cobalt phosphate, cobalt phthalate, cobalt carbonyl, cobalt acetylacetonate, cobalt diethyl dithiocarbamate, cobalt anilinium nitrite, and cobalt dinitrosyl chloride. In particular, each of these compounds is preferably combined with a dialkyl aluminum monochloride such as diethyl aluminum monochloride or diisobutyl aluminum monochloride, a trialkyl aluminum such as triethyl aluminum, tri-n-propyl aluminum, triisobutyl aluminum or tri-n-hexyl aluminum, an aluminum alkyl sesquichloride such as ethyl aluminum sesquichloride, or aluminum chloride.

The 1,4-polybutadiene rubbers have a molecular weight distribution (Mw/Mn) preferably in the range of about 1.2 to about 4.0, more preferably about 1.7 to about 3.7, even more preferably about 2.0 to about 3.5, and most preferably from about 2.2 to about 3.2.

The polybutadiene rubbers have a Mooney viscosity (ML1+4 (100° C.)) in the range of preferably about 20 to about 80, more preferably about 30 to about 70, even more preferably about 35 to about 60, and most preferably about 35 to about 50.

The term "Mooney viscosity" used herein is intended to refer to an industrial index of viscosity, as measured by a Mooney viscometer, which is a type of rotary plastometer (see JIS K6300). This value is represented by the symbol ML1+4 (100° C.), wherein "M" represents Mooney viscosity, "L" represents large rotor (L-type), "1+4" represents a preheating time of 1 minute and a rotor rotation time of 4 minutes, and "100° C." indicates that measurement was carried out at a temperature of 100° C.

The 1,4-polybutadiene rubbers may also be blended with natural rubber, polyisoprene rubber, styrene-butadiene rubber, or the like. At least 80% by weight of 1,4-polybutadiene rubber should be present in the base rubber, because base rubbers containing less 1,4-polybutadiene rubber often fail to take advantage of the rebound resilience of the polybutadiene rubber.

Many different types of 1,2 polybutadienes exist, having widely varying physical properties as a result of their differing tacticity, crystallinity, and molecular weight. Examples of 1,2 polybutadienes having differing tacticity, all of which are suitable as unsaturated polymers for use in the present invention, are atactic 1,2 polybutadiene, isotactic 1,2 polybutadiene, and syndiotactic 1,2 polybutadiene. Syndiotactic polymers include alternating base units that are enantiomers of each other. These 1,2 polybutadienes are also differentiated by their crystallinity, which ranges from amorphous 1,2 polybutadienes that essentially lack crystallinity to semi crystalline 1,2 polybutadienes of varying crystallinities. The molecular weights of these 1,2-polybutadienes can also vary greatly. The various combinations of tacticity, crystallinity, and molecular weight provide for many different types of 1,2 polybutadienes having very different processability, as well as other chemical, thermal, mechanical, and rheological properties. Syndiotactic 1,2-polybutadiene having a crystallinity suitable for use as an unsaturated polymer in compositions within the scope of the present invention are polymerized from a 1,2 addition of butadiene. Golf balls within the scope of the present invention include syndiotactic 1,2-polybutadiene having crystallinity and greater than about 70% of 1,2 bonds, more preferably greater than about 80% of 1,2-bonds, and most preferably greater than about 90% of 1,2-bonds. Also, golf balls within the scope of the present invention may include syndiotactic 1,2-polybutadiene having a crystallinity between about 5% and about 50%, more preferably between about 10% and about 40%, and most preferably between about 15% and about 30%. In addition, golf balls within the scope of the present invention may include syndiotactic 1,2-polybutadiene having crystallinity and a mean molecular weight between about 10,000 and about 350,000, more preferably between about 50,000 and about 300,000, more preferably between about 80,000 and about 200,000, and most preferably between about 10,000 and about 150,000. Examples of suitable syndiotactic 1,2-polybutadienes having crystallinity suitable for use in golf balls within the scope of the present invention are sold under the trademarks RB810, RB820, and RB830 by JSR Corporation of Tokyo, Japan. These have more than 90% of 1,2 bonds, a mean molecular weight of approximately 120,000, and a crystallinity between about 15% and about 30%.

(b) Cross-Linking Agents

Suitable cross-linking agents for use in the core 12 include peroxides, sulfur compounds, or other known chemical cross-linking agents, as well as mixtures of these. Non-limiting examples of suitable cross-linking agents include primary, secondary, or tertiary aliphatic or aromatic organic peroxides. Peroxides containing more than one peroxy group can be used, such as 2,5-dimethyl-2,5-di(tert-butylperoxy)hexane and 1,4-di-(2-tert-butyl peroxyisopropyl)benzene. Both symmetrical and asymmetrical peroxides can be used, for example, tert-butyl perbenzoate and tert-butyl cumyl peroxide. Peroxides incorporating carboxyl groups also are suitable. The decomposition of peroxides used as cross-linking agents in the present invention can be brought about by applying thermal energy, shear, irradiation, reaction with other chemicals, or any combination of these. Both homolytically and heterolytically decomposed peroxide can be used in the present invention. Non-limiting examples of suitable peroxides include: diacetyl peroxide; di-tert-butyl peroxide; dibenzoyl peroxide; dicumyl peroxide; 2,5-dimethyl-2,5-di(benzoylperoxy)hexane; 1,4-bis-(t-butylperoxyisopropyl) benzene; t-butylperoxybenzoate; 2,5-dimethyl-2,5-di-(t-butylperoxy)hexyne-3, such as Trigonox 145-45B, marketed by Akrochem Corp. of Akron, Ohio; 1,1-bis(t-butylperoxy)-3,3,5 tri-methylcyclohexane, such as Varox 231-XL, marketed by R.T. Vanderbilt Co., Inc. of Norwalk, Conn.; and di-(2,4-dichlorobenzoyl)peroxide. The cross-linking agents can be blended in total amounts of about 0.05 part to about 5 parts, more preferably about 0.2 part to about 3 parts, and most preferably about 0.2 part to about 2 parts, by weight of the cross-linking agents per 100 parts by weight of the unsaturated polymer.

Each cross-linking agent has a characteristic decomposition temperature at which 50% of the cross-linking agent has decomposed when subjected to that temperature for a specified time period (t½). For example, 1,1-bis(t-butylperoxy)-3,3,5-tri-methylcyclohexane at t½=0.1 hr has a decomposition temperature of 138° C. and 2,5-dimethyl-2,5-di-(t-butylperoxy)hexyne-3 at t½=0.1 hr has a decomposition temperature of 182° C. Two or more cross-linking agents having different characteristic decomposition temperatures at the same t½ may be blended in the composition. For example, where at least one cross-linking agent has a first characteristic decomposition temperature less than 150° C., and at least one cross-linking agent has a second characteristic decomposition temperature greater than 150° C., the composition weight ratio of the first one cross-linking agent to the second cross-linking agent preferably is in range from 5:95 to 95:5, and more preferably in the range of 10:90 to 50:50.

Besides the use of chemical cross-linking agents, exposure of the composition to radiation also can serve as a cross-linking agent. Radiation can be applied to the unsaturated polymer mixture by any known method, including using microwave or gamma radiation, or an electron beam device. Additives may also be used to improve radiation curing of the diene polymer.

(c) Co-Cross-Linking Agent

The rubber and cross-linking agent may be blended with a co-cross-linking agent, which may be a metal salt of an unsaturated carboxylic acid. Examples of such metal salts include zinc and magnesium salts of unsaturated fatty acids having 3 to 8 carbon atoms, such as acrylic acid, methacrylic acid, maleic acid, fumaric acid, and palmitic acid, with the zinc salts of acrylic and methacrylic acid being most preferred. The unsaturated carboxylic acid metal salt can be blended in a rubber either as a preformed metal salt, or by introducing an $\alpha,\beta$-unsaturated carboxylic acid and a metal oxide or hydroxide into the rubber composition, and allowing them to react in the rubber composition to form a metal salt. The unsaturated carboxylic acid metal salt can be blended in any desired amount, but preferably in amounts of about 10 parts to about 60 parts by weight of the unsaturated carboxylic acid per 100 parts by weight of the unsaturated polymer.

(d) Peptizer

The compositions used to formulate the core 12 may also incorporate one or more peptizers. The term "peptizer" is intended to mean chemicals that inhibit cross-linking during the initial processing of unsaturated polymers, but then participate in the cross-linking of the unsaturated polymer after cross-linking has commenced.

The peptizer preferably comprises an organic sulfur compound and/or its metal or non-metal salt. Examples of such organic sulfur compounds include thiophenols, such as pentachlorothiophenol, 4-butyl-o-thiocresol, 4t-butyl-p-thiocresol, and 2-benzamidothiophenol; thiocarboxylic acids, such as thiobenzoic acid; 4,4' dithio dimorpholine; and, sulfides, such as dixylyl disulfide, dibenzoyl disulfide; dibenzothiazyl disulfide; di(pentachlorophenyl)disulfide; dibenzamido diphenyldisulfide (DBDD), and alkylated phenol sulfides, such as VULTAC marketed by Atofina Chemicals, Inc. of Philadelphia, Pa. Preferred organic sulfur compounds include pentachlorothiophenol and dibenzamido diphenyldisulfide.

Examples of the metal salt of an organic sulfur compound include sodium, potassium, lithium, magnesium, calcium, barium, cesium, and zinc salts of the above-mentioned thiophenols and thiocarboxylic acids, with the zinc salt of pentachlorothiophenol being most preferred.

Examples of the non-metal salt of an organic sulfur compound include ammonium salts of the above-mentioned thiophenols and thiocarboxylic acids, wherein the ammonium cation has the general formula $[NR^1R^2R^3R^4]^+$, where $R^1$, $R^2$, $R^3$, and $R^4$ is either hydrogen, or a $C_1$-$C_{20}$ aliphatic, cycloaliphatic or aromatic moiety, or any and all combinations thereof, with the most preferred being the $NH_4^+$-salt of pentachlorothiophenol.

When the peptizer employed in the core 12 is an organic sulfur compound or a metal salt of an organic sulfur compound, or a non-metal salt of an organic sulfur compound, it is employed in an amount in the range of preferably about 0.01 to about 10, more preferably about 0.10 to about 7, and most preferably about 0.15 to about 5, parts by weight per 100 parts by weight of the unsaturated polymer component.

(e) Accelerators

The composition of the core 12 can further comprise one or more accelerators of one or more classes. Accelerators added to an unsaturated polymer increase the vulcanization rate and/or decrease the vulcanization temperature of the unsaturated polymers. Accelerators can be of any class known for rubber processing including mercapto-, sulfenamide-, thiuram, dithiocarbamate, dithiocarbamylsulfenamide, xanthate, guanidine, amine, thiourea, and dithiophosphate accelerators. Specific commercial accelerators include 2-mercaptobenzothiazole and its metal or non-metal salts, such as Vulkacit Mercapto C, Mercapto MGC, Mercapto ZM-5, and ZM marketed by Bayer A G of Leverkusen, Germany, Nocceler M, Nocceler M Z, and Nocceler M-60 marketed by Ouchisinko Chemical Industrial Company, Ltd. of Tokyo, Japan, and MBT and ZMBT marketed by Akrochem Corporation of Akron, Ohio. A more complete list of commercially available accelerators is given in The Vanderbilt Rubber Handbook: 13th Edition (1990, R.T. Vanderbilt Co.), pp. 296-330, in Encyclopedia of Polymer Science and Technology, Vol. 12 (1970, John Wiley & Sons), pp. 258-259, and in Rubber Technology Handbook (1980, Hanser/Gardner Publications), pp. 234-236. Preferred accelerators include 2-mercaptobenzothiazole (MBT) and its salts.

The composition of the core 12 can further incorporate in the range of about 0.1 part to about 10 parts by weight of the accelerator per 100 parts by weight of the unsaturated polymer. More preferably, the ball composition can further incorporate about 0.2 part to about 5 parts, and most preferably from about 0.5 part to about 1.5 parts, by weight of the accelerator per 100 parts by weight of the unsaturated polymer (f) Fillers and Other Ingredients The composition of the core 12 can further comprise one or more fillers selected from the group consisting of precipitated hydrated silica, limestone, clay, talc, asbestos, barytes, glass fibers, aramid fibers, mica, calcium metasilicate, barium sulfate, zinc sulfide, lithopone, silicates, silicon carbide, diatomaceous earth, carbonates such as calcium or magnesium or barium carbonate, sulfates such as calcium or magnesium or barium sulfate, metals, including tungsten steel copper, cobalt or iron, metal alloys, tungsten carbide, metal oxides, metal stearates, other particulate carbonaceous materials, and combinations thereof. The golf ball composition can comprise one or more other ingredients slected from colorant, anti-oxidant, UV-stabilizer, plasticizer, processing aid, adhesion promoter, continuous or non-continuous inorganic, organic, or metallic fiber.

In one embodiment of the invention, the core 12 may comprise a center and one or more core layers disposed around the center. These core layers may be made from the same rubber as is used in the center portion, or they may be a different thermoplastic elastomer. The various core layers (including the center) may each exhibit a different hardness. The Shore D hardness difference between the center hardness and that of the next adjacent layer, as well as the difference in hardness between the various core layers preferably is greater than 2, more preferably is greater than 5, and most preferably is greater than 10.

In one preferred embodiment, the hardness of the center and each sequential layer increases progressively outwards from the center to outer core layer.

In another preferred embodiment, the hardness of the center and each sequential layer decreases progressively outwards from the center to the outer core layer.

In one embodiment of the invention, the core may comprise a center and one or more core layers disposed around the center. These core layers may be made from the same rubber as is used in the center, or they may be made from a different thermoplastic elastomer. The various core layers (including the center) may each exhibit a different specific gravity. The specific gravity difference between the center and that of the next adjacent layer, as well as the difference in specific gravity between adjacent ones of the various core layers, preferably is greater than 0.1, and more preferably is greater than 0.2.

The core 12 can be prepared by molding the rubber composition as formulated above into a sphere of desired size and vulcanizing the rubber by heating. The manufacture of these spheres can be in accord with conventional methods and conditions of manufacture. After the cores have been made, the inner mantle layer 14, the outer mantle layer 16, and the cover layer 18 are then formed over it.

The golf ball 10 of the invention preferably has a coefficient of restitution ("C.O.R.") greater than about 0.790, at 125 ft/sec inbound velocity. In addition, at least one core or core layer further comprises a polymer selected from the group consisting of thermoplastic elastomers, thermoset elastomers, synthetic rubber, thermoplastic vulcanizates, polycarbonate, polyolefin, polyamide, copolymeric polyamide, polyesters, polyvinyl alcohols, acrylonitrile-butadiene-styrene copolymers, polyarylate, polyacrylate, polyphenylene ether, impact-modified polyphenylene ether, high impact polystyrene, diallyl phthalate polymer, metallocene catalyzed polymers, styrene-acrylonitrile (SAN) (including olefin-modified SAN and acrylonitrile-styrene-acrylonitrile), styrene-maleic anhydride (S/MA) polymer, styrenic copolymer, functionalized styrenic copolymer, functionalized styrenic terpolymer, styrenic terpolymer, cellulose polymer, liquid crystal polymer (LCP), ethylene-propylene-diene terpolymer (EPDM), ethylene-vinyl acetate copolymers (EVA), ethylene-propylene copolymer, ethylene vinyl acetate, polyurea, and polysiloxane, or any metallocene-catalyzed polymers of these species.

E. Preparation of the Golf Balls

Typically the golf ball core 12 is made by mixing together the unsaturated polymer, cross-linking agents, and other additives with or without melting them. Dry blending equipment, such as a tumbler mixer, V blender, ribbon blender can be used to mix the compositions. The core compositions also can be mixed using a mill, internal mixer such as a Banbury or Farrel continuous mixer, extruder or combinations of these, with or without application of thermal energy to produce melting. The various core components can be mixed together with the cross-linking agents, or each additive can be added in an appropriate sequence to the milled unsaturated polymer. In another method, the cross-linking agents and other components can be added to the unsaturated polymer as part of a concentrate using dry blending, roll milling, or melt mixing. If radiation is a cross-linking agent, then the mixture comprising the unsaturated polymer and other additives can be irradiated following mixing, during forming into a part such as the core of a ball, or after forming.

The resulting mixture can be subjected to, for example, a compression or injection molding process, to obtain solid spheres for the core 12. The polymer mixture is subjected to a molding cycle in which heat and pressure are applied while the mixture is confined within a mold. The cavity shape depends on the portion of the golf ball being formed. The compression and heat liberates free radicals by decomposing one or more peroxides, which initiate cross-linking. The temperature and duration of the molding cycle are selected based upon the type of peroxide and peptizer selected. The molding cycle may have a single step of molding the mixture at a single temperature for fixed time duration.

For example, a preferred method for preparing the core 12 is to first mix the core ingredients on a two-roll mill, to form slugs of approximately 30-40 g, and then compression-mold in a single step at a temperature between 150 to 180° C., for a time duration between 5 and 12 minutes.

The various components of the core 12 may also be combined using an injection molding process, which is also well known to those of ordinary skill in the art. The curing time depends on the various materials selected, and those of ordinary skill in the art will be readily able to adjust the curing time upward or downward based on the particular materials used and the discussion herein.

The various formulations for the inner mantle layer 14, the outer mantle layer 16, and the cover layer 18 may be produced using a twin-screw extruder or may be blended manually or mechanically prior to the addition to the injection molder feed hopper. Finished golf balls may be prepared by initially positioning the solid, preformed core(s) 12 in an injection-molding cavity, followed by uniform injection of the inner and outer mantle layers and/or the cover layer composition sequentially over the core. The layers can be injection-molded over the core to produce golf balls of the required diameter.

Alternatively, the inner mantle layer 14, the outer mantle layer 16, and the cover layer 18 may be formed over the core(s) 12 by first forming half shells by injection-molding followed by compression molding the half shells about the core to form the final ball.

The inner mantle layer 14, the outer mantle layer 16, and the cover layer 18 may also be formed over the core(s) 12 using injection molding or compression molding. The materials for these layers may be extruded or blended resins or castable resins such as polyurethane.

EXAMPLES

Examples of the invention are given below by way of illustration and not by way of limitation.

1. Core Components and Preparation

A series of ball cores were prepared, having diameters of 1.415-1.510 inches and suitable for use in golf balls within the scope of the present invention. The cores each incorporated as the base rubber, cis-1,4-polybutadiene. The cores also incorporated zinc oxide, zinc diacrylate, and a peroxide cross-linking initiator.

The core ingredients were mixed on a two-roll mill, and slugs of approximately 34.5 g were formed and compression-molded at 170° C., for seven minutes. The resulting cores were then tested for C.O.R. and PGA compression after one day of aging at room temperature.

2. Inner and Outer Mantle Layer Components

The materials employed in the blend formulations used for the inner mantle layer 14 and the outer mantle layer 16 were as follows:

DuPont® HPF-1000 is a grade of polymer commercially available from E.I. DuPont de Nemours & Company, having a melt flow index (as measured by ASTM D1238, 190° C./2.16 kg) of 0.65 g/10 min and a density (ASTM D1003) of 0.96 g/cm$^3$.

Surlyn® 9120 is a grade of ionomer commercially available from E.I. DuPont de Nemours & Company, and it is a zinc ionomer of an ethylene/methacrylic acid polymer.

Surlyn® 8140 is a grade of ionomer commercially available from E.I. DuPont de Nemours & Company, and it is a sodium ionomer of an ethylene/methacrylic acid polymer.

Surlyn® 8320 is a grade of ionomer commercially available from E.I. DuPont de Nemours & Company, and it is a sodium ionomer of an ethylene/methacrylic acid/methacrylate polymer.

3. Inner and Outer Mantle Layer Material Preparation

By blending the ingredients set forth in Tables 1, 2, and 3 below, a series of plastic formulations for use in either the inner mantle layer 14 or the outer mantle layer 16 were produced using a tumbler mixer.

4. Final Ball Preparation

Finished golf balls were prepared by positioning the solid, preformed cross-linked polybutadiene core in an injection molding cavity, followed by uniform injection of the selected mantle layer compositions sequentially over the core. The mantle layer formulations were injection-molded around the solid type cores of finished diameter of 1.415 inches and 1.510 inches, and cover layer 18 was formed by casting of a thermoset urethane to produce golf balls of approximately 1.680 inches in diameter having the ball constructions and properties as summarized in Tables 1, 2, and 3.

The dimple patterns of the balls in Tables 1 and 3 included 372 dimples, whereas the dimple patterns of the balls in Table 2 included 360 dimples.

The properties of PGA compression, C.O.R., Shore D hardness, and other tests on either the materials or the resulting balls were conducted using the test methods as defined below.

Core or ball diameter was determined using standard linear calipers or a standard size gauge.

Core specific gravity was determined by electronic densimeter using ASTM D-792.

Compression was measured by applying a spring-loaded force to the golf ball core 12, or the golf ball 10 to be examined, with a manual instrument (an "Atti gauge") manufactured by the Atti Engineering Company of Union City, N.J. This machine, equipped with a Federal Dial Gauge, Model D81-C, employs a calibrated spring under a known load. The sphere to be tested is forced a distance of 0.2 inches (5 mm) against this spring. If the spring, in turn, compresses by 0.2 inch, then the compression is rated at 100; if the spring compresses by 0.1 inches, then the compression value is rated as 0. Thus, more compressible, softer materials will have lower Atti gauge values than will harder, less compressible materials. Compression measured with this instrument is also referred to as PGA compression. The approximate relationship that exists between Atti or PGA compression and Riehle compression can be expressed as follows:

(Atti or PGA compression)=(160−Riehle Compression)

Thus, a Riehle compression of 100 would be the same as an Atti compression of 60.

The C.O.R. of the core 12 of the ball 10 was measured using an air cannon to fire the core or ball, at an inbound velocity of 125 feet per second, against a steel plate positioned 81 inches from the cannon's muzzle. The rebound velocity was then measured via a timing mechanism using three light gates. The rebound velocity was divided by the inbound velocity to yield the coefficient of restitution.

Shore D hardness was measured in accordance with ASTM Test D2240, except that the hardness was determined perpendicular to the curved surface of the core 12 or on the land area between dimples on the surface of the ball 10.

The ball performance was determined using a Robot Driver Test, which utilized a commercial swing robot in conjunction with an optical camera system to measure ball speed, launch angle, and backspin. In this test, a titanium driver was attached to a swing robot, and the swing speed and power profile, as well as the tee location and club lie angle, were set-up to generate the values set forth below. A Maxfli XS Tour golf ball was used as a reference for USGA driver test:

Head Speed: 112 mph

Ball Speed: 160 mph

Launch Angle: 9 degrees

Backspin: 3200 rpm

Titleist Pro V1x golf ball and Ti driver were used as a reference for 175 mph driver test:

Head Speed: 122 mph

Ball Speed: 175 mph

Launch Angle: 10 degrees

Backspin: 2700 rpm

The test ball was substituted for the reference ball and the corresponding values determined as summarized in Table 1, 2, and 3. Example 1 and Comparative Example 1 both shared the same outer mantle layer and cover layer compositions, and both had the same cover hardness of 57 Shore D. Similarly, Examples 2 and 3 and Comparative Example 2 all shared the same outer mantle layer and cover layer compositions. Example 4 and Comparative Example 3 both shared the same outer mantle layer and cover layer compositions, but inner mantle layer compositions are different to yield different hardness gradients.

Comparison of the resulting ball performance data in Table 1 demonstrates that Example 1 had lower driver spin at both 160 mph and 175 mph driver test, lower spin rate at 8-iron test, and higher spin rate at 30-yard pitching wedge test than did Comparative Example 1, while showing lower ball compression and a similar ball speed, despite having the identical outer mantle and cover compositions. This suggests that Example 1 would yield a longer driver distance and a better hit-feel while improving short game playability and yielding a better hit-feel than Comparative Example 1.

Comparison of the resulting ball performance data in Table 2 demonstrates that Examples 2 and 3 had lower driver spin rates at USGA driver test than did Comparative Example 2, while demonstrating lower ball compressions and similar ball speeds, despite having the identical outer mantle layer and cover layer compositions. This suggests that Examples 2 and 3 would yield a longer driver distance while yielding a better hit-feel than Comparative Example 2.

Comparison of the resulting ball performance data in Table 3 demonstrates that Example 4 had much lower driver spin at both 160 mph and 175 mph driver test than did Comparative Example 3, while showing much lower ball compression and a similar ball speed, despite having the identical and mantle layer and cover layer compositions, but having the opposite hardness gradients. This suggests that Example 4 would yield a longer driver distance and a better hit-feel than Comparative Example 3.

Thus the combination of the use of the specified hardness gradient, mantle layer compositions, and thickness in a multi-layer golf ball, allows production of a golf ball having lower driver spin (hence improved distance) and a better hit-feel for a given outer cover layer hardness.

TABLE 1

| Specification | Comparative 1 | Example 1 |
|---|---|---|
| Core Size(in) | 1.51 | 1.415 |
| Core Comp(PGA) | 70 | 50 |
| Inner Mantle Material | — | 100% HPF 1000 |
| Inner Mantle Thickness(in) | — | 0.050 |
| Inner Mantle Hardness(Shore D) | — | 51 |
| Outer Mantle Material | 27% 9120 | 27% 9120 |
|  | 27% 8140 | 27% 8140 |
|  | 46% 8320 | 46% 8320 |
| Outer Mantle Thickness(in) | 0.050 | 0.050 |
| Outer Mantle Hardness(Shore D) | 58 | 56.3 |
| Cover Material | Thermoset PU | Thermoset PU |
| Cover Thickness(in) | 0.035 | 0.035 |
| Cover Material Hardness(Shore D) | 57D | 57D |
| Ball Compression | 85 | 79 |
| 175 mph Driver | | |
| Ballspeed(mph) | 175.7 | 175 |
| Backspin(rpm) | 3200 | 3040 |
| USGA Driver | | |
| Ballspeed(mph) | 162.9 | 162.5 |
| Backspin(rpm) | 3300 | 3100 |
| 30 yd PW | | |
| Backspin(rpm) | 6300 | 6700 |
| Launch angle(deg) | 35 | 33.9 |
| 8 Iron | | |
| Backspin(rpm) | 7250 | 7000 |
| Launch angle(deg) | 19 | 19.4 |

TABLE 2

| Specification | Comparative 2 | Example 2 | Example 3 |
|---|---|---|---|
| Core Size(in) | 1.51 | 1.415 | 1.415 |
| Core Comp(PGA) | 64 | 50 | 50 |
| Inner Mantle Material | — | 100% HPF 1000 | 100% AD 1040 |
| Inner Mantle Thickness(in) | — | 0.050 | 0.050 |
| Inner Mantle Hardness(Shore D) | — | 51 | 52.8 |
| Outer Mantle Material | 43% 8140 | 43% 8140 | 43% 8140 |
|  | 43% 9120 | 43% 9120 | 43% 9120 |
|  | 14% 8320 | 14% 8320 | 14% 8320 |
| Outer Mantle Thickness(in) | 0.050 | 0.050 | 0.050 |
| Outer Mantle Hardness(Shore D) | 66.4 | 66.9 | 66.7 |
| Cover Material | Thermoset PU | Thermoset PU | Thermoset PU |
| Cover Thickness(in) | 0.035 | 0.035 | 0.035 |
| Cover Material Hardness(Shore D) | 57.2 | 59.7 | 59.6 |
| Ball Compression | 84 | 80 | 80 |
| COR(125 fps) | 0.821 | 0.818 | 0.818 |
| COR(143 fps) | 0.801 | 0.796 | 0.797 |
| USGA Driver | | | |
| Ballspeed(mph) | 162.6 | 161 | 162.7 |
| Backspin(rpm) | 3200 | 2900 | 2900 |
| 8 Iron | | | |
| Backspin(rpm) | 6300 | 5950 | 6100 |
| Launch angle(deg) | 20.4 | 20.7 | 20.4 |

TABLE 3

| Specification | Example 4 | Comparative 3 |
|---|---|---|
| Description | low spin | high spin |
| Core Size(in) | 1.415 | 1.415 |
| Core Comp(PGA) | 50 | 50 |
| Inner Mantle Material | 100% HPF 1000 | 45% 8140 |
|  |  | 45% 9120 |
|  |  | 10% 8320 |
| Inner Mantle Thickness(in) | 0.050 | 0.050 |
| Inner Mantle Hardness(Shore D) | 51 | 66.8 |
| Outer Mantle Material | 27% 9120 | 27% 9120 |
|  | 27% 8140 | 27% 8140 |
|  | 46% 8320 | 46% 8321 |
| Outer Mantle Thickness(in) | 0.050 | 0.050 |
| Outer Mantle Hardness(Shore D) | 56.3 | 56.3 |
| Cover Material | Thermoset PU | Thermoset PU |
| Cover Thickness(in) | 0.035 | 0.035 |
| Cover Material Hardness(Shore D) | 57 | 59.3 |
| Ball Compression | 79 | 98 |
| 175 mph Driver | | |
| Ballspeed(mph) | 175.1 | 175.8 |
| Backspin(rpm) | 2950 | 3275 |
| USGA Driver | | |
| Ballspeed(mph) | 162.4 | 162.9 |
| Backspin(rpm) | 3050 | 3300 |
| 30 yd PW | | |
| Backspin(rpm) | 6700 | 6900 |
| Launch angle(deg) | 33.9 | 33.6 |
| 8 Iron | | |
| Backspin(rpm) | 7000 | 7275 |
| Launch angle(deg) | 19.4 | 18.8 |

Although the invention has been described in detail with reference only to the presently preferred embodiment, those skilled in the art will appreciate that various modification can be made without departing from the invention. Accordingly, the invention is not to be limited except by the following claims.

We claim:

1. A golf ball comprising:
   (a) one or more core layers having a flexural modulus ($F1$) less than 30 kpsi;
   (b) an inner mantle layer immediately adjacent to and surrounding the one or more core layers, wherein the inner mantle layer has a flexural modulus ($F2$) in the range of 15 to 60 kpsi and a thickness of less than 0.08 inches;
   (c) an outer mantle layer immediately adjacent to and surrounding the inner mantle layer, wherein the outer mantle layer has a flexural modulus ($F3$) in the range of 30 to 120 kpsi; and
   (d) one or more cover layers surrounding the outer mantle layer;
   (e) wherein the flexural modulus ($F2$) of the inner mantle layer is greater than the flexural modulus ($F1$) of the one or more core layers by at least 3 kpsi;
   (f) and wherein the flexural modulus ($F3$) of the outer mantle layer is greater than the flexural modulus ($F2$) of the inner mantle layer by at least 12 kpsi.

2. The golf ball of claim 1, wherein the inner mantle layer and/or the outer mantle layer comprises ionomeric polymer comprising:
   (a) an ionomeric polymer comprising one or more E/X/Y copolymers, wherein E is ethylene, X is a $C_3$ to $C_8$ $\alpha,\beta$ ethylenically unsaturated carboxylic acid, and Y is a softening comonomer selected from the group consisting of alkyl acrylate and alkyl methacrylate, wherein the alkyl groups have from 1 to 8 carbon atoms, or ionomers of such E/X/Y copolymers, wherein X is in the range of about 5 to about 35 weight % of the E/X/Y copolymer and Y is in the range of 0 to about 50 weight % of the E/X/Y copolymer, and wherein the acid groups present in the ionomeric polymer are partially neutralized with a metal selected from the group consisting of zinc, sodium, lithium, calcium, magnesium, and combinations thereof; or (b) a bimodal ionomeric polymer comprising:
  (i) a high molecular weight component having a molecular weight in the range of about 80,000 to about 500,000 and comprising one or more ethylene/α,β-ethylenically unsaturated $C_{3-8}$ carboxylic acid copolymers and/or one or more ethylene, alkyl (meth)acrylate, (meth)acrylic acid terpolymers, wherein the high molecular weight component is partially neutralized with metal ions selected from the group consisting of lithium, sodium, zinc, calcium, magnesium, and combinations thereof, and
  (ii) a low molecular weight component having a molecular weight in the range of about 2,000 to about 30,000 and comprising one or more ethylene/α,β-ethylenically unsaturated $C_{3-8}$ carboxylic acid copolymers and/or one or more ethylene, alkyl (meth)acrylate, (meth)acrylic acid terpolymers, wherein the low molecular weight component is partially neutralized with metal ions selected from the group consisting of lithium, sodium, zinc, calcium, magnesium, and combinations thereof; or (c) a modified ionomeric polymer comprising:
  (i) a blend composition comprising:
    (1) ethylene,
    (2) 5 to 25 weight percent (meth)acrylic acid (based on the total weight of the modified ionomeric polymer), and
    (3) 0 to 40 weight percent of a $C_1$ to $C_8$-alkyl acrylate (based on the total weight of the modified ionomeric polymer), and
    (4) about 5 to about 45 weight percent (based on the total weight of the modified ionomeric polymer) of a fatty acid or one or more metal salts of a fatty acid, or
  (ii) a bimodal polymer blend composition comprising:
    (1) a high molecular weight component having a molecular weight in the range of about 80,000 to about 500,000 and comprising one or more ethylene/α,β-ethylenically unsaturated $C_{3-8}$ carboxylic acid copolymers and/or one or more ethylene, alkyl (meth)acrylate, (meth)acrylic acid terpolymers, wherein the high molecular weight component is partially neutralized with metal ions selected from the group consisting of lithium, sodium, zinc, calcium, magnesium, and combinations thereof,
    (2) a low molecular weight component having a molecular weight in the range of about 2,000 to about 30,000 and comprising one or more ethylene/α,β-ethylenically unsaturated $C_{3-8}$ carboxylic acid copolymers and/or one or more ethylene, alkyl (meth)acrylate, (meth)acrylic acid terpolymers, wherein the low molecular weight component is partially neutralized with metal ions selected from the group consisting of lithium, sodium, zinc, calcium, magnesium, and combinations thereof, and
    (3) about 5 to about 45 weight percent (based on the total weight of the modified ionomeric polymer) of a fatty acid or one or more metal salts of a fatty acid; or (d) a blend composition comprising the reaction product of:
  (i) one or more ionomers, and
  (ii) a compound having a general formula $(R_2N)_m$—$R'$—$(X(O)_n OR_y)_m$, wherein R is selected from the group consisting of
    (1) hydrogen,
    (2) one or more $C_1$-$C_{20}$ aliphatic systems,
    (3) one or more cycloaliphatic systems,
    (4) one or more aromatic systems, and
    (5) combinations thereof,
    wherein R' is a bridging group comprising
      (1) one or more unsubstituted $C_1$-$C_{20}$ straight chain or branched aliphatic or alicyclic groups, or
      (2) one or more substituted straight chain or branched aliphatic or alicyclic groups, or
      (3) one or more aromatic groups, or
      (4) one or more oligomers each containing up to 12 repeating units,
    wherein when X=C or S or P, m is 1-3,
    wherein when X=C, n=1 and y=1,
    wherein when X=S, n=2 and y=1, and
    wherein when X=P, n=2 and y=2; or (e) combinations of (a), (b), (c), and (d).

3. The golf ball of claim 1, wherein the inner mantle layer and/or the outer mantle layer comprises:
  (a) a matrix polymer selected from the group consisting of thermoplastics, thermosets, and combinations thereof; and
  (b) one or more nanofillers substantially dispersed in the matrix polymer.

4. The golf ball of claim 3, wherein the nanofiller is intercalated within the matrix polymer.

5. The golf ball of claim 3, wherein the nanofiller is exfoliated within the matrix polymer.

6. The golf ball of claim 1, wherein the inner mantle layer and/or the outer mantle layer comprises a polymer selected from the group consisting of thermoplastic resins, thermoset resins, polyurethane resins, polyester resins, polyamide elastomer resins, polyamide-ionomer, polyurethane ionomer, thermoplastic copolyetherester block copolymer, thermoplastic copolyesterester block copolymer, thermoplastic elastomer, thermoset elastomer, synthetic rubber, thermoplastic vulcanizate, copolymeric ionomer, terpolymeric ionomer, polyurethane ionomer, polyamide ionomer, polycarbonate, polyolefin, polyamide, copolymeric polyamide, polyester, polyvinyl alcohol, acrylonitrile-butadiene-styrene copolymer, polyarylate, polyacrylate, polyphenylene ether, impact-modified polyphenylene ether, high impact polystyrene, diallyl phthalate polymer, metallocene catalyzed polymer, styrene-acrylonitrile (SAN) (including olefin-modified SAN and acrylonitrile-styrene-acrylonitrile), styrene-maleic anhydride (S/MA) polymer, styrenic copolymer, functionalized styrenic copolymer, functionalized styrenic terpolymer, styrenic terpolymer, cellulose polymer, liquid crystal polymer (LCP), ethylene-propylene-diene terpolymer (EPDM), ethylene-vinyl acetate copolymers (EVA), ethylene-propylene copolymer, ethylene vinyl acetate, polyurea, polysiloxane, and combinations thereof.

7. The golf ball of claim 1, wherein at least one of the one or more cover layers comprises a material selected from the group consisting of thermoset polyurethane, thermoplastic polyurethane, ionomer, and combinations thereof.

8. The golf ball of claim 1, wherein at least one of the one or more cover layer comprises ionomeric polymer comprising:

(a) an ionomeric polymer comprising one or more E/X/Y copolymers, wherein E is ethylene, X is a $C_3$ to $C_8$ α,β ethylenically unsaturated carboxylic acid, and Y is a softening comonomer selected from the group consisting of alkyl acrylate and alkyl methacrylate, wherein the alkyl groups have from 1 to 8 carbon atoms, or ionomers of such E/X/Y copolymers, wherein X is in the range of about 5 to about 35 weight % of the E/X/Y copolymer and Y is in the range of 0 to about 50 weight % of the E/X/Y copolymer, and wherein the acid groups present in the ionomeric polymer are partially neutralized with a metal selected from the group consisting of zinc, sodium, lithium, calcium, magnesium, and combinations thereof; or (b) a bimodal ionomeric polymer comprising:
  (i) a high molecular weight component having a molecular weight in the range of about 80,000 to about 500,000 and comprising one or more ethylene/α,β-ethylenically unsaturated $C_{3-8}$ carboxylic acid copolymers and/or one or more ethylene, alkyl (meth)acrylate, (meth)acrylic acid terpolymers, wherein the high molecular weight component is partially neutralized with metal ions selected from the group consisting of lithium, sodium, zinc, calcium, magnesium, and combinations thereof, and
  (ii) a low molecular weight component having a molecular weight in the range of about 2,000 to about 30,000 and comprising one or more ethylene/α,β-ethylenically unsaturated $C_{3-8}$ carboxylic acid copolymers and/or one or more ethylene, alkyl (meth)acrylate, (meth)acrylic acid terpolymers, wherein the low molecular weight component is partially neutralized with metal ions selected from the group consisting of lithium, sodium, zinc, calcium, magnesium, and combinations thereof; or (c) a modified ionomeric polymer comprising:
  (i) a blend composition comprising:
    (1) ethylene,
    (2) 5 to 25 weight percent (meth)acrylic acid (based on the total weight of the modified ionomeric polymer), and
    (3) 0 to 40 weight percent of a $C_1$ to $C_8$-alkyl acrylate (based on the total weight of the modified ionomeric polymer), and
    (4) about 5 to about 45 weight percent (based on the total weight of the modified ionomeric polymer) of a fatty acid or one or more metal salts of a fatty acid, or
  (ii) a bimodal polymer blend composition comprising:
    (1) a high molecular weight component having a molecular weight in the range of about 80,000 to about 500,000 and comprising one or more ethylene/α,β-ethylenically unsaturated $C_{3-8}$ carboxylic acid copolymers and/or one or more ethylene, alkyl (meth)acrylate, (meth)acrylic acid terpolymers, wherein the high molecular weight component is partially neutralized with metal ions selected from the group consisting of lithium, sodium, zinc, calcium, magnesium, and combinations thereof,
    (2) a low molecular weight component having a molecular weight in the range of about 2,000 to about 30,000 and comprising one or more ethylene/α,β-ethylenically unsaturated $C_{3-8}$ carboxylic acid copolymers and/or one or more ethylene, alkyl (meth)acrylate, (meth)acrylic acid terpolymers, wherein the low molecular weight component is partially neutralized with metal ions selected from the group consisting of lithium, sodium, zinc, calcium, magnesium, and combinations thereof, and
    (3) about 5 to about 45 weight percent (based on the total weight of the modified ionomeric polymer) of a fatty acid or one or more metal salts of a fatty acid; or (d) a blend composition comprising the reaction product of:
  (i) one or more ionomers, and
  (ii) a compound having a general formula $(R_2N)_m$—R'—$(X(O)_nOR_y)_m$,
  (iii) wherein R is selected from the group consisting of
    (1) hydrogen,
    (2) one or more $C_1$-$C_{20}$ aliphatic systems,
    (3) one or more cycloaliphatic systems,
    (4) one or more aromatic systems, and
    (5) combinations thereof,
  (iv) wherein R' is a bridging group comprising
    (1) one or more unsubstituted $C_1$-$C_{20}$ straight chain or branched aliphatic or alicyclic groups, or
    (2) one or more substituted straight chain or branched aliphatic or alicyclic groups, or
    (3) one or more aromatic groups, or
    (4) one or more oligomers each containing up to 12 repeating units,
  (v) wherein when X=C or S or P, m is 1-3,
  (vi) wherein when X=C, n=1 and y=1,
  (vii) wherein when X=S, n=2 and y=1, and
  (viii) wherein when X=P, n=2 and y=2; or (e) combinations of (a), (b), (c), and (d).

9. The golf ball of claim 1, wherein at least one of the one or more cover layers comprises an ionomer and a block copolymer, the block copolymer comprising a first polymer block comprising an aromatic vinyl compound, a second polymer block comprising a conjugated diene compound, and a hydroxyl group located at a block copolymer, or its hydrogenation product, wherein the ratio of block copolymer to ionomer is in the range of about 51:49 to about 95:5 by weight.

10. The golf ball of claim 1, wherein at least one of the one or more cover layers comprises:
  (a) a matrix polymer selected from the group consisting of thermoplastics, themosets and combinations thereof; and
  (b) one or more nanofillers substantially dispersed in the matrix polymer.

11. The golf ball of claim 10, wherein the nanofiller is intercalated within the matrix polymer.

12. The golf ball of claim 10, wherein the nanofiller is exfoliated within the matrix polymer.

13. The golf ball of claim 1, wherein at least one of the one or more core layers comprises a modified ionomeric polymer comprising:
  (a) an ionomeric polymer comprising one or more E/X/Y copolymers, wherein E is ethylene, X is a $C_3$ to $C_8$ α,β ethylenically unsaturated carboxylic acid, and Y is a softening comonomer selected from the group consisting of alkyl acrylate and alkyl methacrylate, wherein the alkyl groups have from 1 to 8 carbon atoms, or ionomers of such E/X/Y copolymers, wherein X is in the range of about 5 to about 35 weight % of the E/X/Y copolymer and Y is in the range of 0 to about 50 weight % of the E/X/Y copolymer, and wherein the acid groups present in the ionomeric polymer are partially neutralized with a metal selected from the group consisting of zinc, sodium, lithium, calcium, magnesium, and combinations thereof; or (b) a bimodal ionomeric polymer comprising:
  a high molecular weight component having a molecular weight in the range of about 80,000 to about 500,000 and comprising one or more ethylene/α,β-ethylenically unsaturated $C_{3-8}$ carboxylic acid copolymers and/or one or more ethylene, alkyl (meth)acrylate, (meth)acrylic acid terpolymers, wherein the high molecular weight component is partially neutralized with metal ions selected from the group consisting of lithium, sodium, zinc, calcium, magnesium, and combinations thereof, and
  (ii) a low molecular weight component having a molecular weight in the range of about 2,000 to about 30,000 and comprising one or more ethylene/α,β-ethylenically unsaturated $C_{3-8}$ carboxylic acid copolymers and/or one or more ethylene, alkyl (meth)acrylate, (meth)acrylic acid terpolymers, wherein the low molecular weight component is partially neutralized with metal ions selected from the group consisting of lithium, sodium, zinc, calcium, magnesium, and combinations thereof; or
(c) a modified ionomeric polymer comprising:
  (i) a blend composition comprising:
    (1) ethylene,
    (2) 5 to 25 weight percent (meth)acrylic acid (based on the total weight of the modified ionomeric polymer), and
    (3) 0 to 40 weight percent of a $C_1$ to $C_8$-alkyl acrylate (based on the total weight of the modified ionomeric polymer), and
    (4) about 5 to about 45 weight percent (based on the total weight of the modified ionomeric polymer) of a fatty acid or one or more metal salts of a fatty acid, or
  (ii) a bimodal polymer blend composition comprising:
    (1) a high molecular weight component having a molecular weight in the range of about 80,000 to about 500,000 and comprising one or more ethylene/α,β-ethylenically unsaturated $C_{3-8}$ carboxylic acid copolymers and/or one or more ethylene, alkyl (meth)acrylate, (meth)acrylic acid terpolymers, wherein the high molecular weight component is partially neutralized with metal ions selected from the group consisting of lithium, sodium, zinc, calcium, magnesium, and combinations thereof,
    (2) a low molecular weight component having a molecular weight in the range of about 2,000 to about 30,000 and comprising one or more ethylene/α,β-ethylenically unsaturated $C_{3-8}$ carboxylic acid copolymers and/or one or more ethylene, alkyl (meth)acrylate, (meth)acrylic acid terpolymers, wherein the low molecular weight component is partially neutralized with metal ions selected from the group consisting of lithium, sodium, zinc, calcium, magnesium, and combinations thereof, and
    (3) about 5 to about 45 weight percent (based on the total weight of the modified ionomeric polymer) of a fatty acid or one or more metal salts of a fatty acid; or
(d) a blend composition comprising the reaction product of:
  (i) one or more ionomers, and
  (ii) a compound having a general formula $(R_2N)_m$—R'—$(X(O)_nOR_y)_m$,
  (iii) wherein R is selected from the group consisting of
    (1) hydrogen,
    (2) one or more $C_1$-$C_{20}$ aliphatic systems,
    (3) one or more cycloaliphatic systems,
    (4) one or more aromatic systems, and
    (5) combinations thereof,
  (iv) wherein R' is a bridging group comprising
    (1) one or more unsubstituted $C_1$-$C_{20}$ straight chain or branched aliphatic or alicyclic groups, or
    (2) one or more substituted straight chain or branched aliphatic or alicyclic groups, or
    (3) one or more aromatic groups, or
    (4) one or more oligomers each containing up to 12 repeating units,
  (v) wherein when X=C or S or P, m is 1-3,
  (vi) wherein when X=C, n=1 and y=1,
  (vii) wherein when X=S, n=2 and y=1, and
  (viii) wherein when X=P, n=2 and y=2; or
(e) combinations of (a), (b), (c), and (d).

14. The golf ball of claim 1, wherein at least one of the one or more core layers comprises:
  (a) at least one unsaturated polymer;
  (b) at least one cross-linking agent;
  (c) optionally, at least one co-cross-linking agent;
  (d) optionally, at least one peptizer;
  (e) optionally, at least one accelerator; and
  (f) optionally, at least one filler.

15. The golf ball of claim 14, wherein:
  (a) the unsaturated polymer has a Mooney viscosity ($ML_{1+4}(100°\ C.)$) of from about 20 to about 80 and is selected from the group consisting of 1,2-polybutadiene, cis-1,4-polybutadiene, trans-1,4-polybutadiene, cis-polyisoprene, trans-polyisoprene, polychloroprene, polybutylene, styrene-butadiene rubber, styrene-butadiene-styrene block copolymer and partially and fully hydrogenated equivalents, styrene-isoprene-styrene block copolymer and partially and fully hydrogenated equivalents, nitrile rubber, silicone rubber, and polyurethane, and combinations thereof;
  (b) the cross-linking agent is present in an amount of from about 0.05 to about 5 parts by weight of the cross-linking agent per 100 parts by weight of the unsaturated polymer;
  (c) the peptizer, if present, comprises
    (i) an organic sulfur compound,
    (ii) a metal salt of an organic sulfur compound,
    (iii) a non-metal salt of an organic sulfur compound, or
    (iv) combinations of (i), (ii), and/or (iii);
  (d) the accelerator, if present, is present in an amount of from about 0.1 to about 10 parts by weight per 100 parts by weight of the unsaturated polymer; and
  (e) the filler, if present, is selected from the group consisting of precipitated hydrated silica, limestone, clay, talc, asbestos, barytes, glass fibers, aramid fibers, mica, calcium metasilicate, barium sulfate, zinc sulfide, lithopone, silicates, silicon carbide, diatomaceous earth, carbonates such as calcium or magnesium or barium carbonate, sulfates such as calcium or magnesium or barium sulfate, metals, including tungsten steel copper, cobalt or iron, metal alloys, tungsten carbide, metal oxides, metal stearates, other particulate carbonaceous materials, and combinations thereof.

16. The golf ball of claim 14, wherein:
  (a) the unsaturated polymer is cis-1,4-polybutadiene and has a Mooney viscosity ($ML_{1+4}(100°\ C.)$) of from about 30 to about 60;
  (b) the cross-linking agent is present in an amount of from about 0.2 to about 3 parts by weight per 100 parts by weight of the unsaturated polymer;
  (c) the peptizer, if present, is (i) present in an amount of from about 0.01 to about 10 parts by weight per 100 parts by weight of the unsaturated polymer, and (ii) is selected from the group consisting of organic sulfur compounds, metal salts of an organic sulfur compound, non-metal salts of an organic sulfur compound, and combinations thereof; and (d) the accelerator, if present, is present in an amount of from about 0.2 to about 5 parts by weight of the accelerator per 100 parts by weight of the unsaturated polymer.

17. The golf ball of claim 14, wherein:

(a) the unsaturated polymer is cis-1,4-polybutadiene and has a Mooney viscosity ($ML_{1+4}(100°\,C.)$) of from about 35 to about 50;

(b) the cross-linking agent is present in an amount of from about 0.2 to about 2 parts by weight per 100 parts by weight of the unsaturated polymer;

(c) the peptizer, if present, is
   (i) present in an amount of from about 0.1 to about 7 parts by weight per 100 parts by weight of the unsaturated polymer, and
   (ii) selected from the group consisting of pentachlorothiophenol, dibenzamido diphenyldisulfide, a metal salt of pentachlorothiophenol, an ammonium salt of pentachlorothiophenol with the ammonium cation having the general formula $[NR^1R^2R^3R^4]^+$ where $R^1$, $R^2$, $R^3$, and $R^4$ is either hydrogen, or a $C_1$-$C_{20}$ aliphatic, cycloaliphatic or aromatic system, and combinations thereof; and (d) the accelerator, if present, is present in an amount of from about 0.5 to about 1.5 parts by weight per 100 parts by weight of the unsaturated polymer and is selected from the group consisting of 2-mercaptobenzothiazole and a salt of 2-mercaptobenzothiazole.

18. The golf ball of claim 14, wherein the peptizer is present in an amount of from about 0.15 to about 5 parts by weight per 100 parts by weight of the unsaturated polymer, and is selected from the group consisting of pentachlorothiophenol, the zinc salt of pentachlorothiophenol, the $NH_4^+$ salt of pentachlorothiophenol, and combinations thereof.

19. A golf ball, comprising:

a molded core comprising a high cis-polybutadiene having a Mooney viscosity in the range of about 20 to about 70 and a PGA compression in the range of about 10 to about 100;

an inner mantle comprising an ionomer neutralized to 80% or more and having a Shore D hardness in the range of about 20 to about 70;

an outer mantle comprising an ionomer having a Shore D hardness in the range of about 40 to about 90 and having a composition different from that of the inner mantle; and a thermoset polyurethane/polyurea cover;

wherein the core has a flexural modulus less than 30 kpsi;

wherein the inner mantle is immediately adjacent to the core and has a flexural modulus in the range of 15 to 60 kpsi;

wherein the outer mantle is immediately adjacent to the inner mantle and has a flexural modulus in the range of 30 to 120 kpsi;

wherein the flexural modulus of the inner mantle is greater than the flexural modulus of the core by at least 3 kpsi; and wherein the flexural modulus of the outer mantle is greater than the flexural modulus of the inner mantle by at least 12 kpsi.

20. The golf ball of claim 19, wherein the golf ball has a C.O.R. greater than about 0.790.

21. The golf ball of claim 20, wherein the core further comprises a peptizer.

22. The golf ball of claim 21, wherein the peptizer is pentachlorothiophenol or a metallic salt thereof.

23. The golf ball of claim 19, wherein the ionomer of the inner mantle is neutralized to about 90% or more.

24. The golf ball of claim 19, wherein the ionomer of the inner mantle is neutralized to about 100%.

25. The golf ball of claim 19, wherein the ionomer of the inner mantle is modified with a fatty acid or a salt thereof.

26. The golf ball of claim 25, wherein the fatty acid is stearic acid, oleic acid, a metal stearate, or a metal oleate.

27. The golf ball of claim 19, wherein the starting material of the inner mantle comprises an ethylene copolymer, an ethylene terpolymer or blends thereof.

28. The golf ball of claim 27, wherein the starting material of the inner mantle comprises a copolymer of ethylene and ethylene acrylate.

29. The golf ball of claim 19, wherein the polyurethane/polyurea cover is a cast or reaction-injection-molded cover.

30. A golf ball, comprising:

a molded core comprising a high cis-polybutadiene having a Mooney viscosity in the range of about 20 to about 70 and a PGA compression in the range of about 10 to about 100;

an inner mantle comprising an ionomer having a Shore D hardness in the range of about 20 to about 70;

an outer mantle comprising an ionomer neutralized to 80% or more and having a Shore D hardness in the range of about 40 to about 90 and further having a composition different from that of the inner mantle; and a thermoset polyurethane/polyurea cover;

wherein the core has a flexural modulus less than 30 kpsi;

wherein the inner mantle is immediately adjacent to the core and has a flexural modulus in the range of 15 to 60 kpsi;

wherein the outer mantle is immediately adjacent to the inner mantle and has a flexural modulus in the range of 30 to 120 kpsi;

wherein the flexural modulus of the inner mantle is greater than the flexural modulus of the core by at least 3 kpsi; and wherein the flexural modulus of the outer mantle is greater than the flexural modulus of the inner mantle by at least 12 kpsi.

31. The golf ball of claim 30, wherein the core has a C.O.R. of greater than about 0.790.

32. The golf ball of claim 31, wherein the core further comprises a peptizer.

33. The golf ball of claim 30, wherein the ionomer of the outer mantle is neutralized to about 90% or more.

34. The golf ball of claim 30, wherein the ionomer of the outer mantle is neutralized to about 100%.

35. The golf ball of claim 30, wherein the ionomer of the outer mantle is modified with a fatty acid or a salt thereof.

36. The golf ball of claim 35, wherein the fatty acid is stearic acid, oleic acid, a metal stearate, or a metal oleate.

37. A golf ball, comprising:

a molded core comprising a high cis-polybutadiene, pentachlorothiophenol or a metallic salt thereof;

an inner mantle having a flexural modulus and a thickness of less than 0.08 inches and including an ionomer resin comprising a copolymer of ethylene and ethylene acrylate neutralized to 80% or greater;
an ionomer skin having a composition different from that of the inner mantle; and
a thermoset polyurethane/polyurea cover produced by reaction-injection molding;
wherein the core has a flexural modulus less than 30 kpsi;
wherein the inner mantle is immediately adjacent to the core and has a flexural modulus in the range of 15 to 60 kpsi;
wherein the ionomer skin is immediately adjacent to the inner mantle and has a flexural modulus in the range of 30 to 120 kpsi;
wherein the flexural modulus of the inner mantle is greater than the flexural modulus of the core by at least 3 kpsi; and
wherein the flexural modulus of the ionomer skin is greater than the flexural modulus of the inner mantle by at least 12 kpsi.

38. A golf ball comprising:
one or more core layers having a flexural modulus (F1) less than 30 kpsi;
an inner mantle layer surrounding the one or more core layers, wherein the inner mantle layer has a flexural modulus (F2) in the range of 15 to 60 kpsi;
an outer mantle layer surrounding the inner mantle layer, wherein the outer mantle layer has a flexural modulus (F3) in the range of 30 to 120 kpsi; and
one or more cover layers surrounding the outer mantle layer;
wherein the flexural modulus (F2) of the inner mantle layer is greater than the flexural modulus (Fl) of the one or more core layers by at least 3 kpsi;
wherein the flexural modulus (F3) of the outer mantle layer is greater than the flexural modulus (F2) of the inner mantle layer by at least 3 kpsi; and
wherein the inner mantle layer and/or the outer mantle layer comprises a bimodal ionomeric polymer comprising:
  (i) a high molecular weight component having a molecular weight in the range of about 80,000 to about 500,000 and comprising one or more ethylene, alkyl (meth)acrylate, (meth)acrylic acid terpolymers, wherein the high molecular weight component is partially neutralized with metal ions selected from the group consisting of lithium, sodium, zinc, calcium, magnesium, and combinations thereof, and
  (ii) a low molecular weight component having a molecular weight in the range of about 2,000 to about 30,000 and comprising one or more ethylene, alkyl (meth)acrylate, (meth)acrylic acid terpolymers, wherein the low molecular weight component is partially neutralized with metal ions selected from the group consisting of lithium, sodium, zinc, calcium, magnesium, and combinations thereof.

39. A golf ball comprising:
one or more core layers having a flexural modulus (F1) less than 30 kpsi;
an inner mantle layer immediately adjacent to and surrounding the one or more core layers, wherein the inner mantle layer has a flexural modulus (F2) in the range of 15 to 60 kpsi;
an outer mantle layer immediately adjacent to and surrounding the inner mantle layer, wherein the outer mantle layer has a flexural modulus (F3) in the range of 30 to 120 kpsi; and
one or more cover layers surrounding the outer mantle layer;
wherein the flexural modulus (F2) of the inner mantle layer is greater than the flexural modulus (F1) of the one or more core layers by at least 3 kpsi;
wherein the flexural modulus (F3) of the outer mantle layer is greater than the flexural modulus (F2) of the inner mantle layer by at least 3 kpsi; and
wherein at least one of the one or more core layers comprises:
  (a) at least one unsaturated polymer;
  (b) at least one cross-linking agent;
  (c) at least one peptizer;
  (e) optionally, at least one co-cross-linking agent;
  (d) optionally, at least one accelerator; and
  (f) optionally, at least one filler.

40. The golf ball of claim 39, wherein:
(a) the unsaturated polymer has a Mooney viscosity ($ML_{1+4}(100°\ C.)$) of from about 20 to about 80 and is selected from the group consisting of 1,2-polybutadiene, cis-1,4-polybutadiene, trans-1,4-polybutadiene, cis-polyisoprene, trans-polyisoprene, polychloroprene, polybutylene, styrene-butadiene rubber, styrene-butadiene-styrene block copolymer and partially and fully hydrogenated equivalents, styrene-isoprene-styrene block copolymer and partially and fully hydrogenated equivalents, nitrile rubber, silicone rubber, and polyurethane, and combinations thereof;
(b) the cross-linking agent is present in an amount of from about 0.05 to about 5 parts by weight of the cross-linking agent per 100 parts by weight of the unsaturated polymer;
(c) the peptizer comprises
  (i) an organic sulfur compound,
  (ii) a metal salt of an organic sulfur compound,
  (iii) a non-metal salt of an organic sulfur compound, or
  (iv) combinations of (i), (ii), and/or (iii);
(d) the accelerator, if present, is present in an amount of from about 0.1 to about 10 parts by weight per 100 parts by weight of the unsaturated polymer; and
(e) the filler, if present, is selected from the group consisting of precipitated hydrated silica, limestone, clay, talc, asbestos, barytes, glass fibers, aramid fibers, mica, calcium metasilicate, barium sulfate, zinc sulfide, lithopone, silicates, silicon carbide, diatomaceous earth, carbonates such as calcium or magnesium or barium carbonate, sulfates such as calcium or magnesium or barium sulfate, metals, including tungsten steel copper, cobalt or iron, metal alloys, tungsten carbide, metal oxides, metal stearates, other particulate carbonaceous materials, and combinations thereof.

41. The golf ball of claim 39, wherein:
(a) the unsaturated polymer is cis-1,4-polybutadiene and has a Mooney viscosity ($ML_{1+4}(100°\ C.)$) of from about 30 to about 60;
(b) the cross-linking agent is present in an amount of from about 0.2 to about 3 parts by weight per 100 parts by weight of the unsaturated polymer;
(c) the peptizer is
  (i) present in an amount of from about 0.01 to about 10 parts by weight per 100 parts by weight of the unsaturated polymer, and
  (ii) is selected from the group consisting of organic sulfur compounds, metal salts of an organic sulfur compound, non-metal salt of an organic sulfur compound, and combinations thereof; and (d) the accelerator, if present, is present in an amount of from about 0.2 to about 5 parts by weight of the accelerator per 100 parts by weight of the unsaturated polymer.

42. The golf ball of claim 39, wherein:
(a) the unsaturated polymer is cis-1,4-polybutadiene and has a Mooney viscosity ($ML_{1+4}$(100° C.)) of from about 35 to about 50;
(b) the cross-linking agent is present in an amount of from about 0.2 to about 2 parts by weight per 100 parts by weight of the unsaturated polymer;
(c) the peptizer is
  (i) present in an amount of from about 0.1 to about 7 parts by weight per 100 parts by weight of the unsaturated polymer, and
  (ii) selected from the group consisting of pentachlorothiophenol, dibenzamido diphenyldisulfide, a metal salt of pentachlorothiophenol, an ammonium salt of pentachlorothiophenol with the ammonium cation having the general formula $[NR^1R^2R^3R^4]^+$ where $R^1$, $R^2$, $R^3$, and $R^4$ is either hydrogen, or a $C_1$-$C_{20}$ aliphatic, cycloaliphatic or aromatic system, and combinations thereof; and
(d) the accelerator, if present, is present in an amount of from about 0.5 to about 1.5 parts by weight per 100 parts by weight of the unsaturated polymer and is selected from the group consisting of 2-mercaptobenzothiazole and a salt of 2-mercaptobenzothiazole.

43. The golf ball of claim 39, wherein the peptizer is present in an amount of from about 0.15 to about 5 parts by weight per 100 parts by weight of the unsaturated polymer, and is selected from the group consisting of pentachlorothiophenol, the zinc salt of pentachlorothiophenol, the $NH_4^+$ salt of pentachlorothiophenol, and combinations thereof.

44. A golf ball, comprising:
a molded core comprising a high cis-polybutadiene having a Mooney viscosity in the range of about 20 to about 70 and a PGA compression in the range of about 10 to about 100;
an inner mantle comprising an ionomer neutralized to 80% or more and having a Shore D hardness in the range of about 20 to about 70 and a thickness of less than 0.08 inches;
an outer mantle comprising an ionomer having a Shore D hardness in the range of about 40 to about 90 and having a composition different from that of the inner mantle; and
a thermoset polyurethane/polyurea cover;
wherein the core has a flexural modulus less than 30 kpsi;
wherein the inner mantle is immediately adjacent to the core and has a flexural modulus in the range of 15 to 60 kpsi;
wherein the outer mantle is immediately adjacent to the inner mantle and has a flexural modulus in the range of 30 to 120 kpsi;
wherein the flexural modulus of the inner mantle is greater than the flexural modulus of the core by at least 3 kpsi; and
wherein the flexural modulus of the outer mantle is greater than the flexural modulus of the inner mantle by at least 12 kpsi.

45. A golf ball, comprising:
a molded core comprising a high cis-polybutadiene having a Mooney viscosity in the range of about 20 to about 70 and a PGA compression in the range of about 10 to about 100;
an inner mantle comprising an ionomer having a Shore D hardness in the range of about 20 to about 70 and a thickness of less than 0.08 inches;
an outer mantle comprising an ionomer neutralized to 80% or more and having a Shore D hardness in the range of about 40 to about 90 and further having a composition different from that of the inner mantle; and
a thermoset polyurethane/polyurea cover;
wherein the core has a flexural modulus less than 30 kpsi;
wherein the inner mantle is immediately adjacent to the core and has a flexural modulus in the range of 15 to 60 kpsi;
wherein the outer mantle is immediately adjacent to the inner mantle and has a flexural modulus in the range of 30 to 120 kpsi;
wherein the flexural modulus of the inner mantle is greater than the flexural modulus of the core by at least 3 kpsi; and
wherein the flexural modulus of the outer mantle is greater than the flexural modulus of the inner mantle by at least 12 kpsi.

46. A golf ball comprising:
one or more core layers having a flexural modulus (F1) less than 30 kpsi;
an inner mantle layer surrounding the one or more core layers, wherein the inner mantle layer has a flexural modulus (F2) in the range of 15 to 60 kpsi;
an outer mantle layer surrounding the inner mantle layer, wherein the outer mantle layer has a flexural modulus (F3) in the range of 30 to 120 kpsi; and
one or more cover layers surrounding the outer mantle layer;
wherein the flexural modulus (F2) of the inner mantle layer is greater than the flexural modulus (F1) of the one or more core layers by at least 3 kpsi;
wherein the flexural modulus (F3) of the outer mantle layer is greater than the flexural modulus (F2) of the inner mantle layer by at least 3 kpsi; and
wherein the inner mantle layer and/or the outer mantle layer comprises a modified ionomeric polymer comprising:
  (i) a blend composition comprising:
    (1) ethylene,
    (2) 5 to 25 weight percent (meth)acrylic acid (based on the total weight of the modified ionomeric polymer), and
    (3) 0 to 40 weight percent of a $C_1$ to $C_8$-alkyl acrylate (based on the total weight of the modified ionomeric polymer), and
    (4) about 5 to about 45 weight percent (based on the total weight of the modified ionomeric polymer) of a fatty acid or one or more metal salts of a fatty acid, or
  (ii) a bimodal polymer blend composition comprising:
    (1) a high molecular weight component having a molecular weight in the range of about 80,000 to about 500,000 and comprising one or more ethylene, alkyl (meth)acrylate, (meth)acrylic acid terpolymers, wherein the high molecular weight component is partially neutralized with metal ions selected from the group consisting of lithium, sodium, zinc, calcium, magnesium, and combinations thereof,
    (2) a low molecular weight component having a molecular weight in the range of about 2,000 to about 30,000 and comprising one or more ethylene, alkyl (meth)acrylate, (meth)acrylic acid terpolymers, wherein the low molecular weight component is partially neutralized with metal ions selected from the group consisting of lithium, sodium, zinc, calcium, magnesium, and combinations thereof, and
  (3) about 5 to about 45 weight percent (based on the total weight of the modified ionomeric polymer) of a fatty acid or one or more metal salts of a fatty acid.

47. The golf ball of claim 46, wherein the modified ionomeric polymer comprises a bimodal polymer blend composition comprising:
  (1) a high molecular weight component having a molecular weight in the range of about 80,000 to about 500,000 and comprising one or more ethylene, alkyl (meth)acrylate, (meth)acrylic acid terpolymers, wherein the high molecular weight component is partially neutralized with metal ions selected from the group consisting of lithium, sodium, zinc, calcium, magnesium, and combinations thereof;
  (2) a low molecular weight component having a molecular weight in the range of about 2,000 to about 30,000 and comprising one or more ethylene, alkyl (meth)acrylate, (meth)acrylic acid terpolymers, wherein the low molecular weight component is partially neutralized with metal ions selected from the group consisting of lithium, sodium, zinc, calcium, magnesium, and combinations thereof; and
  (3) about 5 to about 45 weight percent (based on the total weight of the modified ionomeric polymer) of a fatty acid or one or more metal salts of a fatty acid.

48. The golf ball of claim 15, wherein the peptizer is present.

49. The golf ball of claim 15, wherein the accelerator is present and is a salt of 2-mercaptobenzothiazole.

50. The golf ball of claim 16, wherein the peptizer is present.

51. The golf ball of claim 16, wherein the accelerator is present and is a salt of 2-mercaptobenzothiazole.

52. The golf ball of claim 17, wherein the accelerator is present and is a salt of 2-mercaptobenzothiazole.

53. The golf ball of claim 21, wherein the peptizer is an ammonium salt of pentachlorothiophenol with the ammonium cation having the general formula $[NR^1R^2R^3R^4]^+$ where $R^1$, $R^2$, $R^3$, and $R^4$ is either hydrogen, or a $C_1$-$C_{20}$ aliphatic, cycloaliphatic or aromatic system.

54. The golf ball of claim 32, wherein the peptizer is an ammonium salt of pentachlorothiophenol with the ammonium cation having the general formula $[NR^1R^2R^3R^4]^+$ where $R^1$, $R^2$, $R^3$, and $R^4$ is either hydrogen, or a $C_1$-$C_{20}$ aliphatic, cycloaliphatic or aromatic system.

55. The golf ball of claim 40, wherein the accelerator is present and is a salt of 2-mercaptobenzothiazole.

56. The golf ball of claim 41, wherein the accelerator is present and is a salt of 2-mercaptobenzothiazole.

57. The golf ball of claim 42, wherein the accelerator is present and is a salt of 2-mercaptobenzothiazole.

58. The golf ball of claim 44, wherein:
the core further comprises a peptizer; and
the peptizer is an ammonium salt of pentachlorothiophenol with the ammonium cation having the general formula $[NR^1R^2R^3R^4]^+$ where $R^1$, $R^2$, $R^3$, and $R^4$ is either hydrogen, or a $C_1$-$C_{20}$ aliphatic, cycloaliphatic or aromatic system.

59. The golf ball of claim 45, wherein:
the core further comprises a peptizer; and
the peptizer is an ammonium salt of pentachlorothiophenol with the ammonium cation having the general formula $[NR^1R^2R^3R^4]^+$ where $R^1$, $R^2$, $R^3$, and $R^4$ is either hydrogen, or a $C_1$-$C_{20}$ aliphatic, cycloaliphatic or aromatic system.

* * * * *

UNITED STATES PATENT AND TRADEMARK OFFICE
CERTIFICATE OF CORRECTION

| | |
|---|---|
| PATENT NO. | : 8,177,665 B2 |
| APPLICATION NO. | : 11/344976 |
| DATED | : May 15, 2012 |
| INVENTOR(S) | : Eric Loper, Dean Snell and Hyun Jin Kim |

Page 1 of 1

It is certified that error appears in the above-identified patent and that said Letters Patent is hereby corrected as shown below:

Column 42, line 39, "nano tiller" should be -- nanofiller --.

Signed and Sealed this
Fifth Day of March, 2013

Teresa Stanek Rea
*Acting Director of the United States Patent and Trademark Office*